US011245773B2

(12) United States Patent
Wang

(10) Patent No.: US 11,245,773 B2
(45) Date of Patent: Feb. 8, 2022

(54) SYSTEM AND METHOD FOR A CONVERTIBLE USER APPLICATION

(71) Applicant: OPERR TECHNOLOGIES, INC., Flushing, NY (US)

(72) Inventor: Kevin Sunlin Wang, Flushing, NY (US)

(73) Assignee: Operr Technologies, Inc, Flushing, NY (US)

( * ) Notice: Subject to any disclaimer, the term of this patent is extended or adjusted under 35 U.S.C. 154(b) by 0 days.

(21) Appl. No.: 16/964,512

(22) PCT Filed: Jan. 25, 2019

(86) PCT No.: PCT/US2019/015307
§ 371 (c)(1),
(2) Date: Jul. 23, 2020

(87) PCT Pub. No.: WO2019/148052
PCT Pub. Date: Aug. 1, 2019

(65) Prior Publication Data
US 2021/0037109 A1 Feb. 4, 2021

Related U.S. Application Data

(63) Continuation of application No. 16/026,996, filed on Jul. 3, 2018, now Pat. No. 10,785,340.
(Continued)

(51) Int. Cl.
*G06F 15/16* (2006.01)
*H04L 29/08* (2006.01)
(Continued)

(52) U.S. Cl.
CPC .......... *H04L 67/2838* (2013.01); *G06F 9/451* (2018.02); *G06F 16/252* (2019.01);
(Continued)

(58) Field of Classification Search
CPC ...... H04L 67/2838; H04W 4/60; H04W 4/50; H04W 4/029; H04W 4/025; G06F 16/252;
(Continued)

(56) References Cited

U.S. PATENT DOCUMENTS 7,529,728 B2    5/2009  Weissman et al.
8,407,205 B2    3/2013  Doshi et al.
(Continued)

OTHER PUBLICATIONS

International Search Report and Written Opinion for International (PCT) Patent Application No. PCT/US2019/15307, dated Apr. 25, 2019, 10 pages.
(Continued)

*Primary Examiner* — Richard G Keehn

(57) ABSTRACT

Provided is a convertible software application management system for a shared data-access layer in a distributed structure system linked to a database for customizable data processing at least in the transportation, home healthcare, hotel, e-commerce, delivery, and other goods and/or service industries. Provided is a dispatching service provider (DSP) application for dispatching objects of service companies to provide an efficient mobile app to promote a cooperative relationship between a DSP and service companies using white label apps and a streamlined/efficient dispatching system. Customers only need to download or utilize a single mobile app to access service providers from a plurality of service companies, white label companies, and/or a DSP, all using the same dispatch software. This increases the likelihood of a customer to find suitable service providers for his/her needs and allows service entities to reach additional customers and maintain their brands without the need for a plurality of mobile applications.

20 Claims, 24 Drawing Sheets

Related U.S. Application Data

(60) Provisional application No. 62/621,988, filed on Jan. 25, 2018.

(51) Int. Cl.

| | |
|---|---|
| *G06Q 30/06* | (2012.01) |
| *H04W 4/02* | (2018.01) |
| *G06F 16/27* | (2019.01) |
| *G06F 16/25* | (2019.01) |
| *H04W 4/60* | (2018.01) |
| *H04W 4/50* | (2018.01) |
| *H04W 4/029* | (2018.01) |
| *G06F 16/909* | (2019.01) |
| *G06Q 10/10* | (2012.01) |
| *G06Q 10/02* | (2012.01) |
| *G06F 9/451* | (2018.01) |
| *G06Q 10/08* | (2012.01) |
| *G06Q 50/10* | (2012.01) |
| *G06F 3/0484* | (2022.01) |

(52) U.S. Cl.
CPC ............ *G06F 16/27* (2019.01); *G06F 16/909* (2019.01); *G06Q 10/02* (2013.01); *G06Q 10/08* (2013.01); *G06Q 10/101* (2013.01); *G06Q 30/0601* (2013.01); *G06Q 30/0639* (2013.01); *G06Q 30/0641* (2013.01); *G06Q 50/10* (2013.01); *H04W 4/025* (2013.01); *H04W 4/029* (2018.02); *H04W 4/50* (2018.02); *H04W 4/60* (2018.02); *G06F 3/04842* (2013.01)

(58) Field of Classification Search
CPC ...... G06F 16/27; G06F 3/04842; G06F 9/451; G06Q 30/0639; G06Q 30/0641
See application file for complete search history.

(56) References Cited

U.S. PATENT DOCUMENTS

| | | | |
|---|---|---|---|
| 8,577,835 B2 | 11/2013 | Doshi et al. | |
| 8,930,413 B2 | 1/2015 | Tang et al. | |
| 9,196,143 B2 | 11/2015 | Lin | |
| 9,378,227 B2 | 6/2016 | Brooks et al. | |
| 9,665,634 B2 | 5/2017 | Messer et al. | |
| 9,703,799 B2 | 7/2017 | Kuruganti et al. | |
| 9,965,339 B2 | 5/2018 | Bryan et al. | |
| 10,616,362 B2 | 4/2020 | Wang | |
| 2003/0182274 A1* | 9/2003 | Oh | G06F 16/954 |
| 2006/0122872 A1* | 6/2006 | Stevens | G06Q 10/02 |
| | | | 705/5 |
| 2006/0274042 A1* | 12/2006 | Krah | G06F 3/03543 |
| | | | 345/163 |
| 2008/0109483 A1 | 5/2008 | Yoo et al. | |
| 2010/0005055 A1 | 1/2010 | An et al. | |
| 2010/0094668 A1* | 4/2010 | Gupta | G06Q 10/109 |
| | | | 705/5 |
| 2011/0106791 A1* | 5/2011 | Maim | G06F 40/18 |
| | | | 707/722 |
| 2011/0151898 A1 | 6/2011 | Chandra et al. | |
| 2011/0270705 A1 | 11/2011 | Parker | |
| 2011/0314114 A1* | 12/2011 | Young, III | G06Q 30/02 |
| | | | 709/206 |
| 2012/0036220 A1* | 2/2012 | Dare | H04L 67/04 |
| | | | 709/217 |
| 2012/0036552 A1* | 2/2012 | Dare | H04L 41/0803 |
| | | | 726/1 |
| 2012/0271672 A1 | 10/2012 | Hansknecht et al. | |
| 2014/0108137 A1* | 4/2014 | Kuri | G06Q 10/047 |
| | | | 705/14.49 |
| 2014/0172838 A1 | 6/2014 | Imler et al. | |
| 2014/0244409 A1* | 8/2014 | Nathanel | G06Q 30/02 |
| | | | 705/15 |
| 2015/0018015 A1* | 1/2015 | Clark | H04W 4/21 |
| | | | 455/456.3 |
| 2015/0213285 A1 | 7/2015 | Maiko et al. | |
| 2015/0235304 A1* | 8/2015 | Vincent | G06Q 30/0261 |
| | | | 705/14.23 |
| 2015/0253963 A1* | 9/2015 | Koohestanian | G06F 3/0486 |
| | | | 715/745 |
| 2016/0110754 A1 | 4/2016 | Miyazaki et al. | |
| 2016/0189065 A1* | 6/2016 | Elliott | G06Q 10/02 |
| | | | 705/5 |
| 2016/0234341 A1 | 8/2016 | Dare et al. | |
| 2016/0247098 A1* | 8/2016 | Bongiorno | G06Q 10/02 |
| 2017/0091849 A1* | 3/2017 | Greystoke | G06Q 30/0631 |
| 2017/0091883 A1* | 3/2017 | Greystoke | G06Q 30/0619 |
| 2017/0161764 A1* | 6/2017 | Zhang | G06Q 30/0267 |
| 2017/0191849 A1* | 7/2017 | Agam | G08G 1/0112 |
| 2017/0293950 A1* | 10/2017 | Rathod | G06Q 30/0639 |
| 2017/0329483 A1 | 11/2017 | Jann et al. | |
| 2018/0012281 A1* | 1/2018 | Salani | G06Q 30/0627 |
| 2018/0101894 A1 | 4/2018 | Markoff et al. | |
| 2018/0129995 A1* | 5/2018 | Fowler | G06Q 10/1095 |
| 2018/0181919 A1* | 6/2018 | Jobling | B64D 13/06 |
| 2018/0189778 A1* | 7/2018 | Grassadonia | G06Q 20/08 |
| 2018/0218463 A1* | 8/2018 | Jobling | H04W 4/029 |
| 2019/0066240 A1* | 2/2019 | Goldstein | G06Q 10/02 |
| 2019/0230180 A1 | 7/2019 | Wang | |

OTHER PUBLICATIONS

Official Action for U.S. Appl. No. 16/026,996, dated Sep. 26, 2018, 5 pages. Restriction Requirement.

Official Action for U.S. Appl. No. 16/026,996, dated Dec. 26, 2018, 15 pages.

Official Action for U.S. Appl. No. 16/026,996, dated Jun. 5, 2019, 22 pages.

Official Action for U.S. Appl. No. 16/026,996, dated Sep. 4, 2019, 21 pages.

Official Action for U.S. Appl. No. 16/026,996, dated Mar. 6, 2020 22 pages.

Official Action for U.S. Appl. No. 16/296,014, dated Apr. 30, 2019, 16 pages.

Official Action for U.S. Appl. No. 16/296,014, dated Nov. 14, 2019, 17 pages.

Notice of Allowance for U.S. Appl. No. 16/296,014, dated Feb. 25, 2020 6 pages.

\* cited by examiner

SYSTEM AND METHOD FOR A CONVERTIBLE USER APPLICATION

CROSS-REFERENCE TO RELATED APPLICATIONS

This application is a national stage application under 35 U.S.C. 371 and claims the benefit of PCT Application No. PCT/US2019/015307 having an international filing date of 25 Jan. 2019, which designated the United States, which PCT application claimed priority to U.S. patent application Ser. No. 16/026,996, filed on Jul. 3, 2018 and titled SYSTEM AND METHOD FOR A CONVERTIBLE USER APPLICATION, and to U.S. Provisional Patent Application No. 62/621,988, filed on Jan. 25, 2018 and titled SYSTEM AND METHOD FOR AN IMPROVED CUSTOMIZABLE DISPATCHING SERVICE, the entire contents of which applications are incorporated by reference herein in their entireties.

FIELD OF THE INVENTION

The embodiments herein relate to a convertible software application management system, platform, method, and display thereof, and more specifically to a method and system having a shared data-access layer in a distributed structure system for customizable data processing for a user application at least in the transportation, home healthcare, hotel, shipping, food, entertainment, and other service industries.

BACKGROUND

Booking a trip or requesting other services through mobile applications (apps) is a well-known process that is becoming increasingly more popular. High demand within regional markets has motivated car service companies and other service-related businesses to look for companies that promise apps with a short development-to-market time-line. As a result, such businesses often work with outside software development agencies that sell out-of-the-box solutions, also known as "white label" apps. In today's digital world, white label often refers to a product or software app whose development and branding can be customized according to the particular requirements and branding needs of a reseller.

Conventionally, there have been two approaches to building white label apps. First, a company would maintain its original back-end codebase but change the front-end of the app to give a different appearance which matches or complies with the reseller's branding needs. Second, a company would create a multi-user or multi-tenant app (i.e., where the app instance would remain the same for each tenant, but each tenant would receive its own app with a slightly different set of features). Typically, this multi-user model is used for Software-as-a-Service (SaaS) (i.e., a software distribution model in which a third-party provider hosts apps and makes them available to customers over the Internet) and can be more complex to build and maintain. Irrespective of the approach used to develop the white label app, such white label service or dispatching apps often come in packages that include at least an app for service providers and/or an app for customers.

In most cases, white label apps have limited customization. In other words, white label apps tend to include a set of core features that can only be partially customized, such as labelling, color schemes, etc. (i.e., with respect to the front-end of the app). At the same time, white label apps often have a very basic set of features that are optimal for an average app of their type, and therefore, will not suffice for a company requiring complex business logic. On the customer side, it is often inconvenient to download a plurality of different dispatching apps, and/or to download a single dispatching app with access to only one service company having a limited number of service providers (i.e., a driver, home aid, etc.) who may or may not be available or able to meet the user's needs for a particular service request. Even if the customer (i.e., a passenger, a patient, etc.) downloads multiple apps, he/she may need to separately contact multiple service companies through these multiple apps in order to find suitable service. Moreover, a plurality of apps can take up space on smartphones, shorten battery life, and potentially cause confusion for the customer. In particular, space on the display screen of a mobile phone is a limited resource which is often filled with too many apps. Users frequently have to swipe their screen to a new blank screen or a partially filled screen in order to fit more apps. When a mobile phone has a number of different applications, the user often has to locate and start each application, and then needs to navigate various functionalities and figure out how they work, which can be time consuming. The inability of customers to quickly and efficiently have regular access to a number of private entities, and the need to download a plurality of apps, complete many registrations, navigate multiple apps, and/or repeatedly input user information for access thereto, is a technical problem in the mobile application and mobile e-commerce and on-line e-commerce industries. Improved and simplified user interfaces and functionalities which allow for quicker and more efficient data access are needed in the art.

In an on-line e-commerce context, one of the problems a small or mid-sized business entity encounters when contracting with a marketing company to market the business entity's brand on, for example, a popular online purchasing site, is that the marketing company is typically most interested in marketing its own brand or the brand of the entity which owns the online purchasing site. The business entity's logo may be inconspicuously listed in small font and/or displayed at the bottom of a long list of other businesses providing the same goods. In certain situations, the business entity's goods may be conspicuously displayed (e.g., an enlarged picture of a chair), but the business entity's brand/logo or name may be in small font and the marketing company's logo or the logo of the entity which owns the online purchasing site may be enlarged or otherwise conspicuous. Consumers who purchase, for example, the business entity's goods through the online purchasing site may not know or remember that they are purchasing goods from the business entity, and the business entity may be less likely to retain the consumer as a future customer, even if the customer likes the product. In future transactions, the consumer may, for example, go to the purchasing site, do an additional search for the good, and make a selection from another business entity. As a result, small and mid-sized companies are often taken advantage of by large companies in that they are unable to build their direct customer base, and must instead rely on business through the larger company's online website. Technology is needed in the art by which smaller companies can gain a better footing in the market through establishing direct and ongoing connections with online consumers who are satisfied with their products and services.

It will therefore be appreciated that an improved system and method is needed in the art to address these deficiencies.

SUMMARY OF THE INVENTION

This summary is not intended to identify or point to essential features or limit the scope of the subject matter claimed herein. The inventive disclosure relates to an improved convertible software application management system, platform, method, and display thereof, having a shared data-access layer in a distributed structure system for customizable data processing for a user application at least in the transportation, home healthcare, hotel, shipping, food, entertainment, and other service industries, with at least the following objectives:

To provide an improved dispatching application that enables dispatching service entities or providers (DSPs) and/or connection to business entities which provide goods and/or services (e.g., transportation bases, entertainment companies, hotel, home healthcare companies, shipping companies, restaurants, entertainment companies, etc.) using white label applications to work together, in the same or different industries, under an application having a shared or common back-end software code;

To provide a combined or otherwise linked system of dispatching apps (i.e., DSP apps with white label apps) in order to create a more streamlined and efficient dispatching method and system for both the DSPs and the white label dispatching companies through mobile apps;

To provide a user convertible software application management system and method having a shared data-access layer in a distributed structure system for providing customizable data processing for user applications in various services-related industries (e.g., transportation bases, entertainment companies, hotel real estate companies, home healthcare companies, shipping companies, restaurants, entertainment companies, etc.);

To provide an efficient mobile app to promote a cooperative relationship between DSPs, service providing entities, and service entities or bases using white label apps;

To provide, in the base-customized customer app, a customer conversion option to request service from the same base service providers, from one or more other base company service providers or entities, or from all the service entities registered with the DSP's system;

To provide a customized back-end codebase configured such that all white label apps may communicate with or through a single back-end codebase of the software application;

To provide a service entity app enabling the base company to configure the app remotely such that its service entities may accept jobs or service requests from the same base's users or customers, from one or more other bases' users or customers, or from all DSP users or customers;

To provide an app whereby administrators for the base company can customize or modify the configuration of the white label app through the DSP app or web portal;

To provide a user app enabling the customer to prioritize service requests to the base service providers, and optionally, to request service from the DSP system or from one or more additional base service providers;

To provide a service entity app enabling the service providers to prioritize receiving service requests from its own base company, or from other base companies;

To provide a user app and/or service entity app whereby the app's configuration may be established by default using a support number or email;

To provide a convertible user or customer app which provides access to service providers from a plurality of service entities, white label companies, and/or DSPs, all using the same back-end dispatch software, thus increasing the probability of and the efficiency in a customer finding a suitable service provider for his/her needs and allowing for a more uniform dispatching service encompassing multiple companies;

To enable simplified importation and exportation of data to and from the server or database in a combined or otherwise linked system of dispatching apps;

To provide a service entity app having a customized front-end such that the app name, icon, store logo, screenshots, description, etc., are customized according to the base service entity's needs, and such that the base company has its own play store page or app store page to promote or encourage its users and service providers to use the service entity app;

To enhance brand building for small, mid-size, and starting e-commerce businesses, and to allow such businesses to compete with larger e-commerce businesses through access to the back end applications of other e-commerce businesses;

To enable each e-commerce business to release its own convertible user application on an App Store where users download the app;

To allow connected business entities to restrict one another other with regard to which of their connected business entities may be displayed to customers;

To allow a business entity to obtain business from other of its connected business entities who have their own books of business (e.g. customers who have downloaded their own "white label" apps), and who may route customer(s) to their connected business entities if they do not have the current capacity, personnel, or capability of handling particular customer requests; and To provide adjustable search parameters in the menu of a user interface to allow users to conduct searches based on keywords, price, ratings, certifications, walking distance, walking time, etc.

The disclosed invention provides a computing device comprising a display screen, the computing device configured to: display, on a graphical user interface (GUI) of the computing device, an application image representative of a first application program having a customizable front-end, wherein the first application program is associated with a service entity; upon selection of the application image by a user, launch the application program by displaying on the GUI an interactive electronic interface depicting at least a toggle selectable by the user to switch between a first application state and a second application state; and one of display, in response to a selection of the first application state, an interactive electronic interface including identifications of one or more available objects of the service entity that match a service request associated with the user; or display, in response to a selection of the second application state, the interactive electronic interface including identifications of one or more available objects of a plurality of service entities that match the service request associated with the user, wherein the plurality of service entities are communicatively coupled via a network.

In certain embodiments, the disclosed invention provides a computing device further configured to, in response to the selection of the second application state: display on the interactive electronic interface a selectable menu comprising the plurality of service entities; and display, in response to a selection of at least one of the plurality of service entities, identifications of one or more available objects that match the service request associated with the user, wherein the one or more available objects correspond to the selected one or more of the plurality of service entities. The device may also be configured to, in response to the selection of the first application state or the second application state: display on the interactive electronic interface a menu depicting at least one or more adjustable search parameters, each of the one or more parameters being selectable to launch a display function for each of the one or more parameters to be simultaneously seen on the display screen, wherein, in response to one or more inputs from the user indicative of at least one of the one or more search parameters, display the interactive electronic interface including the identifications of the one or more available objects of the plurality of service entities, wherein the one or more sets of indicators are selectable by the user. The device may alternatively be configured to, in response to the one or more inputs by the user: display on the interface, in accordance with the one or more adjustable search parameters selected by the user, one or more sets of indicators corresponding to each of the one or more available objects of the plurality of service entities, wherein the one or more available objects are matched with the service request based on one or more service relevant factors for (i) the one or more available objects, (ii) a service entity, or (iii) the user associated with the service request, the one or more service relevant factors including at least one of: (a) one or more optionally preset preferences of the one or more available objects, or the service entity; (b) one or more optionally preset limitations, a favorite user list, a preferred user list, or a user blacklist of the one or more available objects, or the service entity; or (c) one or more optionally preset preferences, a favorite object list, a favorite service entity list, a preferred object list, a preferred service entity list, an object blacklist, or a service entity blacklist, of the user.

In yet another embodiment, the computing device may be further configured to, prior to displaying the identifications of the one or more available objects: receive the service request via an application program and store the service request in a database; and (i) in response to the selection of the first application state, query, via the application program, at least a portion of the database allocated to the service entity to identify one or more available objects associated with the service entity; or (ii) in response to the selection of the second application state, query, via the application program, one or more portions of the database allocated to the plurality of service entities to identify one or more available objects associated with the plurality of service entities, and wherein the device may further be configured to, when assigning the one object of the one or more objects to the service request: preclude at least (i) one object or (ii) one service entity from being assigned the service request for being incompatible based on the service relevant factors; match the service request with one object of the one or more available objects based on the service relevant factors; and assign the one object of the one or more available objects to the service request based on a plurality of predetermined rules. In still another embodiment, the computing device may be further configured to: determine a proximity, via global positioning system (GPS) tracking, of the one or more objects in relation to a location of the user associated with the service request; transmit the service request to one of the one or more objects based on the proximity to the location; receive an acceptance from the one of the one or more objects; and assign the one of the one or more objects to the service request, wherein the first application program and each application program associated with the plurality of service entities have independent and customizable front-ends, wherein the independent and customizable front-ends are expressed as at least one of: an application name, an icon, a company logo, screenshots, or a description, and wherein the interactive electronic interface comprises an interactive electronic map interface.

The disclosed invention also provides a computing platform linked to a database for customizable data processing and having a shared data-access layer in a distributed structure system, the platform comprising: a server communicatively coupled to a network and including a processor, an apportioned database containing portions allocated to at least a first service entity and a second service entity, and at least one non-transitory computer-readable storage medium with computer-readable instructions stored therein, wherein the processor executes the computer-readable instructions to: display, on a GUI of a remote computing device of a user, an application image representative of a first application program or a second application program, wherein the first application program is associated with the first service entity and the second application program is associated with the second service entity, and wherein the first application program and the second application program have independent and customizable front-ends; upon receiving a selection of the user to launch the first application program, display an interactive electronic interface depicting at least a toggle selectable by the user to switch between a first application state and a second application state, wherein: (i) in response to a selection of the first application state by the user, display the interactive electronic interface including identifications of one or more available objects of the first service entity that match a service request associated with the user; or (ii) in response to a selection of the second application state by the user, display the interactive electronic interface including identifications of the one or more available objects of the first or second service entities that match the service request, wherein the one or more available objects correspond to at least one of the first service entity or the second service entity; receive a selection of one object of the one or more available objects by the user; and assign the one object to perform a service request of the user.

In another embodiment, the first application program and the second application program of the computing platform may be communicatively linked via the network to at least partially shared back-end server containing a shared back-end application software codebase. The computing platform may also, in response to the one or more inputs by the user, further executes the computer-readable instructions to: display on the interface, in accordance with one or more inputs provided by the user for the one or more adjustable search parameters, one or more identifications of: (i) a maximum number of the one or more available service providers, (ii) the one or more available service providers within a time span for arrival to a location of the user, (iii) the one or more available service providers within a distance span for arrival to the location, or (iv) one or more additional users within the time span or the distance span.

The disclosed invention also provides a computing platform linked to a database for customizable data processing and having a shared data-access layer in a distributed structure system, the platform comprising: a server communicatively coupled to a network and including a processor, an apportioned database containing portions allocated to at least a first service entity and a second service entity, and at least one non-transitory computer-readable storage medium having computer-readable instructions stored therein, wherein the processor executes the computer-readable instructions to: receive a service request via a first application program, wherein the first application program corresponds to the first service entity and is communicatively linked, via the network, to the server; store the service request via the first application program in the database; query, via the first application program in a first application state, at least a first portion of the database allocated to the first service entity to identify one or more objects associated with the first service entity that match the service request; in response to not identifying the one or more objects in the first portion of the database, switch to a second application state of the first application program to query at least a second portion of the database allocated to the second service entity to identify one or more objects associated with the second service entity; in response to identifying the one or more objects associated with the second entity, retrieve, from the second portion of the database, one or more service relevant factors for (i) the one or more objects associated with the second service entity, (ii) the second service entity, or (iii) a user associated with the service request; match the service request with one object of the one or more objects associated with the second service entity based on the one or more service relevant factors; and assign the one object to the service request based on the match and in accordance with a plurality of predetermined rules.

In yet further embodiments of the computing platform, the processor may further execute the computer-readable instructions to: in response to not identifying the one or more objects associated with an entity or failing by the entity to assign the one object to the service request, apply one or more entity preference rules, preset by the entity, for searching the database for one or more objects associated with one or more other entities of the platform, wherein the one or more entity preference rules dictate at least one condition of the entity, and wherein default rules of the platform apply as a result of the entity lacking the one or more entity preference rules. In another embodiment, the computing platform may, upon determination that the first entity failed to identify the one or more objects or failed to assign the one of the one or more objects, further execute the computer-readable instructions to: generate a communication between the user associated with the at least one service request and the platform, wherein the communication requests permission from the customer to query at least a second portion of the database allocated to the second service entity to identify one or more objects associated with the second service entity, or track an application program originally used by the user to submit the service request, wherein the service request was the initial service request submitted through the application program, and periodically provide an origination reward, in accordance with the plurality of predetermined rules, to an entity associated with the application program.

In yet a further embodiment, the computing platform may, when assigning the one of the one or more objects, further execute the computer-readable instructions to: establish a weighted priority for the one or more objects associated with the first or the second service entity, wherein the weighted priority is based on assigned weights for each of the one or more service relevant factors in accordance with a plurality of predetermined rules; generate a data table for the one or more objects including a priority assignment for each object of the one or more objects, wherein the data table contains, in accordance with the plurality of predetermined rules, a ranked compatibility, expressed in terms of weights, between the service request and each object of the one or more objects based on the weighted priority and another factor comprising at least one of: availability of an object to accept the service request, an object type for the service request, or a user type for each object of the one or more objects; and assign the one of the one or more objects associated with the first or second service entity to the service request in accordance with the weighted priority and the plurality of predetermined rules. Alternatively, the computing platform may include a platform application program associated with the platform, a first application program, and a second application program each having independent and customizable front-ends that may be expressed as at least one of: an application name, an icon, a company logo, screenshots, or a description.

Other objects, features, and characteristics of the inventive disclosure, as well as the methods of operation and functions of the related structural elements, and the combination of parts and economies of development and manufacture, will become more apparent upon consideration of the detailed description below with reference to the accompanying drawings, all of which form a part of this specification.

BRIEF DESCRIPTION OF THE DRAWINGS

A further understanding of the inventive disclosure can be obtained by reference to preferred embodiments set forth in the illustrations of the accompanying drawings. The drawings are not intended to limit the scope of the inventive disclosure, which is set forth with particularity in the claims as appended or as subsequently amended, but merely to clarify and exemplify the inventive disclosure. Accordingly, a more complete appreciation of the inventive disclosure and many of the attendant aspects thereof may be readily obtained as the same becomes better understood by reference to the following detailed description when considered in conjunction with the accompanying drawings, where:

DETAILED DESCRIPTION OF THE PREFERRED EMBODIMENT

Figure 1A:
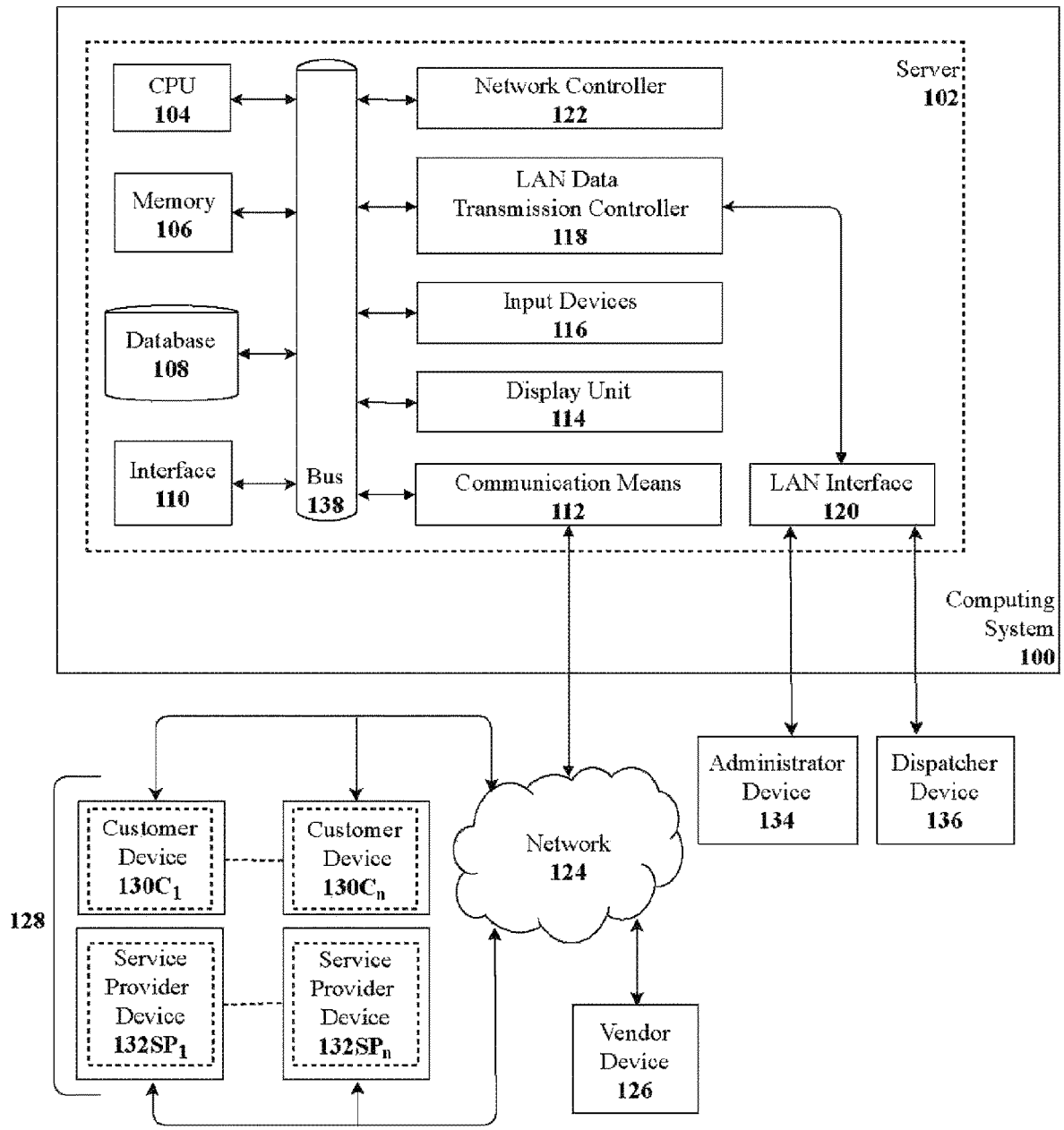
FIG. 1A illustrates an exemplary management system having a shared data-access layer in a distributed structure system for customizable data processing for a customer convertible application in at least the transportation, home healthcare, delivery, and other service-related industries, in accordance with an exemplary embodiment of the inventive disclosure.

The present disclosure is not intended to be limited to the specific terminology so selected, and it is to be understood that each specific element includes all technical equivalents which operate in a similar manner. Specific embodiments that may be practiced are shown by way of illustration and explanation. The embodiments are described in sufficient detail to enable those skilled in the art to practice the embodiments, and it is to be understood that logical, mechanical, and other changes may be made without departing from the scope of the embodiments. The following detailed description is therefore not to be taken in a limiting sense. In describing exemplary embodiments of the inventive disclosure illustrated in the drawings, specific terminology is employed for sake of clarity.

Each element in the flowcharts herein depicts a step or a group of steps of a computer-implemented method, and each step may contain one or more sub-steps. For purposes of illustration, these steps (as well as any and all other steps identified and described) are presented in a certain logical order. However, it will be appreciated that any exemplary embodiment described herein can contain an alternate order of the steps adapted to a particular application of a technique disclosed herein, and that any variations and/or modifications are intended to fall within the scope of this inventive disclosure. The depiction and description of steps in any particular order is not intended to exclude embodiments having the steps in a different order, unless required by a particular application, explicitly stated, or otherwise clear from the context.

While systems and methods for providing dispatch, transport, entertainment, real estate, home healthcare, shipping, restaurants, etc. for various goods and services, it will be appreciated by one of ordinary skill in the art that the inventive disclosure may be utilized in other goods and services industries. Additionally, it will be appreciated that one or more of such exemplary embodiments may be carried out using various programmatic engines, programmatic modules, or other hardware or software components comprising one or more routines or one or more subroutines, which may be used individually or in combination, and carried out on any appropriate technological means.

It will also be appreciated that various modules of the systems, platforms and methods described herein may be implemented in part by using an interfacing mobile app on an internet-enabled mobile device's operating system, such as, for example, Android, iOS, or Windows Phone OS, and in part by using a web portal interface, and that different types of users may utilize different functionalities of the system. Such users or subscribers can include, for example, one or more "driver(s)," "home aid(s)," "service provider(s)," "customer(s)," "patient(s)," "passenger(s)," "booking agent(s)," "business entities", guests, visitors, consumers, online consumers, etc., which herein can include anyone, including, for example, one or more individuals, entities, or one or more individuals from an entity, who provide or request services, regardless of the type of services they may be (e.g., transport, delivery, healthcare, booking, etc.). As service providers, home aids, patients, agents, passengers, and customers alike may use the methods and systems described herein, all may generally be referred to as a "user" or "users" in addition to being referred to by specific user types corresponding to their roles.

"Services" herein can refer to any type of service that may be provided by a service provider, including but not limited to transport service, delivery service, healthcare service, etc. In accordance with exemplary embodiments of the inventive disclosure, such services can be "prescheduled" or provided "on-demand," in accordance with the embodiments discussed with respect to any of the embodiments disclosed in U.S. patent application Ser. No. 15/239,783, entitled "Method and System for On-Demand Customized Services" ("the '783 application"), U.S. patent application Ser. No. 15/715,012, entitled "System and Method for Customizable Prescheduled Dispatching for Transportation Services", and U.S. Provisional Patent Application No. 62/598,292, entitled "System and Method for Customizable Dispatch Scheduling for Home Health Care Services", each of which is hereby incorporated by reference herein in its entirety. On-demand herein is meant to further define when services take place in real-time, as requested, and is used in opposition to the notion of being prescheduled or occurring at a future fixed time, such as a couple hours or days later. Furthermore, "customized" modifies the nature of the services, and refers to the preferences or limitations of a service provider involved in providing the services on an individual basis, to the preferences or limitations of a base or service entity for the service providers, and to the preferences or limitations of the passenger or customer. Regardless of the type of service, "service providing entity" or "service entity" herein refers to base companies (i.e., dispatching or other) who can be summoned to provide service providers for transport services, delivery services, healthcare services, etc. "Dispatcher(s)" herein may include a party which manages service request(s) and operates various scheduling and/or prescheduling functionalities. "Vendors" herein may refer to a broker or other business entity, government office, or individual who brokers a service between customers, passengers, third parties, service providers, and/or service entities. As described herein, each of these different roles may be referred to specifically or by the catch-all terms "user" or "users" that register in or are otherwise directly or indirectly associated with the system.

A request for any type of service is generally referred to as a "service request" throughout the disclosure. In accordance with exemplary embodiments of the inventive disclosure, a service request is assigned to a service provider of a service entity based on preset preference(s) and/or limitations of the service provider or service entity, as well as the preference(s) and/or limitations of the passenger or customer. Priority is given to certain service providers for certain service requests based on one or more attributes, service relevant factors, or prior service requests. The term "preference" as used herein with regard to customers refers to one or more factors about a particular service that a customer would like included in the overall service provided to him/her in terms of the particular service provider, and any attributes related thereto. These preferences may represent ideal or favored conditions for the service request. Alternatively, such preferences may represent preconditions for particular service. A customer can set his/her preferences on a mobile device and update them at any point, allowing the customer to feel comfortable, and in the end, satisfied with the quality of services received. Alternatively, preferences as used herein with regard to service providers or service entities may refer to various factors about a particular service that a service provider or service entity would like provide, such as a geographical location for providing services, the type of services to be provided, the time periods to provide them, etc.

In accordance with exemplary embodiments of the inventive disclosure, the term "limitations" as used herein with regard to a service provider or service entity can mean any type of constraint that a service provider or service entity may wish to place upon a service he/she provides. These limitations may include personal limitations regarding when, where, how, and to whom a service provider or service entity provides services or may include legal limitations which are imposed on the service provider by law, ordinance or other regulation resulting in the service provider not being able to provide services in certain geographic zones or at certain times (e.g., in the transportation industry, legal limitations may be based on the rules imposed by the New York City Taxi and Limousine Commission (TLC), where TLC drivers are not allowed to work more than twelve consecutive hours per day or more than seventy-two hours per week). Personal limitations may include location limitations based on a provider's reluctance to provide services in certain geographic zones, and/or time limitations based on a provider's reluctance to provide service within certain time periods. Alternatively, in certain preferred embodiments, a provider may also specify one or more preset location preferences based on a provider's desire to provide services to (e.g., preference to receive work within) certain geographic zones. In such embodiments, the provider may also specify location limitations within his/her location preferences based on the provider's reluctance or inability to provide services in certain geographic zones within the provider's preferred geographic zone of service. Service limitations may additionally or alternatively relate to times or time frames when the provider might not want to provide service. Such times can include hours of the day, days of the week, times of year, etc. Providers can also set limitations for both location and time. For example, a provider may not want to provide service in a certain area past 10 PM but is willing to provide service in another area past that time. In such embodiments, the provider may also specify time preferences indicative of a time period during which the provider prefers to receive service requests. A provider can have one or more such limitations and/or preferences. The terms preferences and limitations are not intended to limit a customer or provider to only having a preference or a limitation. Rather, they are intended to draw an illustrative contrast.

In accordance with exemplary embodiments of the inventive disclosure, multiple terms may be used to refer to a customer who has an established positive relationship with a provider. A "favorite customer" is one who is on a service provider's favorite customer list. A service provider having an established positive relationship with a customer is referred to as a "favorite service provider" (e.g., on a customer's favorite service provider list). A service entity having an established positive relationship with a customer may be referred to as a "favorite service entity" (e.g., on a customer's favorite service entity list). The term "favorite" as used herein is meant to be broadly construed and refers to any customer or provider who is prioritized in an assignment of a service request (e.g., on a favorite list). It will be understood by one skilled in the art that the concept of a favorite list may alternatively be referenced as, for example, a friend, a top, a priority, or any other word used by providers or customers to define the concept of such list. Regardless of specific terminology, the intention as a top priority is to denote the concept of a positive provider-customer relationship which encompasses matching between the provider and the customer.

In contrast to a favorite list, a provider's "blacklist" or a customer's "blacklist" as used herein refers to lists which can prevent a match between a service provider and a customer or between a customer and an entire service entity in the future (e.g., where both are precluded from service request processing). It will be appreciated by one skilled in the art that other terms may be used to describe this concept, such as, for example, "block list," "ban list," "dislike list," or the like. Regardless of specific terminology, the intention is to denote the concept of, for example, a service provider excluding customers to whom he/she does not want to provide service, or with whom he/she does not want to have contact, and a way for a customer to exclude the service providers or entire service entities from whom he/she does not want service or contact.

A customer may additionally or alternatively have a "preferred" service provider or service entity. A preferred service provider or service entity is one that is not on the customer's favorite list, either because the customer has directly requested the service provider/service entity to be on his/her "preferred list," or one that the customer has requested to be on his/her favorite's list, but the request has not been approved of/agreed to or has been disapproved of/rejected by the service provider/service entity. In either case, if the service provider refuses a customer's request, then the service provider will not be added to the customer's favorite list, and vice versa. Thus, in preferred embodiments, service providers and customers are placed on each other's favorite lists only when both parties agree, and on preferred lists when one or both parties directly request to be the other's favorite but the other either does not respond or does not otherwise approve of such request. Customers and service entities may also be on each other's respective favorite lists, preferred lists, or blacklists in a similar manner. The word preferred as used herein generally refers to a lower ranking than favorite for purposes of matching customers and providers when assigning service requests. Service providers and customers may further rank each other within these classifications as further discussed herein. In certain embodiments, any service provider who is not a favorite service provider or a preferred service provider of a customer is referred to herein as a "regular" service provider. This term essentially means that the service provider is not a preferred service provider, has not been added to the favorite list and is not on the customer's blacklist. It will be understood that a particular status relating to a provider (i.e., provider type), be it favorite, preferred or regular, is also relative (i.e., a preferred provider for one customer might be a favorite for another).

The term "system" herein is referred to the implementation through a combination of hardware and software that operates a portable computing device, which comprises various pre-programmed features combined and integrated with basic components including but not limited to one or more servers, databases, mobile end applications, web portals, network settings, etc. With the support of these components, the system provides the services through user interfaces, such as a website or a mobile app. In addition, the system may have more than one server that may be in a distributed structure with support from data centers that may be located anywhere around the world. These implementations may be communicatively linked and cross-platformed so that a customer may be provided with the information relevant to their service request. The term "cross-platform" or "cross-platformed" as used herein means the ability to function on more than one computer architecture, operating system, application software, application programming interface (API), web application, etc. The term "indicator" as used herein is a means to transmit or display information or service relevant factors related to services for a customer, a service provider or a service entity or any combination thereof in a simple, fast, and convenient way.

Various embodiments of systems described herein can provide prescheduling and/or on-demand transportation or other services through a computing system including any combination of hardware and software and can communicate with a plurality of portable computing devices through, for example, a wide-area, packet switched network, which can allow users to access various pre-programmed features combined and integrated with basic components. Such features and components can include but are not limited to one or more servers, databases, mobile end applications, web portals, network settings, etc. within a communications framework or network. With the support of these components, the systems described herein provide services through user interfaces, such as, for example, a website or a mobile application on a portable computing device. The systems may also include more than one server operatively disposed in a distributed structure with support from data centers that may be located anywhere around the world. Additionally, certain embodiments of the systems described herein are not limited to applications involving conventional computer programs or programmable apparatuses that run them. It is contemplated, for example, that embodiments of the inventive disclosure could include an optical computer, a quantum computer, an analog computer, or the like.

While one application for embodiments of the inventive disclosure described and discussed herein applies to a transportation service industry, alternative applications, pertaining to other goods and services-related industries (e.g., e-commerce) are also contemplated and further discussed below. In alternative embodiments of the inventive disclosure, the user convertible application may be employed for dispatching home health care service providers, delivery service providers, etc. Such embodiments may include systems and methods for providing on-demand or prescheduled home health care services by way of service providing entities having a shared data-access layer in a distributed structure system for customizable data processing. The user convertible application in the home healthcare services industry may be configured to receive one or more service requests and schedule service based on caregiver availability and customizable parameters and/or preferences which establish priority and/or compatibility between individual patients and caregivers. In yet another exemplary embodiment, the user convertible application may be employed for dispatching delivery service providers. Additionally, it will be appreciated that such exemplary embodiments may be carried or employed in additional service-related industries in accordance with the inventive disclosure provided herein.

In the transportation management and dispatching industry, for example, the use of mobile apps has become commonplace, for example, to enable passengers to book rides, to provide service providers with means for accepting jobs, etc. Accordingly, the need for customizable mobile apps specifically tailored to each dispatching company's business needs has grown. To meet this need, two options have come to the forefront for such dispatching companies—custom-built apps, or white label apps. Custom-built apps are created from the ground-up and are constructed to the specifications requested by a client. Many developers use some templated code to expedite the construction of custom-built apps. However, the bulk of their structure and source code is tailor-made to the client. The end result is typically an excellently branded event app unique to the client. However, such uniqueness is expensive, requires a longer development cycle, and requires each app to be submitted, approved and published by an App Store for it to be used. Additionally, if the app is received with bugs or problems, then the client will be responsible for fixing such bugs, either themselves or through the extension of a service contract with the app developer or other specialist.

Alternatively, while custom-built apps may use some templates to expedite the development process, other apps (i.e., white label apps) may be predicated on being templated. With such templated white label apps, clients receive a specifically branded app typically comprising access to a variety of modules, but at the cost of uniqueness in both design and functionality. An advantage of templated white label apps is that they are much less expensive and have quicker development cycle. Similar to custom-built apps, templated white label apps include a uniquely branded icon, and must be submitted for review in order to be published. Templated apps are template-based, and thus less likely to have bugs, but are nevertheless likely to come with support to correct any software bugs.

It will be appreciated that computer program instructions used by computing system 100 and/or the apps for use with the system may include computer executable code in one of a variety of languages, including without limitation, C, C++, Java, JavaScript, Python, assembly language, Lisp, and so on. Certain logical functions may need to be implemented to provide highly specific and tailored services for customers and service providers for the technical challenges that need to be solved. These logical functions may be pre-programmed to accommodate various preferences and limitations and may be exceedingly complex to carry out particular if-then scenarios. Rules may be established that identify certain parameters. In this manner, many complex conditions may be accounted for, and service providers and customers can be filtered by chaining logical functions based on those filters. Various language features can be utilized and programmed and implemented through programming languages such as Java. Such languages may include assembly languages, hardware description languages, database programming languages, functional programming languages, imperative programming languages, and so on. In certain embodiments, computer program instructions can be stored, compiled, or interpreted to run on a computer, a programmable data processing apparatus, a heterogeneous combination of processors or processor architectures, etc.

In accordance with an exemplary embodiment of the inventive disclosure, a user convertible mobile application platform and display are provided whereby a DSP or service providing entity (SPE) and a plurality of base service companies can operate under a single application platform back-end. Typically, a DSP is, but need not be, a technology or software company (e.g., licensed or not) that provides a system and/or method to dispatch or otherwise identify and schedule service providers based on customer's requests through a plurality of service companies. While the disclosure generally refers to DSP as the provider of the back-end dispatching codebase, it will be appreciated by one of skill in the art that such back-end codebase may alternatively be provided by any other technology or software providing company. In certain embodiments, a user convertible application management system and method is provided which has a shared data-access layer in a distributed structure system for customizable processing of service requests in at least the transportation, home healthcare, delivery, and other service industries. The inventive disclosure provides a combined or otherwise linked system of dispatching apps in order to create a convertible, streamlined, efficient, and customizable system for service dispatching, service demanding, service requesting, services scheduling, etc., for DSPs, SPEs, white label entities, non-white label entities, or other dispatching entities, as well as for the users or customers who utilize them via mobile apps. As used herein, a "non-white label entity" is a service providing entity or company utilizing the DSP front-end app as well as the DSP back-end software codebase to provide its dispatching services.

Each base company may utilize its own front-end application program but may each utilize the same back-end application (i.e., they all may share the same back-end codebase but may each utilize different front-ends so that each company can be branded in accordance with its own company's needs or requirements). Alternatively, each base company may utilize its own front-end application program to communicate via the network directly with each other to share service providers or objects (e.g., by agreement or otherwise). More specifically, a DSP or SPE may employ its own mobile application platform for operating its services, which may also be licensed out to other service companies or bases for them to use either under the DSP or SPE brand or under their own individual brand. Either way, various companies may utilize a platform having the same back-end codebase such that they can cooperate or otherwise interact smoothly to enable an efficient and seamless partnership or business relationship which helps overcome the deficiencies and/or disadvantages to both DSP apps and white label apps operating independently of one another.

Accordingly, the systems and methods disclosed herein provide a solution to the deficiencies faced by each of the DSPs and the white label dispatch entities or companies by combining or otherwise linking the two in order to create a more streamlined and efficient dispatching system for customers, service providers, DSPs and white label dispatching entities. For example, in an exemplary embodiment, a DSP or SPE having its own dispatching app may outsource the app to one or more service dispatching entities or base companies looking for a white label app to use for providing its dispatching services. In such a scenario, one or more companies may utilize the application software of the DSP or other technology company as its own branded white label app or may use it under the DSP's branding. In either case, the back-end software code is the same for the DSP and each white label customer signed up with the DSP—only the front-end is changed for the white label customers. This combination provides different solutions, for example, where a service dispatch company wants to use the DSP's software app only as a white label app (i.e., under its own branding only), where a service dispatch company wants to use the DSP's software app as a white label app but also desires to share dispatching of service requests with the DSP, where a service dispatch company wants to use the DSP's software app under the DSP's branding, etc. In the first two scenarios, the white label apps utilize the same back-end software code but have different front-ends customized to the brand of each of the different service dispatching companies licensing the DSP app. Additionally, in the second scenario, a company may be able to market its brand to new customers if the system is configured to optionally allow a prospective customer to view the branding of multiple service companies within a single app, and select the service company the customer desires. In other embodiments of the second scenario, the customer will potentially receive rides from service providers from any of a plurality of service companies but will only see the branding of the company whose app they have downloaded. In either of these embodiments of the second scenario, the customer does not see the branding of the software provider (i.e., the branding of the DSP or other technology/software company).

Such arrangements each yield benefits to both the DSP and the dispatching company using the white label app. For example, with truly white label customers, the DSP may receive compensation for licensing its software app, while the white label app customers get the benefit of a software app provided by an industry participant. Where the white label app customer also works with the DSP to share in the dispatching of service providers, the DSP again receives compensation for licensing its software app, and also will receive additional compensation for each service request booked through its app, which is then dispatched to a service provider of the white label customer. This would likely occur when no DSP service providers are available to complete a service request, but a service provider of the white label app company is available. Here, the DSP dispatching system, with the prior approval of the white label app company and/or customer, can directly dispatch the service request to such service provider through the DSP app. Conversely, the white label dispatching system, with the prior approval of the DSP and/or customer, can directly dispatch a service request to a DSP service provider through the white label app. Additionally, customers downloading a DSP's app (e.g., the mobile app provided by a Host Company) can still accept rides from service providers of white label dispatching companies through the same database hosted by the DSP. For customers downloading the white label app, they are provided with a means to opt to allow (or not) the acceptance of service requests from clients or customers of the DSP (i.e., with the DSP's consent). These are possible because both the DSP app and the white label app utilize the same back-end software and therefore are each communicatively linked to the DSP's system database.

In yet another exemplary embodiment, a service dispatching company may wish to merely utilize a DSP's software app with the DSP's branding. For example, a company just starting out with limited resources which has service providers and vehicles but a small customer base may desire such an arrangement as it avoids white label application costs and enables the service dispatching company to reap the benefits of being affiliated with a larger, known DSP while offering additional service providers and vehicles to the DSP. Optionally, the system may be configured to track which app (i.e., the DSP app or the white label app) is used by a given customer to book a service request. In certain embodiments, the system may also track from which company the customer originally requested service (e.g., which app the customer first downloaded and used for the initial service request) and pay out origination fees even if the customer subsequently begins using another white label app from a different company, requests service providers from another company, and/or uses the app of the software company or DSP directly.

It will be appreciated that the systems and methodologies disclosed herein provide functionalities which allow for a much smoother and more efficient process overall than those of conventional dispatch service methods. Those skilled in the art will appreciate that these functions are merely examples, and that other functionalities of the provider's interface may be utilized. One of ordinary skill in the art will appreciate that exemplary embodiments of the inventive disclosure may be contemplated for use with a different kind of a computing device, and that a computing device may vary in components from the ones described therein.

The systems and methods described herein are best understood with reference to the drawings, which are described in detail below. Referring first to FIG. 1A, illustrated is a diagram of an exemplary computing system 100 and a plurality of peripheral computing devices 128 for use with various exemplary embodiments of the inventive disclosure. A combination of hardware and software operates on a plurality of computing devices 128 and computing system 100, generally with one or more connections to wired or wireless network 124 (e.g., wide area network (WAN)) (e.g., the Internet), incorporated with local devices through a local area network (LAN) interface 120. Computing devices 128 can include one or more wireless mobile hardware devices having software capable of communicating information to other mobile devices or computer systems, determining the location of the device with a location identifier having geographical position location capability (e.g., through triangulation of a cell system, GPS, by location specification from the user, etc.), and connecting to a private computer network or public network such as the Internet through network 124. It will be appreciated that other satellite navigation systems that provide autonomous geo-spatial positioning with global coverage (i.e., Global Navigation Satellite Systems or "GNSSs"), which include, for example, GLONASS, Galileo, IRNSS, QZSS, Beidou, and other regional systems, may be used in accordance with the inventive disclosure. Computing devices 128 may include devices used by any one or more of the objects or drivers or home aides or service providers or the constituents or passengers or patients or customers associated with any number of dispatching centers or service entities. For example, one or more service dispatching companies may utilize the dispatching platform provided by a DSP, either directly or as a white label customer, whereby the back-end codebase used by each is the same and can provide an integrated or shared relationship so as to enable the various customers to engage in a seamless working relationship to maximize the business potential for everyone.

Computing system 100 can include, for example, server 102 including processor or central processing unit (i.e., CPU) 104, memory unit 106, database 108, interface 110, communication means 112, display unit 114, one or more input devices 116 (e.g., keyboard, mouse, microphone, etc.), LAN data transmission controller 118, LAN interface 120, network controller 122, and internal bus 138. System 100 may alternatively be connected to a data storage device, such as, for example, a hard disk disposing one or more databases 108 via a wired or wireless link. Computing system 100 may also include more than one server configured the same or similar to server 102, or one or more servers configured in different manners, for example, disposing different hardware or software (e.g., computing system 100 may comprise multiple servers hosted in multiple spaces such as data centers or server farms).

Computing system 100 may be configured to communicate with a network service coordinated through a communication means 112, which may include any approach for communicating data over one or more networks or to one or more peripheral devices. Communication means 112 may include, but is not limited to, circuitry and control systems for providing wireless connections, wired connections, cellular connections, data port connections, Bluetooth® connections, or any combination thereof, and the means may include devices enabled to communicate using such communication approaches. One of ordinary skill in the art will appreciate that there are numerous approaches to communications that may be utilized.

Server 102 and computing system 100 may be communicatively linked, through communication means 112 and network 124, to peripheral devices such as computing devices 128 and vendor device 126, and to administrator device 134 and dispatcher device 136 through, for example, LAN interface 120. Computing devices 128 may be configured as one or more customer computing devices 130C1-130Cn and/or service provider computing devices 132SP1-132SPn. Computing devices 128 may be devices (e.g., smartphone, smartwatch, etc.) which allow a user (e.g., customer, passenger, constituent, patient, agent, service provider, object, health aid, healthcare provider, delivery agent, etc.) to interact with the computing system 100. Any number (e.g., 1, 2, 3 . . . n) of service provider/object devices 132SP1 . . . 132SPn, or customer/constituent devices 130C1 . . . 130Cn may be used with computing system 100.

Computing system 100 may have more than one server 102 in a distributed structure with support from data centers that may be located anywhere around the world. These implementations may be communicatively linked and cross-platformed, so that a user on a mobile computing device (e.g., smartphone, tablet, etc.) or stationary computing device (e.g., desktop computer, etc.), may be provided with the information relevant to their service request (e.g., electronic map display, indicators which display information or service relevant factors such as travel times, routes, pricing information, profile/setting information, etc. related to services for a customer, a service provider or a service entity or any combination thereof). Features of the systems described herein can be implemented through computing devices that allow for method steps to be processed and output by a processor. Server 102 may coordinate user interfaces and interact with database 108, and, through a server interface, may receive customer input information, location information, and service request information to configure content, as well as the information from the provider (e.g., location information, limitation information, historical information, etc.). As discussed above, server 102 can send information to one or more computing devices through server interfaces, and information can be output to a display of computing devices 128. Such content may include features that are region-specific if particularly relevant regional information exists, especially with respect to service request mapping or routing, and each user, depending on that user's role and needs, may be provided a different functionality.

The electronic or digital map display may be generated via the application program (e.g., the mobile app) by using a mapping API, such as Google® Maps or Waze®. In some implementations, the map can be displayed on a mobile device's touch screen, which would allow a user to specify the current location, pickup location, drop off location or return location by interacting with the electronic map display interface, enabled by touch screen sensors. A mapping functionality is crucial to dispatch, as it mines GPS data or geolocations to assist a service provider in identifying the customer's pickup location. In addition, with an electronic map display functionality, especially on a touch screen mobile device, a customer may more easily identify the location that is relevant to the service request, in addition to location search functions that may be provided by the same or one or more other APIs, such as mapping APIs, searching APIs, geolocation APIs, etc. Furthermore, APIs may provide information such as distances, routes, estimated times of travel between locations indicated in a service request, images or photographs, weather-related data, etc., which can in part be used to make price estimates, used by a service provider in evaluating potential available customers and used to find other valuable or relevant information for a service provider and a customer. Relevant sets of indicators that apply to mapping or locations may also be laid over the electronic map display of the surrounding area and interacted with by users. These location identifications can be entered through features such as a text box or search box input.

According to an exemplary embodiment of the inventive disclosure, customer computing devices 130 may have a display screen which displays an icon or application image of an application program corresponding to a first service company. This may be displayed as an application icon, an image, a graph, or a link, and may be accessible by the customer to launch the application program. The application program may contain one or more APIs, including an API to search the database for a service provider in order to complete a service request received from the customer. The GUI of the application program corresponding to the service company is communicatively coupled to a shared data-access layer (DAL) in a distributed structure system and is linked to an apportioned database for customizable transportation dispatching, home healthcare dispatching, delivery dispatching, booking, etc., dispatching. A shared DAL in computer software, is a layer of a computer program which provides simplified and shared access to data stored in persistent storage of some kind, such as an entity-relational database. The distributed structure system may, in turn, comprise a second application program, corresponding to a second service entity or company, which may have its own API or set of APIs, and GUI that may be communicatively coupled to the shared data-access layer and the database administered by a DSP company. It will be apparent to one ordinary skilled in the art that the distributed structure system may comprise multiple application programs having their own APIs and corresponding to multiple service entities or companies, each of the service companies having their own portion of the apportioned database. The screen may display data relevant to the service request including an electronic map display, indicators representing information or service relevant factors related to services for a customer, a service provider or a service entity or any combination thereof.

Exemplary embodiments of the system may also adjust customer module features, including the content displayed as part of customer interface features, based on other customer selections and preferences. Exemplary embodiments of the system may include an on-demand transport, delivery, or home healthcare service applications, a map component, a map database, and a location identifier unit, such as, for example, a GPS module, receiver, or other circuitry for providing location-based services (LBS) data. One of ordinary skill in the art will appreciate that there are numerous means for providing location identification and location-based services, and exemplary embodiments of the inventive disclosure are contemplated for use with any such means. A GPS-enabled system or device allows the applications' tracking components to identify the location of customers and service providers individually who are making a service request or are looking to provide service. Based on the customer's current location or service location, the application manager may cause region-specific customer interface features to be output by a customer interface component. A region that is specific to a customer includes the current location or service location in which on-demand service may be provided to the customer. The region may be identified by a zip code or a city name or a metropolitan area name in which the computing device is currently located and may be an area having a predetermined distance or radius from a current location (e.g., one mile), or may be an area that is specifically partitioned from other areas. Based on the customer's region, the application manager may cause region-specific information about the on-demand service to be provided on one or more customer interface features. Region-specific information about the on-demand service may be provided, in part, by the on-demand service system. Preferences or limitations which are location-based depend in part on GPS-enabled (or other GNSS-enabled) devices. As discussed, the on-demand service application may provide location information to the on-demand service system so that the service system may arrange a service to be provided to a customer.

According to an exemplary embodiment of the inventive disclosure, the customer's current location or service request location can be determined by a location identifier. The location identifier can determine the location of the computing device in different ways. In one example, the location identifier can be accomplished through processing of received GPS data from location-based/geo-aware resources of the computing device. In addition, the location identifier can also receive GPS data from other applications or programs that operate on the computing device. For example, the system can communicate with one or more other applications using one or more APIs. The on-demand service application can use the location information to cause a customer interface component to configure a customer interface framework based on the location information. In addition, the on-demand service application can provide the customer's location data to the on-demand service system.

Further, the system may identify the requested pickup location and the actual pickup location, as these two locations may not necessarily be the same. The actual pickup location may be identified, for instance, based on latitude and longitude coordinates. In the first example the requested pickup location is the Grand Central Terminal at the address 89 E 42nd Street New York, N.Y. 10017, and the actual pickup location is 40.7527262, −73.9772294 (latitude & longitude) or 40.45.10, −73.58.38 (in degrees and decimal minutes (DMM)) or may be presented in some other format. One skilled in the art will appreciate that customer's requested and actual pickup and drop off locations may be identified with the assistance of different means including but not limited to interactions with third party software, such as through APIs (e.g., Google® Maps, Foursquare®), or any other software and/or hardware that is used for location identification purposes.

The system may implement one or more geographical information systems (GIS), and one or more databases, which may be arranged in a network connecting to a service provider module, which may include at least a geolocation identifier, a geo-aware camera, and a clock mechanism to identify a current time and date. The system includes a non-transitory computer-readable storage medium that stores instructions to programmatically carry out tasks. One or more servers may be configured to communicate with one or more modules that track information about vehicle activity, and therefore service provider activity, through deriving geolocation data and time data from a geolocation identifier and a clock of a mobile device. A geolocation identifier such as a GPS receiver may be disposed in a vehicle operated by a service provider and may communicate through a wireless network with one or more servers with means for geolocation tracking processing. As a result, the one or more servers may receive the inputs for an actual geolocation and an actual time (i.e., where and when the service request started and ended). Upon geolocation and time data being transmitted, the server can compare the "designated" geolocation to the "actual" geolocation as well as the designated time to the actual time. Herein, "designated" may refer to input received in a service request (e.g., a location entered in as the intended destination of a trip, the location where service is to be performed, etc.), or otherwise identified by the customer, the system, a third-party, etc. In contrast, "actual" may denote an input that is tracked through a module or other enabled device (e.g., a location where a drop off may be indicated as having taken place).

The service request data or information received through the server interface may be stored by computing system 100 in database 108, and may include, for example, the status of service requests, the status of service request acceptances by providers, the reasons from providers for cancelling service requests, the histories associated with assigned service requests, operation logs of dispatchers, etc. The content/timestamps of notifications and confirmation statuses may also be recorded in system logs, and this information can be checked by the administrator of computing system 100. It will be appreciated that this is not an exhaustive list of the operational service request information that the system may record.

Figure 1B:
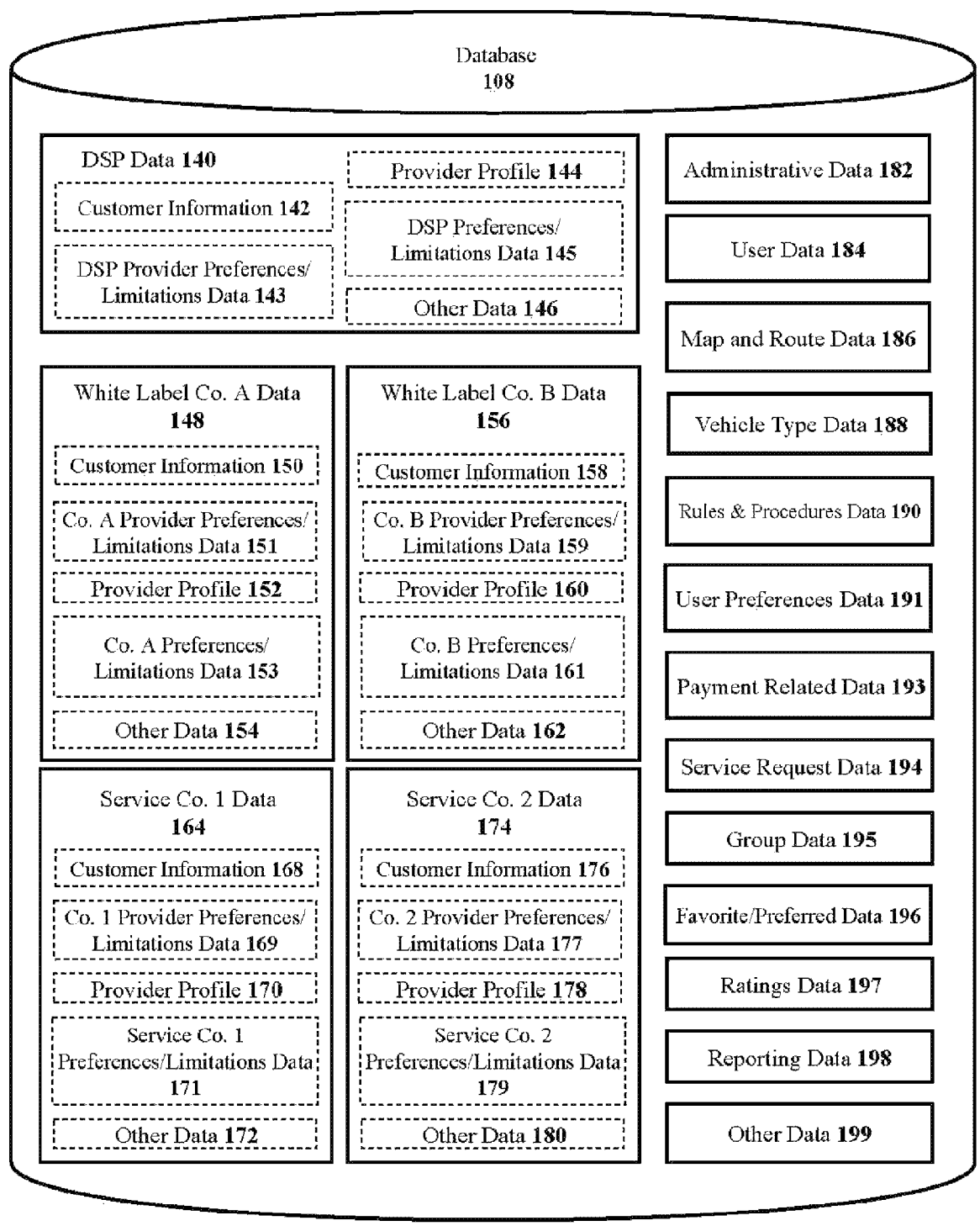
FIG. 1B is a schematic diagram illustrating an exemplary database structure, content, and organization, in accordance with an exemplary embodiment of the inventive disclosure.

Turning now to FIG. 1B, shown is a schematic diagram illustrating an exemplary embodiment of the structure, content and/or organization of database 108 in accordance with the inventive disclosure. The system may employ one database 108 or a set of databases (or data storage media) disposed on a hard disk, one or more hard disks, or other storage means. The information or data in database 108 may be stored in a non-relational or unstructured manner. One of ordinary skill in the art will appreciate that there are numerous methods for providing, storing, and organizing data in database 108 or other data storage media. Additionally, at least one backup database may be provided to back up a primary database periodically in case of data loss in the primary database. While referenced as a "database," one of ordinary skill in the art will appreciate that in practice this could be implemented in numerous ways, including but not limited to a data storage medium, whether structured or unstructured, relational, or otherwise. One of ordinary skill in the art will also appreciate that there are numerous methods of providing databases and data storage media for the organization and retrieval of specific information, contemplated for use with any appropriate database 108 or other storage means. Further, as stated, the exemplary embodiments disclosed herein are contemplated for use with one type of data processed and stored corresponding to one type of customer, though certain embodiments of the inventive disclosure may incorporate multiple types of data corresponding to multiple types of customers, or one type of data corresponding to multiple types of customers, or multiple types of data corresponding to one type of customer.

According to an exemplary embodiment of the inventive disclosure, data can be categorized in database 108 according to different clients using the software application, including the DSP itself, clients using a white label version of the DSP application software (or other software company's software), or clients using the DSP application software interface. Such categories may comprise DSP data 140, white label company A data 148, white label company B data 156, service company 1 data 164, and service company 2 data 174. Of course, the system may be scaled so as to accommodate any number of white label or service companies. As illustrated, DSP data 140 may comprise a plurality of subcategories of data, such as, for example, customer information 142, DSP service provider preferences/limitations data 143, service provider profile 144, DSP preferences/limitations data 145, other data 146, etc. Similarly, each white label company A and company B data 148, 156 may comprise a plurality of subcategories of data, such as, for example, customer information 150, 158, service provider (e.g., Company A & Company B) preferences/limitations data 151, 159, service provider profile 152, 160, Co. A/Co. B preferences/limitations data 153, 161, other data 154, 162, etc., and non-white label service company data (e.g., Service Company 1 Data & Service Company 2 data) 164, 174 may comprise a plurality of subcategories of data, such as, for example, customer information 168, 176, service provider preferences/limitations data 169, 177, service provider profile 170, 178, Co. 1/Co. 2 preferences/limitations data 171, 179, other data 172, 180, etc. The back-end codebase of the DSP software application utilized by each of the DSP, the white label base companies, and the non-white label base companies using the DSP app is preferably configured such that the data in any of the categories may be accessed during processing and/or assignment of data or a service request based on the client's preset configuration, including but not limited to the client's choice as to whether or not to allow service requests from its client(s) to be serviced by service providers from another service company or other type of service entity utilizing the same back-end software app. In this manner, the system enables an interconnection between each of the companies using the DSP's back-end software codebase to give each company additional options when it comes to assigning service providers for service requests.

As also illustrated, database 108 may contain a numerous additional data categories or groupings that establish various data sets, including but not limited to, administrative data 182, user data 184, map and route data 186, vehicle type data 188, rules and procedures data 190, user preferences data 191, payment related data 193, service request data 194, group data 195, favorite/preferred data 196, ratings data 197, reporting data 198, and other data 199. All historical data in the database 108 may also be corrected, updated, supplemented or otherwise modified by real-time data or data that had as of yet been unknown or unavailable. Real-time data is considered to be real-time when one or more users share such data immediately. "Immediately" can be within a predetermined period of time close to the present time, such as fifteen minutes, etc., or may be virtually instantaneous with the present time. If the data does not meet requirements to be considered real-time data, then the data is considered historical data, but may be used to update other historical data already existing/stored in database 108.

Database 108 can also store vehicle type data 188. With respect to the type of vehicle or type of vehicle plate, the data type might correspond to at least the type of vehicle or type of vehicle plate. For example, sedans, SUVs, vans, limousines, etc. may each bear a different type of indicators specialized for their respective capacity or pricing rate, and certain customers can receive data corresponding to at least a vehicle type while precluding data for all other vehicle types. In other words, data corresponding to a particular service request from a customer may be focused to vehicle type, whether based on type of vehicle, vehicle plate, or other specifications. Similarly, map and route data 186 can be stored in database 108. Map and route data 186 might additionally be stored in an individual map database or within a general database, where map and route data 186 can be queried for ETA information through cross reference with traffic conditions, road density, etc. The map component data can store map data for service requests identified by the GPS and LBS. The GPS and LBS data can determine the location of the computing devices in different ways, such as, for example, through receiving location-based resources. Service provider data can include service providers' profiles, such as personal data including a photo of the service provider and years of his/her driving experience, gender, country of origin, and language abilities.

Database 108 can also include user data 184 (i.e., information about the users). A user may be asked to register with the service by providing service provider pertinent information such as name, type of vehicle plate, type of vehicle, the state or country issuing the driver, home aid or other service provider license or certification, a home address, a work address, information concerning types of services being offered or needed, the locations of such services, certifications, areas of expertise, and an email address to create a user ID for each user of the application, which may all be stored in database 108. User IDs may be used for the purposes of tracking reports and ratings made by each user. Credit card and/or debit card information may also be requested for subscriber fees for certain services provided for a certified user. A registered user may be allowed to use various features of the application which include but are not limited to reporting data and rating data. The subscriber fees collected may also directly or indirectly fund monetary or non-monetary rewards implemented as an incentive for originating new business, providing various types of data, including feedback concerning quality of service, any issues that arise, and the experience of the customer, service provider, passenger, patient, etc. User profile data may be stored in database 108, which is preferably configured to store not only individual user information, but also associations between each user and the user's remote computing device 128 after registering. Once registered, a user may set and change the information in their user profiles, if desired. Settings that may require a user's input or preference may be subsequently changed by the user within the settings (e.g., on/off). For example, a user may change the type of vehicle he/she is currently driving or prefers to ride in as a passenger.

Database 108 may also include rules & procedures data 190 and administrative data 182. Rules and procedures data 190 can include system price, promotion setting rules and procedures, as well as rules and procedures for indicators, referrals, payments, service requests, system management, system log, system analysis and optimization, etc. Administrative data 182 may include, but is not limited to, data related to dispute resolution, quality control, etc. Historical data is kept track of partly by assigning a tracking number or service ID number that would be assigned to a service request and/or any information related thereto to help refer back to it if it comes into question. Such information may also relate to the service provided and/or any experiences the service provider and customer have with one another.

The data stored in databases 108 of computing system 100 can be continually updated with all user information discussed herein and analyzed in accordance with the various methodologies discussed herein to enable efficient booking and dispatch of prescheduled or on-demand transport or other services. Each time computing system 100 receives an input/request from a customer, a service provider, a dispatcher, a service entity, a customer, a passenger, or a user, computing system 100 can first open a safe access channel with database(s)/database center and then send query sentences through the access channel to a database management module. If a relational database is utilized, then the data tables may have one kind of relationships, such as one to many relationships, many to many relationships, and one to one relationships with other data table(s). Based on the relationships between data tables, the database(s) management module can exactly follow the query sentences and find the specific data table(s) by using ID(s), table names and column names of the tables with/without joining two or more data tables together. If a non-relational database is utilized instead of data tables, with the data stored in key-value pairs, then the database management module can exactly follow the query sentences and find the specific data by using keys that query sentences provide. Computing system 100 can access all information stored in databases 108. Database(s) 108 can store any data relevant to implementation of exemplary embodiments of the inventive disclosure.

Service request data 194 received through the server interface may include, for example, the status of service requests, the status of service request acceptances by service providers, the reasons from service providers for cancelling service requests, the histories associated with assigned service requests, operation logs of dispatchers, etc. The content/timestamps of notifications and confirmation statuses may also be recorded in system logs, and this information can be checked by the administrator of computing system 100. It will be appreciated that this is not an exhaustive list of the operational service request information that the system may record.

Database 108 may also store the details of service requests for each particular service provider for future reference and may include data related to a service provider's vehicle, such as make and model, color, seating capacity and accessibility, insurance status, and even pictures of the vehicle. Additional information in the service provider's profile may include such information as a service provider's favorite list and blacklist, limitations related to zip codes, time, location, and price, as well as service data and records. Database 108 can further include administrative data comprising prices and rates, system data such as contact and FAQ information, and registration details regarding customers and service providers, such as, for example, billing information or other relevant information relating to administering the prescheduled service application. By way of example, the registration details can include how long users have been registered with the system or how frequently they use the prescheduling or on-demand service application. Other stored information can include service rules, procedures, and prices, as well as procedures for service providers' and customers' settings. For example, database 108 may store billing information or other information related to administering on-demand or pre-scheduled service applications for computing system 100. Group data 195 can include base data, company data, group of individuals data, or data related to vendors. Customer data can comprise customers' profiles including personal data, customers' favorite service provider lists, customers' service provider blacklist, customers' preferences, service requests data, and records. Database 108 may sync or update dynamically so that whenever changes or updates in data blocks are made, server 102 and database 108 dynamically updates the data accordingly to reflect the latest changes. Additionally, at least one backup database may be utilized to back up primary database 108 in case of data loss in primary database 108. One of ordinary skill in the art will appreciate that database 108 may vary from the one depicted herein.

Alternatively, computing system 100 may use a set of databases or data storage mediums to provide and maintain a prescheduled service application in order to dispatch a compatible service provider based on a customer's preferences and needs. Databases 108 may contain several data categories or groupings. Sections of database 108 may be independent or synchronized in order to retrieve information from both sections at the same time. Historical information may be categorized and stored in and retrieved from database 108 and can be tracked in part by assigning a tracking number, service ID number or trip ID corresponding to each service request to help computing system 100 refer back to the service request. Information categorized with this identification may include the type of service request, who requested and carried it out, where it took place (e.g., zip code, county, city, state, etc.), what the route was, the cost of the service request, when and how payment for the service took place, and whether either party was added to a favorite list or a blacklist. All information regarding a customer's or service provider's preferences or limitations, pricing, and other customizable information can be stored in database 108.

Records of completed service requests can also be stored and maintained within database 108. Computing system 100 can automatically store records of historical data for any completed service requests in database 108, which may be dynamically updated as services are booked and completed. Database 108 may also store an index of each service request that has been requested and completed, including the registration numbers or user identifications of customers and service providers, which can be retrieved for reference if needed at any time. The service request information stored in the database 108 may also include, for example, a service request ID, relevant service provider information, relevant customer information, requested pick-up location, actual pick-up location, requested drop-off location, actual drop-off location, pick-up time, drop-off time, distance, duration time, status, prices, insurance company, etc. Even if a customer does not have a smartphone or use the application which is in communication with the system, this will not adversely affect the functioning of the system as methods which circumvent a customer not having access to the system may be utilized. For example, a dispatcher may update such customer on the status of his/her service request or on the location of the service provider. The dispatcher can provide the customer with the most current information. In certain embodiments, a start button may be provided to service provider device $132SP_n$, which allows a service provider to instantly connect with the dispatcher.

In preferred embodiments, system 100 dynamically updates and stores any changes to a service request before or during the start thereof, or any updates on the status of the service request, and displays these changes in real time, both in a web portal for the dispatcher, and in a service provider interface on service provider device 132 associated with the service provider assigned to the service request. For example, if a customer cancels a service request or needs to change the pick-up time or location, the customer can enter this information into system 100 via customer device 130. The new information is stored in database 108. The web portal of the dispatcher updates, and a notification of the change is immediately sent to the service provider associated with the service request via service provider device 132. The service provider can then preferably access the same information about the service request displayed in the web portal of the dispatcher. Additionally, in preferred embodiments, any new information about the customer (e.g., phone number, email address, a change to preferences, etc.) entered prior to the service request can be communicated to the web portal of the dispatcher and the user interface of service provider device 132 of the service provider assigned to the service request. Preferably, only relevant service provider devices are updated with new customer information (e.g., service provider devices associated with service providers involved with the customer's service requests).

Data may preferably be stored categorically within database 108 and be updated dynamically to ensure the most current and up-to-date information is used in the on-demand or prescheduling processes. It will be appreciated that database 108 can store customer information, service provider profile/information, and other data relating to DSP data 140 (i.e., customer information 142, DSP service provider preferences/limitations data 143, service provider profile 144, DSP preferences/limitations data 145, other data 146, etc.), relating to white label base companies A/B data 148, 156 (i.e., customer information 150, 158, service provider preferences/limitations data 151, 159, service provider profile 152, 160, company preferences/limitations data 153, 161, other data 154, 162, etc.), and relating to non-white label companies 1/2 data 164, 174 (i.e., customer information 168, 176, service provider preferences/limitations data 169, 177, service provider profile 170, 178, company preferences/limitations data 171, 179, other data 172, 180, etc.), as well as any other data desired. Preset preferences for a customer stored and dynamically updated in database 108 can include, but are not limited to, preferences related to type of service provider (i.e., favorite, preferred or blacklisted), pick-up locations, drop-off locations, make, model, and type of vehicle, years of driving experience, seating capacity, gender, language spoken, service accessibility, medical device availability, pet accommodation, and baby seat availability. Pick-up location preference allows a customer to identify his/her pick-up location.

A drop-off location preference allows a customer to identify his/her preferred drop-off location. Make, model and type of vehicle preferences allow a customer to specify the make, model, and type of vehicle he/she prefers for his/her service request. Years of driving experience preference allows a customer to preset the number of years' experience he/she may prefer his/her service provider to have. Seating capacity preference allows a customer to specify a number of passengers for his/her service request. Gender preference allows a customer to choose a service provider of a certain gender. Language spoken preference allows a customer to choose a service provider speaking a certain language. Accessibility preference allows a customer to preset a preference for service providers whose vehicle is equipped for special accessibility. Medical device availability preference enables a customer to make sure that a transport vehicle has certain equipment, such as oxygen tanks or other medical devices. Pet accommodation preference allows a customer to preset a preference for service requests who are able to accommodate pets. Baby seat availability preference allows a customer to request a service provider having a baby seat available.

The data stored in database 108 can be continually updated with all user information discussed herein and analyzed in accordance with the various methodologies discussed herein to enable efficient booking and dispatch of service providers. In certain embodiments, every time system 100 gets an input/request from a customer, a service provider, a dispatcher, or other user, system 100 can first open a safe access channel with database(s)/database center 108 and then send out query sentences through the access channel to a database management module. If a relational database is utilized, then the data tables may have one kind of relationships, such as one to many relationships, many to many relationships, and one to one relationships with other data table(s). Based on the relationships between data tables, the database(s) management module can exactly follow the query sentences and find the specific data table(s) by using ID(s), table names and column names of the tables with/without joining two or more data tables together. If a non-relational database is utilized instead of data tables, with the data stored in key-value pairs, then the database management module can exactly follow the query sentences and find the specific data by using keys that query sentences provide.

Additional data may be input into database 108, including but not limited to, locations where customers traveled to, favorite lists or blacklists, locations, other transaction data and details, historical data, insurance policy expiration dates, inspection dates, driver's, home aid's or other service providers' license expiration dates, or any combination thereof. This data may also include information relating to indicators and the display thereof. By way of example, the data may include the service requests that all customers or providers have completed in a certain area, such as one or more streets, zip codes, town, city, borough, county, state, or any other region-defining feature, or how many times a customer and provider have been paired by system 100.

Figure 2A:
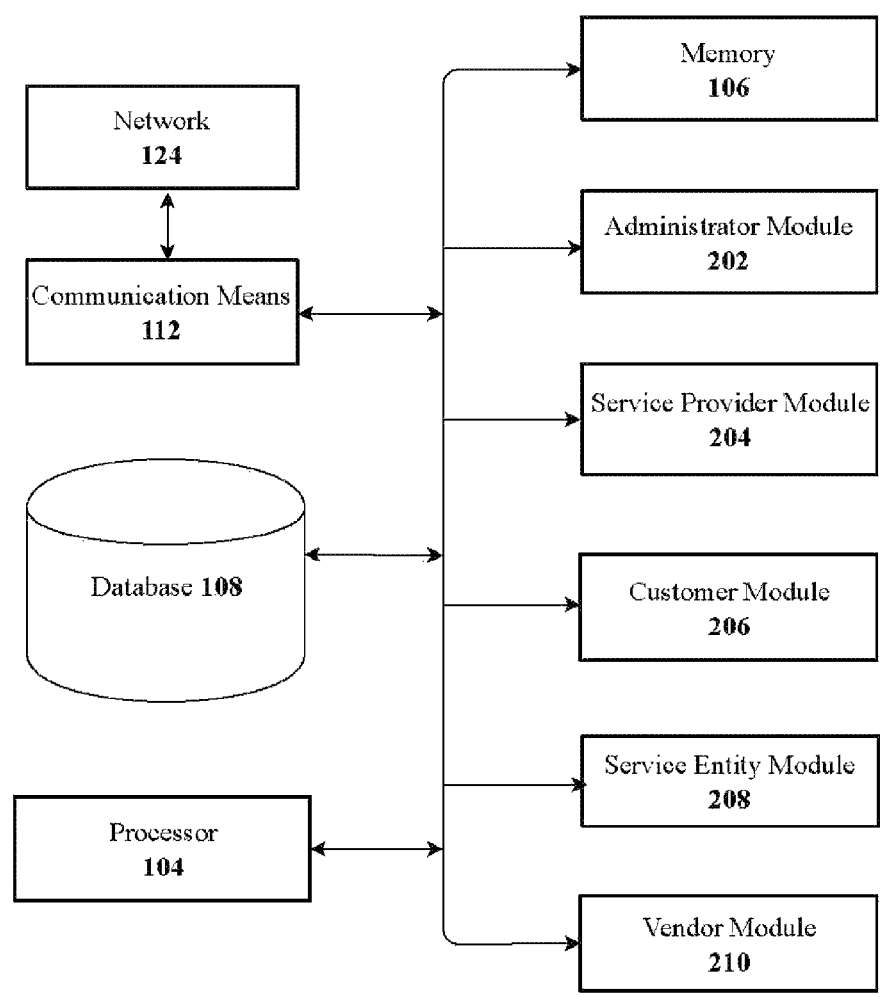
FIG. 2A depicts a schematic diagram of exemplary system components, in accordance with an exemplary embodiment of the inventive disclosure.

Turning next to FIG. 2A, depicted is a schematic diagram of exemplary system components comprised in the system according to the inventive disclosure. A system component is a process, program, utility, or another part of a computer's operating system that helps to manage different areas of system 100. There are multiple system components at work, each serving a specific function. Together, they allow the operating system and computer to function correctly and efficiently. The system components may comprise one or more of each of communication means 112, database 108, processor 104, memory 106, administrator module 202, service provider module 204, customer module 206, dispatcher or service entity module 208, and vendor module 210. Administrator module 202, service provider module 204, customer module 206, dispatcher or service entity module 208, and vendor module 210 may interact with other components of the computing device, such as the communication means 112, database 108, processor 104, and memory 106 in order to affect the provisioning and display of various functionalities associated with the system and method detailed herein. In general, communication between the system components and network 124 occurs through communication means 112. One of ordinary skill in the art will appreciate that service provider module 204 and customer module 206 may include a plurality of sub-modules (i.e., for transport service, for delivery service, for other services, etc.). These sub-modules may work independently or be synchronized to work together. Also, one of ordinary skill in the art will appreciate that system components may vary from the ones described herein, as FIG. 2 only depicts certain core elements of the system components of the inventive disclosure.

Figure 2B:
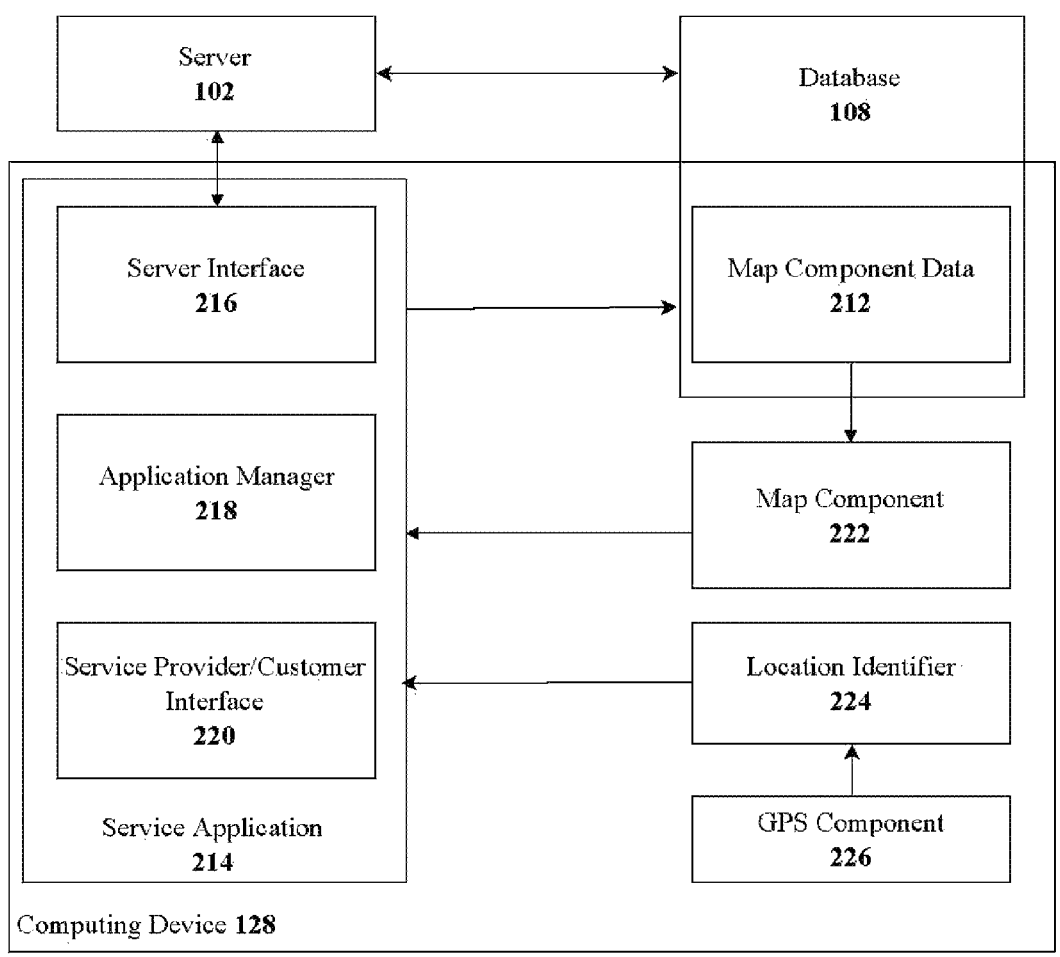
FIG. 2B depicts a schematic diagram of an exemplary system structure, in accordance with an exemplary embodiment of the inventive disclosure.

Referring next to FIG. 2B, depicted is a schematic diagram of an exemplary system structure in accordance with exemplary embodiments of the inventive disclosure that comprises three main components: server 102, database 108, and computing device 128. Server 102 is communicatively linked with and interacts with database 108. Some data may be stored in computing device 128 including, for example, part of or a whole map component data 212. Computing device 128 may have service application 214 installed having three main components that include server interface 216, application manager 218 and service provider/customer interface 220. Any interaction between service application 214 and server 102 occurs through server interface 216 and application manager 218 manages operation of service application 214 and retrieval of data from database 108 for service application 214. Any interaction between service application 214 and service provider/customer occurs through service provider/customer interface 220. Computing device 128 could help service application 214 with map component 222, for example, to display the service provider's/customer's location on the map of service application 214. Map component data 212 could be retrieved from database 108. Computing device 128 also provides support of location determination to service application 214, where the location is identified via location identifier 224 by means of, for example, GPS component 226 located within computing device 128. One of ordinary skill in the art will appreciate that the system structure depicted in FIG. 2B is not exclusive, and that there could be other variations thereof.

Figure 3A:
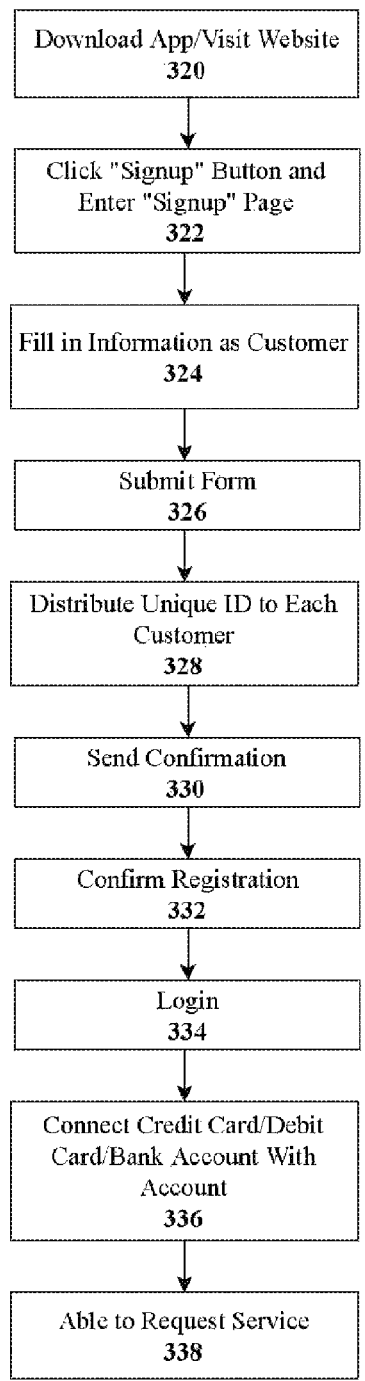
FIG. 3A depicts an exemplary workflow for a customer's registration, in accordance with an exemplary embodiment of the inventive disclosure.

Next, FIG. 3A depicts an exemplary workflow for a customer's registration with the system. The process begins with the customer downloading the app or visiting the website (Step 320). The customer then clicks the "signup" button and enters the "signup" page (Step 322). The customer then fills in his/her information (Step 324) and submits the form to the system (Step 326). The system distributes unique IDs to each customer (Step 328) and sends a confirmation of registration to the customer (Step 330). The customer confirms registration (Step 332) and then logs in into the system (Step 334). The customer then has an option to connect a payment method, which may be a credit/debit card, bank account or any other payment method, with his/her account (Step 336). Once the customer connects a payment method, he/she is all set to start requesting service (Step 338). One of ordinary skill in the art will appreciate that the process described in FIG. 3A is not exclusive, and that the customer's registration process could include the steps that differ from the steps described therein. In addition, one of ordinary skill in the art will appreciate that the process depicted herein does not require the particular order shown to achieve desirable results.

Figure 3B:
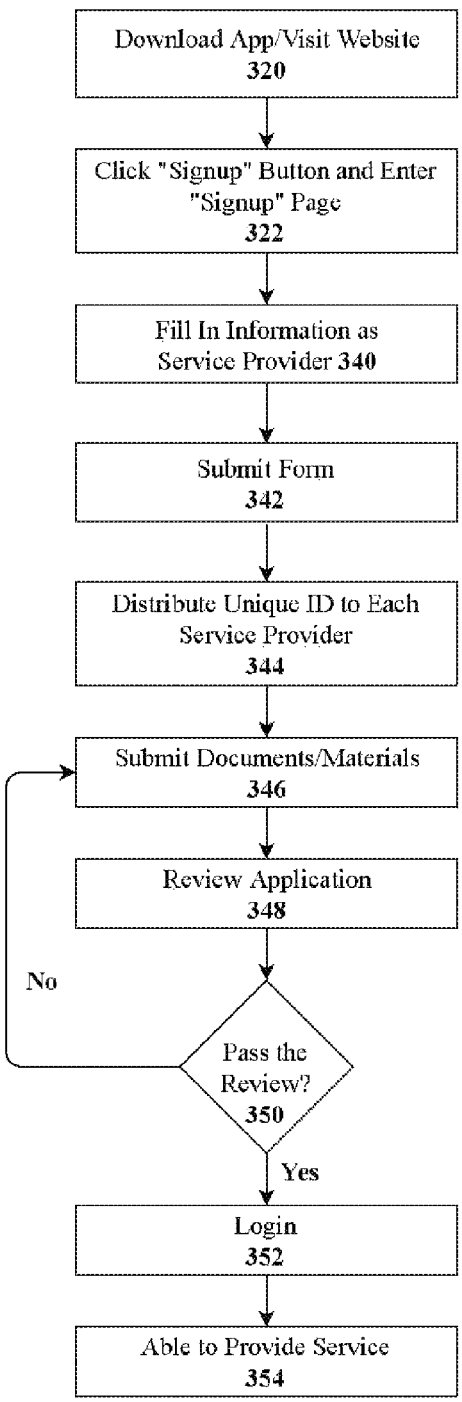
FIG. 3B depicts an exemplary workflow for a service provider's registration, in accordance with an exemplary embodiment of the inventive disclosure.

Similarly, FIG. 3B depicts an exemplary workflow for a service provider's registration with the system. The process begins with the service provider downloading the app or visiting the website (Step 320). The service provider then clicks the "signup" button and enters the "signup" page (Step 322). The service provider then fills in his/her information (Step 340) and submits the form to the system (Step 342). The system distributes unique IDs to each service provider (Step 344) and requests the service provider to provide information (e.g., documents/materials) for review as part of his/her application (Step 346). The application is then reviewed (Step 348) and a decision is rendered as to whether the service provider has passed the document/materials review stage or not (Decision 350). One of the ordinary skill in the art will appreciate it is to be understood that there are numerous types of documents that could be required from service providers depending on different geographic locations and jurisdictions, where service providers would have to submit documents specific to their jurisdiction. If the service provider has not passed the review, the process cycles back to providing more information (Step 346). If the service provider has passed the review, then he/she will be able to log in into the system (Step 352). The service provider may then start accepting service requests and providing service (Step 354). One of ordinary skill in the art will appreciate that the process described in FIG. 3B is not exclusive, and that the service provider's registration process could include the steps that differ from the steps described therein. In addition, one of ordinary skill in the art will appreciate that the process depicted herein does not require the particular order shown to achieve desirable results.

Figure 4:
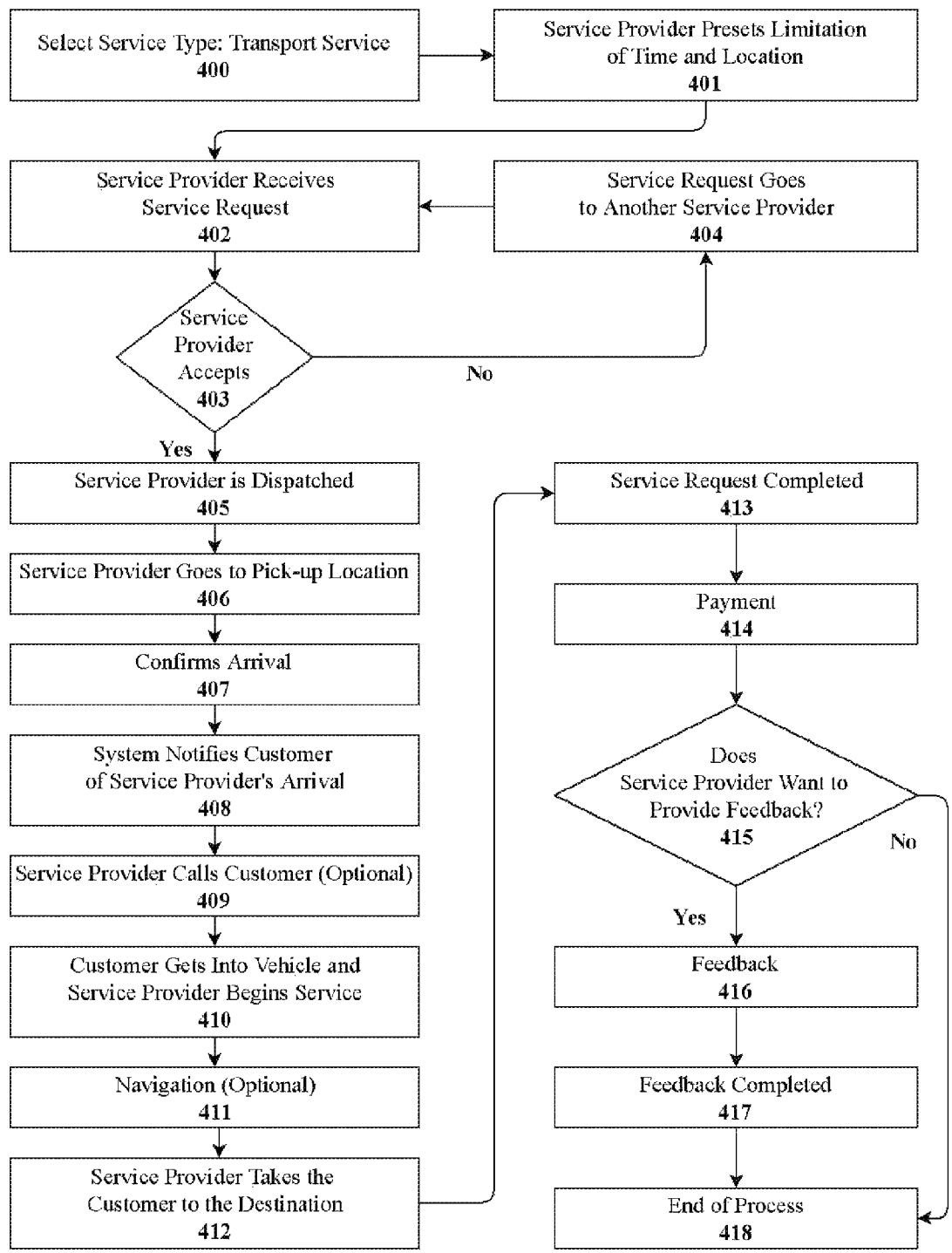
FIG. 4 depicts an exemplary workflow of a service provider providing transport service, in accordance with an exemplary embodiment of the inventive disclosure.

Referring now to FIG. 4, depicted is an exemplary workflow of a service provider providing, for example, transport service in accordance with exemplary embodiments of the inventive disclosure. It will be appreciated that the systems, platforms and methods described herein may apply to different service providers offering to provide different services (e.g., home health care services, delivery services, etc.). As depicted, the service provider begins by selecting the type of service he/she wants to provide, such as transport service (Step 400). The service provider then presets his/her limitations of time and location (Step 401). The service provider then receives a service request (Step 402) and decides whether he/she accepts the request (Decision 403). If the service provider rejects the service request, then the service request goes to another available service provider (Step 404) and the process cycles back to the original service provider, who then receives a new service request (Step 402). This process repeats until a service provider accepts a new service request.

Once a service provider accepts a new service request, the service provider is dispatched (Step 405), and he/she travels to a pickup location (Step 406). Once the service provider arrives at the pickup location, he/she confirms arrival (Step 407). The system then notifies the customer of service provider's arrival (Step 408). If the service provider wishes, he/she may place an optional call to the customer to notify him or her of his/her arrival (Step 409). The customer then gets into the vehicle and the service provider begins carrying out the service (Step 410). The service provider has an option of using the navigation (Step 411) and drives the customer to the destination location (Step 412). Upon arrival, the service request is identified as complete (Step 413), and the customer makes a payment (Step 414). Upon the customer's payment, the service provider has an option to provide feedback (Decision 415). The service provider may choose to skip giving feedback, in which case the process ends (Step 418). If the service provider chooses to give feedback, the service provider gives feedback (Step 416), and once he/she is done providing feedback (Step 417), the process ends (Step 418). One of ordinary skill in the art will appreciate that a service provider's activity may differ depending on whether the service provider provides transport service and/or delivery service, home healthcare service, etc. Even though there may be slight differences in the process steps depending on the type of service, the main concept remains the same. For simplicity purposes, FIG. 4 only depicts the workflow of a service provider's activity in the system for transport service requests, but may apply to other types of service requests, etc., in accordance with the inventive disclosure.

Figure 5:
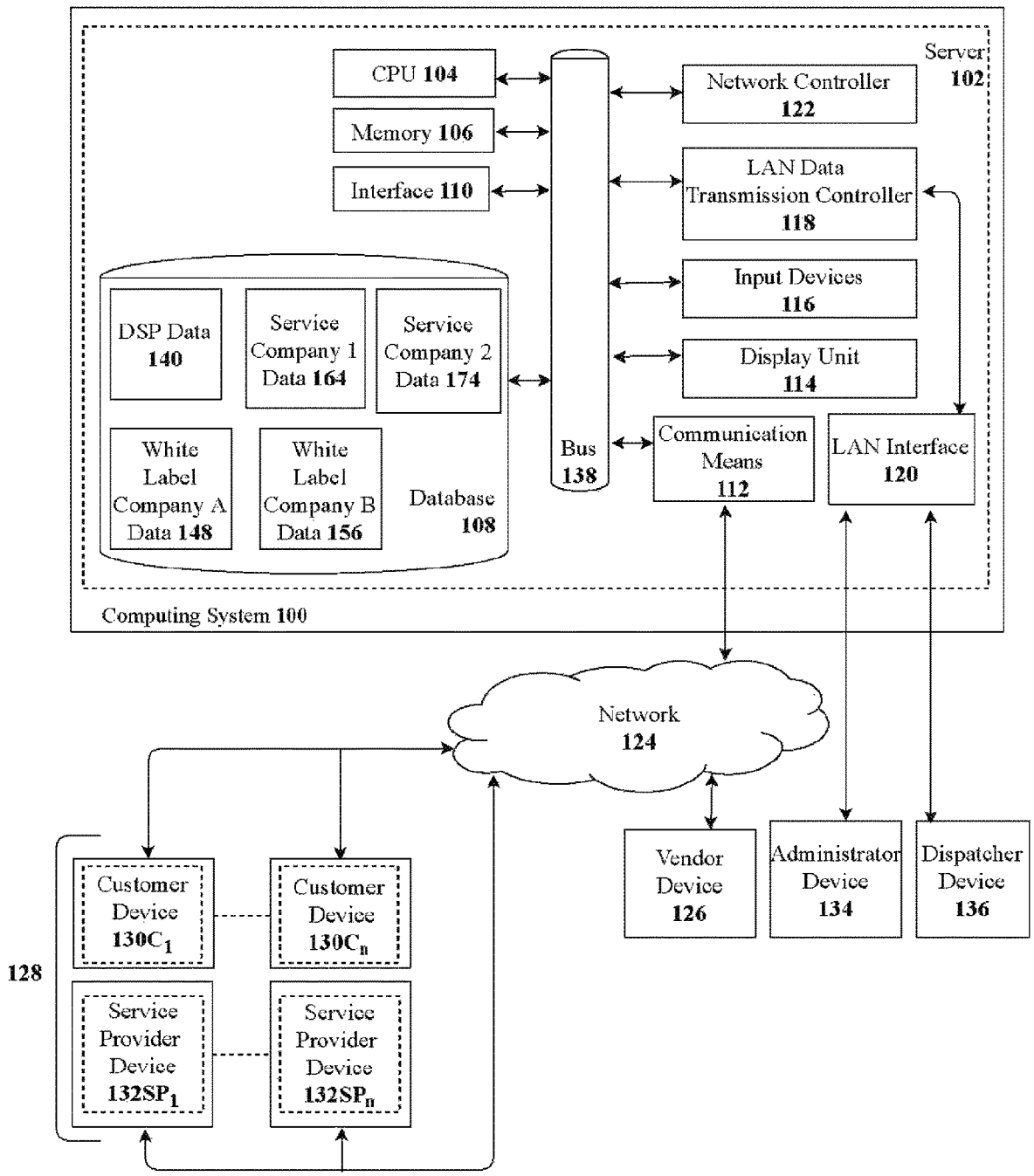
FIG. 5 illustrates an exemplary modification of the management system of FIG. 1A, further depicting apportionment and/or categorization of data within a system database including a plurality of base companies utilizing a single back-end application software codebase, in accordance with an exemplary embodiment of the inventive disclosure.

Turning now to FIG. 5, illustrated is an exemplary embodiment of the management system of FIG. 1A having a shared data-access layer in a distributed structure system for customizable data processing for a user convertible application in at least the transportation, home healthcare, delivery, etc., services industries, further depicting an exemplary categorization of data within the system database 108, including a plurality of base companies utilizing a single back-end application software codebase as described above with respect to the exemplary embodiment of database 108 in FIG. 1B. As depicted, server 102 and computing system 100 may be communicatively linked, through communication means 112 and network or WAN 124, to peripheral devices such as computing devices 128 (i.e., configured as one or more customer computing devices 130C1-130Cn and/or provider computing devices 132SP1-132SPn), vendor device 126, administrator device 134, and dispatcher device 136. Computing devices 128 may be devices (e.g., smartphone, smartwatch, etc.) which allow a user (e.g., customer, provider, etc.) to interact with the computing system 100, and in particular with database 108. Any number (e.g., 1, 2, 3, . . . n) of provider/service provider devices 132SP1 . . . 132SPn, or customer devices 130C1 . . . 130Cn may be used in conjunction with computing system 100. Each company utilizing the back-end application software codebase of the DSP system may have a plurality of service providers and customers each using computing devices 128. However, for companies using white label apps, the front-end of the application software will be customized to the specific company, while other companies may use the front-end of the DSP application.

Figure 6:
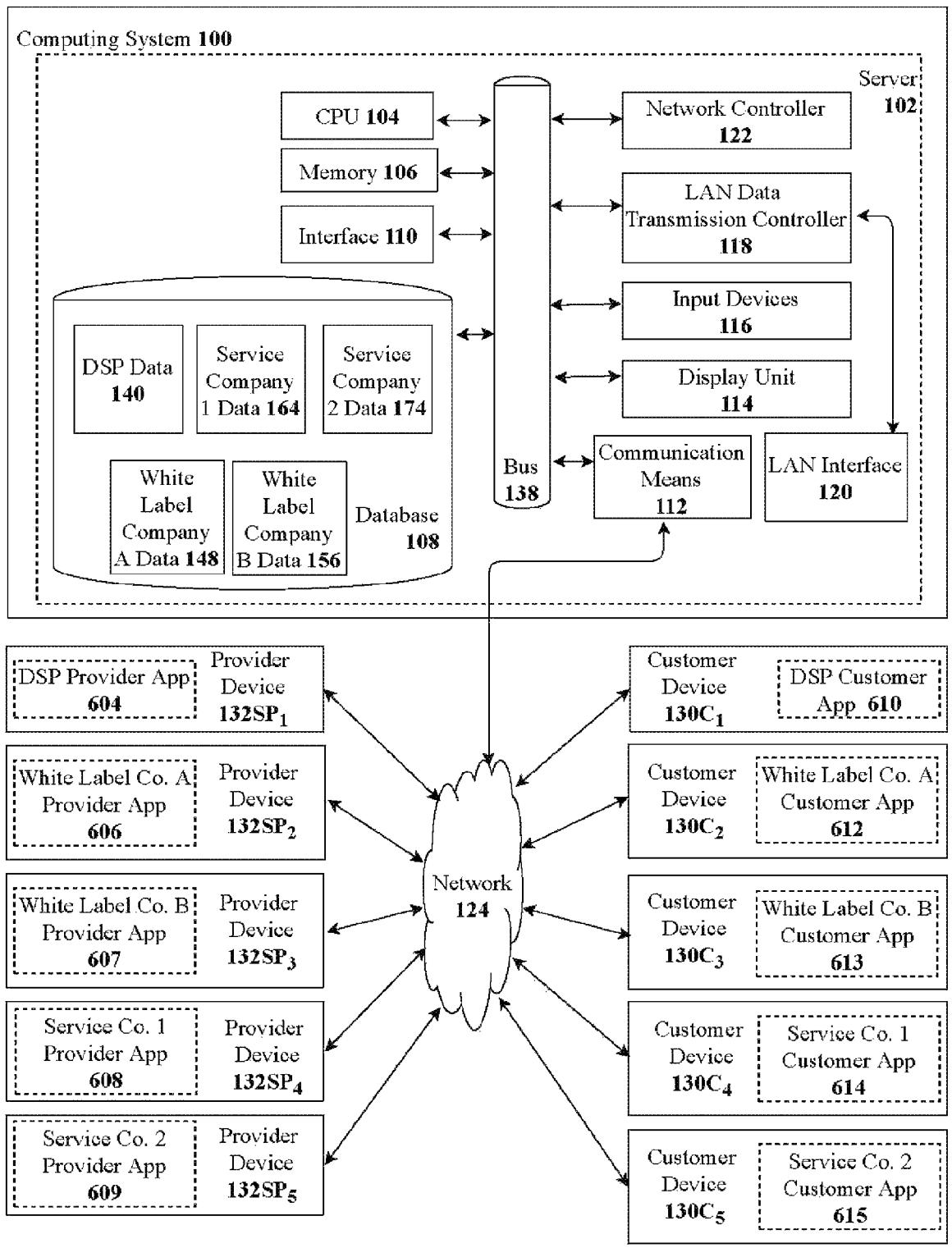
FIG. 6 illustrates an exemplary modification of the management system of FIG. 5, further depicting a plurality of service provider and customer devices having individual, independent, and/or customizable front-end application programs communicatively linked with a single back-end application software codebase, in accordance with an exemplary embodiment of the inventive disclosure.

For example, with respect to those companies choosing to use a white label application, a content manager or other administrator can specifically tailor the appearance of the GUI for the specific purchaser of the white label application software by taking generic white label content controlled by the content manager and formatting it to have a custom look and feel for the prospective customer company or purchaser (e.g., purchasing service company). In certain embodiments, a controller may provide a means for customizing generic white label content in the app for a particular user. Thus, if the content is to be provided through a customized platform, the controller can accordingly facilitate rebranding of the white label content to suit a particular situation. According to various aspects of the inventive disclosure, the system may host a plurality of dispatching apps including both the DSP (or other software company) app as well as one or more white label applications on a single shared platform such that each may access the data stored within any category or subcategory of database 108. For example, as shown in FIGS. 1B and 5-6, data stored in database 108 may be apportioned or categorized according to the company to whom the data pertains. Database 108 may comprise categories such as DSP data 140, white label companies A/B data 148, 156, service company 1/2 data 164, 174, etc.

As shown more specifically in FIG. 6, which illustrates an exemplary modification of the management system of FIG. 5, a plurality of service provider and customer devices may have individual, independent, and customizable front-end application programs communicatively linked with a single back-end application software codebase. As shown, customer computing devices $130C_1$-$130C_5$ and/or service provider computing devices $132SP_1$-$132SP_5$ for each of the DSP, one or more white label application users, or one or more users of the DSP application platform, may be operatively connected to computing system 100, and database 108, via network 124. As such, the system may comprise one or more DSP service provider device $132SP_1$ and one or more DSP customer devices $130C_1$, one or more white label user service provider devices $132SP_2$, $132SP_3$ and one or more white label user customer devices 130C2, 130C3, as well as one or more non-white label user service provider devices $132SP_4$, $132SP_5$ and one or more non-white label customer devices $130C_4$, $130C_5$. In a preferred embodiment, each of the customer computing devices $130C_1$-$130C_5$ and/or service provider computing devices $132SP_1$-$132SP_5$ may be configured with different front-end apps. For example, customer computing device $130C_1$ and service provider computing device $132SP_1$ may be configured with DSP customer app 610 and DSP service provider app 604, respectively, which each use the DSP application front-end software codebase, while customer computing devices $130C_2$, $130C_3$ may be configured with white label company A/B customer app 612/613, respectively, and service provider computing devices $132SP_2$, $132SP_3$ may be configured with white label company service provider app 606, 607, respectively. Similarly, customer computing devices $130C_4$, $130C_5$ may be configured with service company 1 or 2 customer app 614, 615, respectively, and service provider computing devices $132SP_4$, $132SP_5$ may be configured with service company 1 or 2 service provider app 608, 609, respectively, which may simply be the DSP application front-end software codebase. Computing devices $130C_1$-$130C_5$ and/or $132SP_1$-$132SP_5$ allow a user (e.g., customer, driver, patient, home aid, service provider, etc.) to interact with the system 100, and in particular with database 108, for the purpose of requesting service, accepting service requests, modifying preferences/limitations, registering with the system, etc. Thus, in accordance with an exemplary embodiment of the inventive disclosure, users need only download or otherwise utilize a single customer app which potentially provides access to service providers from a plurality of service companies, white label companies, and/or DSPs, all using the same dispatch software.

In certain embodiments of the white label app features disclosed herein, if a service base requests a white label app from a DSP having its own user and service provider app software, then for each of the customer app and service provider app, the app name, icon, store logo, screenshots, description, etc., may be customized according to the base company's needs. The customized app may have its own separate play store page or app store page in order to enable the base company to promote or encourage their users and service providers to use the app through the base company's own unique link. In such a white label or base-customized user app, the user will have an option to request service from the same base service providers or from all the base companies registered with the DSP system. If a user enables the system to only send service requests to same base service providers, then when a customer requests service, the service request will first be traversed through only the service providers registered with the same base (i.e., the base associated with the app used by the customer to request service). Optionally, if the back-end codebase of the software application finds no available service provider from the same base, then the customer may be notified, and may be provided with an option to switch or toggle to, for example, a DSP service provider mode or other base company service provider mode to allow the system to search for available service providers from the DSP registered service providers or from the list(s) of service providers from other base companies using the DSP back-end application software codebase. If the user accepts this option, then the service (e.g., a trip, home healthcare, delivery, etc.) request will cause the system to interface with the DSP database portion, or through on or more other base portion(s) of the database, or through the entire database of the system, depending on the individual preference(s) of the user, customer, DSP, and/or base companies, etc.

Figure 7:
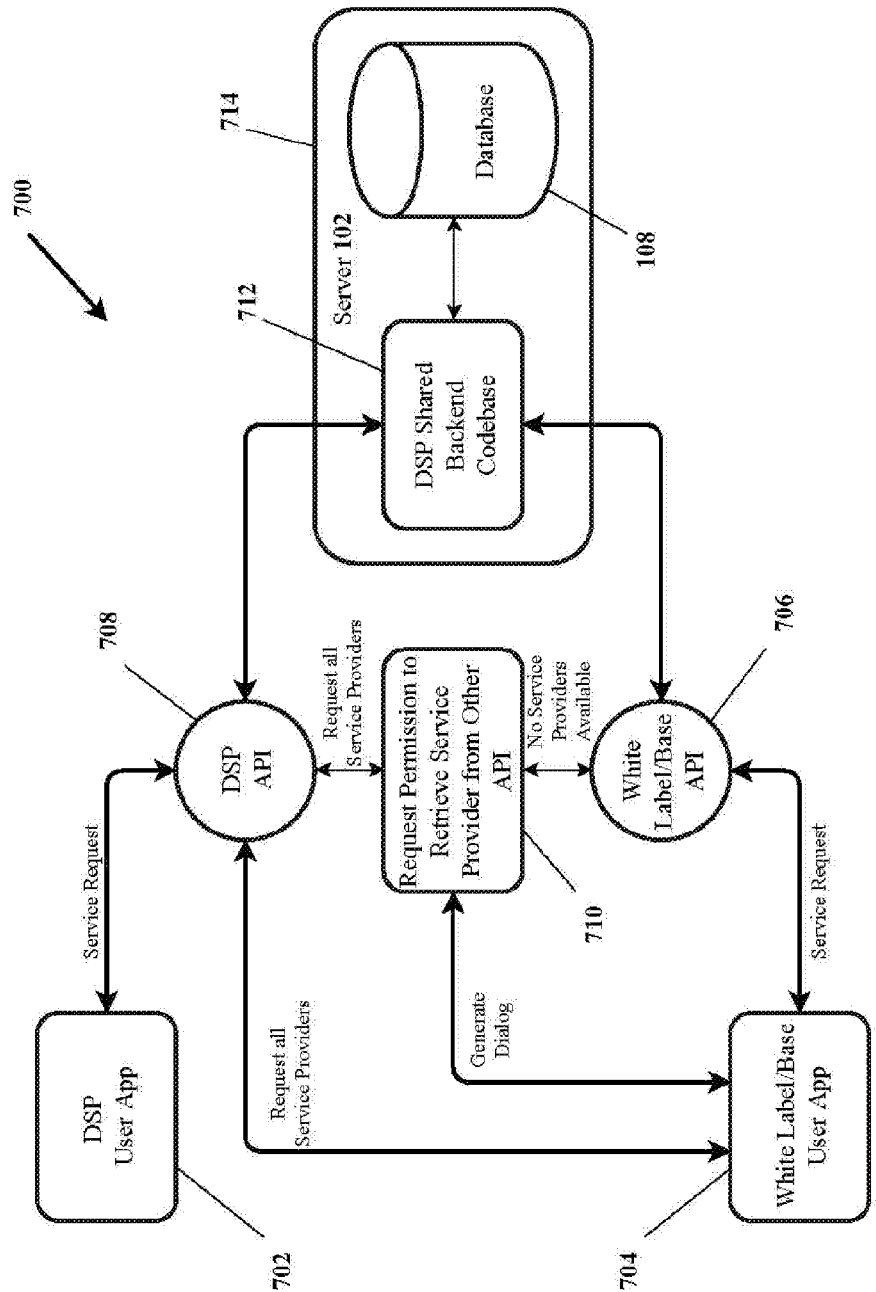
FIG. 7 is a schematic diagram illustrating an exemplary system and methodology for sharing a dispatching application in an apportioned database system for dispatching, in accordance with an exemplary embodiment of the inventive disclosure.

Referring next to FIG. 7, shown is a schematic diagram illustrating an exemplary method for sharing a user convertible application in, for example, a database or an apportioned database system for dispatching 700, in accordance with embodiments of the inventive disclosure. In such a system, service requests may be received through either DSP user app 702 or white label or base user app 704. With respect to the former, the request is provided to DSP service provider API 708 which is linked to DSP back-end software codebase 712, which is operatively connected to centralized database 108. Preferably, DSP back-end system 714 comprises server 102 which includes, among other things, DSP back-end software codebase 712 and centralized database 108. The system searches for an available DSP service provider through DSP service provider API 708. If, alternatively, a service request is received through a white label user app 704, which is also operatively linked to DSP back-end software codebase 712 and centralized database 108 via white label or base service provider API 706, then one of a plurality of actions are taken depending on the configuration of the white label app established by its owner. For example, in a first instance, the white label app 704 may be configured to provide the request to white label or base service provider API 706 which is linked to DSP back-end software codebase 712 and centralized database 108. The system searches for an available base service provider through white label or base service provider API 706. If an available base service provider is found, then the service request is dispatched to that service provider. If no available base service provider is found, then the system may generate a dialog or communication between the customer and the system to ask permission 710 to request a service provider from all or another portion of the DSP system. If such permission is granted, then the request is provided to DSP service provider API 708 to search for an available DSP service provider. In a second instance, the white label app may be configured to initially generate a dialog or communication between the customer and the system to initially ask permission 710 to request a service provider from any portion of the DSP system. If permission is granted, then the request is initially provided to DSP service provider API 708 to search for an available DSP service provider through DSP service provider API 708. In a third instance, the white label app may be configured to automatically enable use of service providers from any portion of the DSP system. Here, the request is initially provided through white label app 704 to DSP service provider API 708 to search for an available DSP service provider through any portion of DSP system database 108. In certain embodiments, the permission requested at 710 in the scenarios described above may be directly from the customer, a third party, and/or directly from the white label company.

Preferably, the system is configured on the back-end to implement this functionality by passing a base company identifier from the customer app. Preferably, the back-end is configured such that all white label apps may communicate with a single back-end codebase of the software application. Additionally, in certain embodiments, the back-end application software codebase can be configured to parse the trip or other service request according to different base configurations using one or more APIs. For the white label service provider app, the base company may configure the app remotely such that their service providers can accept job or service requests only from the same base customers, from one or more other base company customers, or from all DSP customers. The administrator(s) for the base company can customize or modify this configuration through the DSP portal or administrator device 134 (FIG. 1A). In addition, in the type of white label app referred to herein, a base company may customize the app with its own logo, its own app title, etc., in order to provide its own play store page or app store page such that end users can view everything on the base name configuration. In this manner, the base company is able to show its own customized screenshots, app icon, etc. In the user application app, the user is permitted to prioritize the service requests to the base service providers. If none of the base service providers are available, then the customer may be provided with an option to request service from the DSP system or from one or more other base service providers. In certain embodiments, the service providers may receive service requests from the same base company as a priority but may also receive service requests from other base companies if a customer selects that option. In both the customer app and the service provider app, a base company's configuration may be established by default through a support number, email, or other identifying information.

In such systems, both the DSP app, the service company apps, and white label apps utilize or are provided with the same back-end configuration (i.e., they are both/all connected to same back-end server). If permitted, when a service request is made or service is requested through a white label user app 704, the white label user app 704 will interface to the same API as the DSP user app 702, but an additional parameter (e.g., base_id) will be added in order for the DSP back-end 712 to identify that this service request should initially be routed only through the respective base service providers. If DSP back-end codebase 712 returns an empty result (i.e., no available base service providers) then, upon agreement by the customer to accept a service provider from any portion of the DSP system, the same DSP service provider API 708 will be accessed but with a new identification parameter (e.g., base_id=0). In this manner, the back-end server 102 can identify and route the service request through the entire DSP system. In the service provider app, based on the settings configured or established by the base company, when a service request is invoked from DSP user app 702, the DSP service provider API 708 may check whether a particular service provider is allowed to receive a service request from other base companies or not. If the administrator of the base has enabled this feature, then the service provider will not receive any service request notification. Depending on the configuration, using a single white label app a service provider can receive service requests from either his/her same base or from any other portion of the entire DSP system database 108. Thus, the probability of and the efficiency in a customer finding a suitable service provider for his/her needs increases and allows for a more uniform dispatching service encompassing multiple companies. Additionally, customers are potentially provided access to more suitable service providers, small companies without a large client base are given the opportunity to increase their business and/or further market their brand to new customers depending on system settings and company agreements, and DSPs or other licensing software companies are given the opportunity to both increase their business through access to additional customers and service providers, and further market their brand to customers and service providers.

Figure 8:
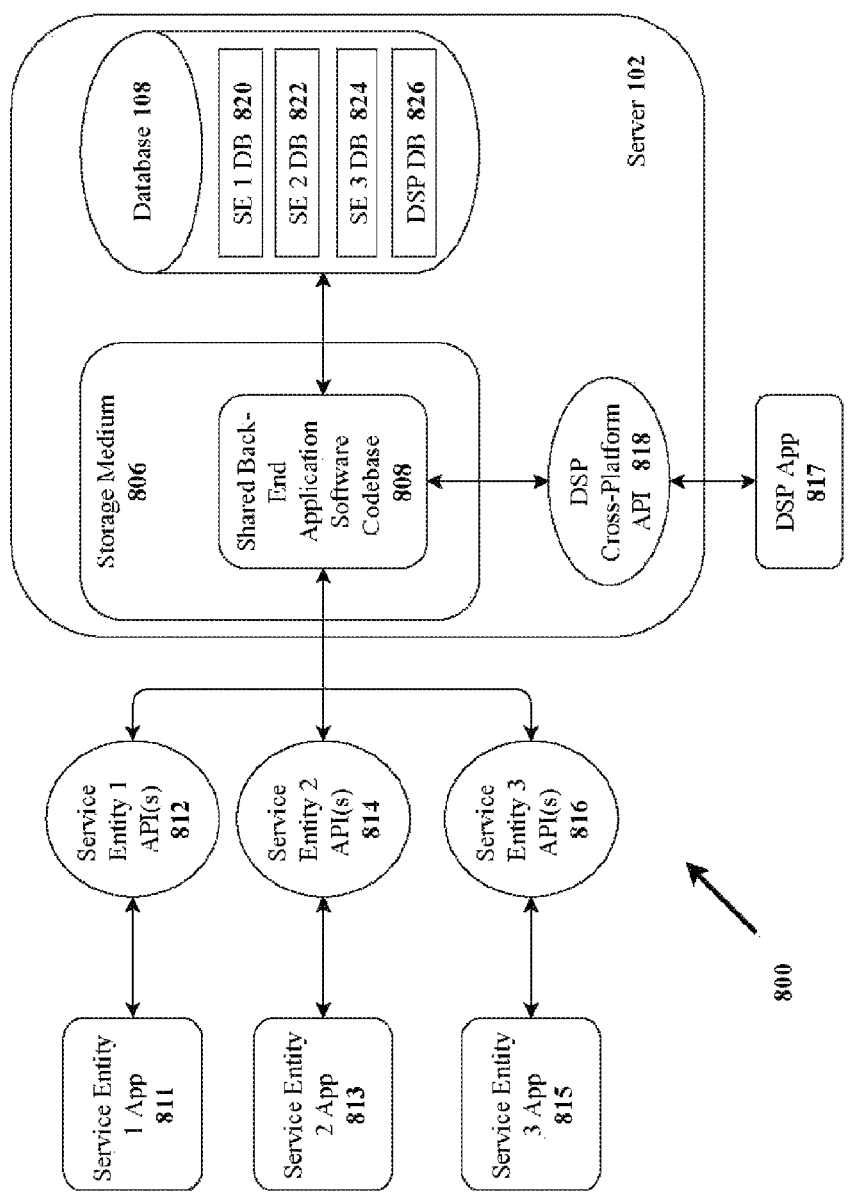
FIG. 8 is a schematic diagram illustrating an alternative exemplary system and methodology for sharing a dispatching application in an apportioned database system for dispatching, in accordance with an exemplary embodiment of the inventive disclosure.

Turning now to FIG. 8, shown is a schematic diagram illustrating an alternative exemplary system and method for sharing a customer convertible application in, for example, a database or an apportioned database system for dispatching 800, in accordance with exemplary embodiments of the inventive disclosure. In such a system, service requests may be received from any of DSP app 817 through DSP cross-platform API 818, or service entity 1 app 811, service entity 2 app 813, or service entity 3 app 815 through white label service entity 1 API(s) 812, service entity 2 API(s) 814, or service entity 3 API(s) 816, respectively. While only three (3) service entity apps are depicted, one having ordinary skill in the art will recognize that any number of service entities (i.e., white label entities) can utilize the apportioned database system described herein. With respect to a customer through DSP app 817, the request is provided to DSP cross-platform API 818 which is communicatively linked to DSP shared back-end software codebase 808 stored on storage medium 806 of server 102. Shared back-end codebase 808 is operatively coupled to centralized database 108 such that the system may search for an available DSP service provider in DSP database 826 portion of database 108 using DSP API 818. If, alternatively, a service request is received from a customer of one of white label service entity apps 811, 813, 815, which are also operatively linked to DSP back-end software codebase 808 and centralized database 108, then one of a plurality of actions are taken depending on the configuration of the white label app established by its owner.

For example, in one embodiment, the white label service entity app 811 (i.e., the application program) associated with service entity 1 API 812 may be configured to instruct DSP back-end software codebase 808 to search for an available service provider in service entity (SE) 1 database (DB) 820 portion of apportioned database 108. The system may search for an available base service provider using, for example, a searching API of service entity 1 API 812 and codebase 808. If an available service provider is found in SE 1 DB 820 associated with service entity 1 app 811, then the service request is dispatched to that service provider. If no available service provider can be found in SE 1 DB 820 portion of centralized database 108, then a dialog or communication may be initiated between service entity 1 app 811 and back-end codebase 808 to request a service provider from another service entity's database of service providers in accordance with predetermined rules established in the system. If such sharing permission has been authorized or granted for each service entity, then shared back-end codebase 808 in conjunction with service entity 1 API 812 searches for an available service provider in each of the authorized portion(s) of database 108 (e.g., in SE 2 DB 822, SE 3 DB 824, or DSP DB 826). If multiple available service providers are then located, in one embodiment the system will select the closest available service provider and assign the request to that service provider. In another embodiment, the system may be configured to permit the customer (e.g., the user of service entity 1 app 811, the user of service entity 2 app 813, the user of service entity 3 app 815, the user of DSP app 817, etc.) to select a particular service provider from, for example, a list of available service providers identified from any of the portions of centralized database 108. For example, indicators may be displayed to the customer depicting relevant factors pertaining to the service providers based on any of a number of preset preferences of the customer (e.g., favorite service provider, preferred service provider, familiarity with the route, gender, language spoken, etc.). In this manner, the customer can find a best matching or most preferred service provider according to the preferences the customer sets with the system.

The system preferably provides these sets of indicators to better assist a customer (e.g., passenger, customer, patient, etc.) select or otherwise engage a best matching service provider (e.g., driver, provider, caregiver, etc.) for the service request. Various information including but not limited to pricing, identification of the number of completed service requests, familiarity with a customer requesting service, familiarity with a route to a customer in a service request, etc. may be complicated for a customer to navigate when making a deal for a service request. As a customer, service provider, and service entity need different information, the indicators may differ depending on what that information may need to be. Service providers, customers and service entities are able to customize their experience, expectations and preferences through the various service relevant factors which may be displayed via sets of indicators. Exemplary embodiments of the present invention provide at least twenty-six (26) customizable sets of indicators to streamline this comprehensive information. One having ordinary skill in the art will appreciate that more or fewer than 26 sets of indicators may be used in accordance with the inventive disclosure. The system will display indicators to avoid confusion, but customers, service providers or service entities (i.e., users) may also elect to change certain sets of indicators. For example, users may want to replace a default symbol or icon that represents an indicator with their own symbol, such as an emoticon or abbreviation for his/her own user ID. Furthermore, explanations about what each indicator means may also be provided, and users have the option of turning these explanations on/off, or temporarily hiding them. If they turn them off, they may still able to turn any or all back on. For example, new users may prefer to have the explanations on, while those who have used the service for a while and are very familiar with them may not need the explanations for the meanings of the various sets of indicators. Users may also change the order in which the indicators are displayed if they would like to prioritize one set of indicators over another.

The indicators are preferably a means to transmit or display service relevant information to a customer, a service provider, a service entity, or any combination thereof in a simple, fast, and convenient way. Multiple sets of indicators may be used to assist with matching proper service between the two, as well as allow for customization by users. Users may have different indicators on their respective interfaces, but they can also see each other's indicators if they choose to. Additionally, there may be a tiering system for some indicators, which includes a range of numbers with a minimum and maximum amount, and each tier representing a different meaning to different users.

In an exemplary embodiment, a first set of indicators may identify a user type for service providers in three categories, including but not limited to favorites, preferred, and regular service providers. A second set may also identify a user type for users in three categories, including but not limited to favorites, preferred, and regular users. A third set may identify the availability of service providers, which may connect the time for which the service providers will remain available for service requests. A fourth set may identify whether a user is currently requesting a service request, which may connect the time for which service requests from the customer will remain available. A fifth set may be based on the service request volume that a service provider has carried out, where numbers regarding historical data are connected. That is, they may connect numbers to reflect the total number of service requests carried out by a service provider within certain period of time, where the total number is further divided according to a certain period of time and is reflected by numbers, tiers, or combination thereof. A sixth set may show one or more or any combination of geographic zones based on one or more or any combination of corresponding search parameters preset by the user. A seventh set may be based on the data and information provided by the sixth set of indicators to further compare the total number of potential available service providers with the total number of potential available users. An eighth set may help streamline pricing information regarding a service provider's response to a price proposal from a user by connecting numbers regarding pricing. A ninth set may display information regarding the negotiation of a price for a service provider's services based on a price that has been initiated by a service provider in the case a customer sends the service request without a quoted price, and the service provider responds with a proposed price, which may be either negotiable or non-negotiable. A tenth set may connect historical data and geolocation data to reflect information regarding zone information based on the total number of service requests completed by a service provider within the geographic zone in which a customer indicates the visit location of the service request. And, an eleventh set may connect historical data and geolocation data to reflect information regarding zone information based on the total number of requests completed by a service provider within the geographic zone in which a customer indicated the drop-off location in the service request.

A twelfth set may convey the level of familiarity of a service provider with the customer associated with the service request, represented at least through percentage or any other depiction such as tiers, wherein the familiarity is calculated by the overall level of familiarity a service provider has with a given customer, based on the customer's history, general preferences, etc. This set of indicators may be generated by matching a customer's needs and preferences with a service provider's service records stored in a database. For example, with respect to a transport request, this information may include the service provider's familiarity with the route indicated in the service request; for home care service, this information may include the service provider's level of experience with certain needs of the customer, including the service provider's past experiences with the customer; and for delivery service, this may be information such as the service provider's experience or familiarity with the route. Regardless of the service request type, the indicator may be adjusted to display information relevant to the situation, and may be displayed by itself as a percentage, or it may be divided into tiers, for example, tier E standing in for familiarity between 0-19 percent, tier D for 20-39 percent, tier C for 40-59 percent, tier B for 60-79 percent and tier A for 80-100 percent. For a service provider, this may be a useful indicator in evaluating where he/she has provided services to many customers, or where he/she served only a few customers. This set of indicators may be used by service providers to evaluate where they have the most experience or may be the most valuable, or it may be used by a customer in selecting a best matching service provider based on the experience he/she may have with the customer or the associated service request.

A thirteenth set of indicators may be based on how many times a customer and a service provider have been matched and have completed a transaction together. A fourteenth set may connect the location information of the service provider with location information of the customer's visit location to display the time within which a service provider can pick-up the customer, an estimated time of arrival (ETA). A fifteenth set may be based on the estimated travel time (ETT) from the customer's visit location to the customer's drop-off location indicated in a service request. A sixteenth set may connect geolocation data to reflect at least the customer's pick-up and drop-off locations indicated in the service request. A seventeenth set may convey information about total number of service requests requested and completed by a customer. An eighteenth set may identify one or more or any combination of geographic zones based on one or more or any combination of search parameters preset by the service provider. A nineteenth set may be based on the eighteenth set of indicators to further display the number of potential available service providers compared to the number of potential available customers. A twentieth set may streamline the display of the price proposals a customer initiates, where numbers regarding pricing information are connected and displayed. A twenty-first set may provide details about a customer's proposed price that comes as a response to a service provider proposed price, where numbers regarding pricing information are connected and displayed by this set of indicators. A twenty-second set may connect historical data regarding a customer's service request history and geolocation data to identify a customer by how many service requests he/she has requested and completed based on visit location geographic zones. A twenty-third set may identify a customer by how many service requests he/she has requested and completed within a certain geographic zone, where geolocation data and historical service request data are connected. A twenty-fourth set may connect historical service request data to display the number of times a service provider and a customer have been matched with each other and completed a transaction together. A twenty-fifth set may identify the estimated travel time to complete a service request for a service provider. And, a twenty-sixth set may connect geolocation data of a service provider and the geolocation data of service provider's preset return location after carrying out a service request, if the service provider preset a return location.

In addition, any indicator that is based at least in part on countable numbers may also be reflected in terms of tiers. Tiers assigned by the system may be ranges of numbers with minimum and maximum amounts depending on whether it is applied to customers or to service providers, and also depending on whether it is applied to transport service, delivery service or both transport and delivery service. They may be displayed as letters, shapes or colors or any other way that shows the difference between each tier. Some customers' and service providers' indicators may have different meanings. The indicators indicate activity relative to their user type, category and subcategory. Since the system stores service request records in the database of the system, it is able to quantify when they were made or carried out by using time stamps and where they were carried out by request details. These records regarding the time or other numbers, however, may be scaled up or down, where a customer may divide the time frame of relevance, such as one or more days, one or more months or one or more years. All of these different adjustable search parameters regarding time or timeframe or zone or other numbers are designed as customizable so that a customer and a service provider can individualize and prioritize the information they want to see.

The supply and demand relating to a service provider can be displayed by search parameters preset by the customer based on a time within which the customer expects the pick-up to occur at the visit location, a distance from the visit location, and the desired number of service providers with whom the customer wants to negotiate a price for the service request. The relevant information about a service provider may be displayed to the customer via indicators such that the customer may view each potential service provider and then enable an interactive price negotiation via the displayed indicators. The search parameter based on time may also create a search distance or radius, and may include identifying all service providers on all possible routes leading to the visit location, identifying real-time traveling speed along each of the possible routes, multiplying the traveling speed of each service provider along the possible routes by a maximum time preset by the customer to calculate a maximum distance the service providers can travel within the maximum time preset by the customer, identifying the visit location of the customer as a center point of the search radius, and identifying the extreme point for the search radius, which may be the furthest location of a service provider within the search parameter or some other point that is at a distance preset by the customer. The supply and demand for the service request within the search parameters may be displayed for the customer as the number of potential available service providers for supply compared to the number of potential available customers for demand.

Presetting the search parameters by the customer may include presetting and searching for the desired number of service providers and creating a search radius by identifying the visit location as the center point for the search distance or radius and identifying the extreme point for the search radius to be the furthest location from the center point of the service providers. The search distance or radius may be smaller or larger than a search radius which is based on time or distance, and an estimated time of arrival of the service providers may be identified for the customer with assistance of the indicators. The number of service providers identified within the search distance or radius may be prioritized for price negotiation for the customer.

Some of the indicators may be relevant to the type of customer, whether providing or requesting service. Preferably, some indicators are more useful to customers, whereas some are more useful to service providers. However, indicators are not intended to be displayed to only service providers or to only customers exclusively, as indicators that are preferably displayed to one party may reflect information useful for the other party. If customers choose, however, they can look at their own information throughs the system. If they are interested in seeing their own indicators or their service request history to make sure that the indicators other customers see regarding their service request history are correct, they may do so through their profile information or any other means designated by the system, which shows all the indicators that apply to them. Such optionally preset service relevant factors which may be represented through one or more indicators assist the user in getting more information relating to any of a number of service related information or data. This service request history may include information that other parties can see, such as indicators regarding total number of service requests completed or requested. The service request history may also provide information that other parties cannot see, such as private information regarding how much money they have earned or spent. All such indicators are intended to provide customers and service providers with customizable information that may help them choose a best matching service provider or customer, respectively, to make a best deal for each other. It will be appreciated that additional indicators may be developed and/or utilized for deployment through one or more computing devices as a means for visually communicating a summary of other types of relevant information. Such indicators are more fully described in the '783 application, the disclosure of which is incorporated herein by reference in its entirety.

Referring again to FIG. 8, in an alternative embodiment, the white label app (e.g., one of service entity 1 app 811, service entity 2 app 813, service entity 3 app 815, etc.) may be configured such that the customer may query the system to request a service provider from any portion of the centralized database 108 in DSP system. In one embodiment, the customer may be provided with a button, tab or icon to select between searching for service providers in the white label database only or searching in the entire database of service providers or some group of specifically selected databases of service providers (e.g., selected from a drop-down menu or other listing of potential databases to search). If permitted, then the request, through search API 812, 814, 816, depending on which service entity app 811, 813, 815 the customer has downloaded, is provided to back-end codebase 808 to search for an available service provider in any one of or all of the portions of database 108 for which permission has been granted by the different service entities. In a third instance, the white label app may be configured to automatically enable search for service providers from any portion of the centralized database 108 in the DSP system. In such an embodiment, for example, the request may be provided through white label or service entity 1 app 811 to back-end codebase 808 to search for an available service provider through any portion of the centralized database 108. In certain embodiments, the permission queried by the customer to search for service providers in all portions of the centralized database 108 in DSP system described above may be directly from the customer, a third party, and/or directly from the white label company. Preferably, the system is configured on the back-end to implement this functionality by passing an identifier from the service entity app (i.e., 811, 813, 815). Preferably, back-end codebase 808 is configured such that all white label service entity apps and/or APIs may communicate with the single back-end codebase 808 of the DSP or other technology or software providing entity (e.g., via network 124). Additionally, in certain embodiments, back-end application software codebase 808 can be configured to parse the trip or other service request according to different base configurations using one or more APIs.

In certain embodiments, provided is a computing platform having a shared data-access layer in a distributed structure system that is linked to apportioned database 108 for customizable data processing. Preferably, platform or system 100 comprises a server communicatively coupled to network 124 and including processor 104, apportioned database 108 in a multi-user arrangement containing portions allocated to a plurality of entities (e.g., SE 1 DB 820 portion, SE 2 DB 822 portion, SE 3 DB 824 portion, DSP DB portion 826, etc.), and at least one non-transitory computer-readable storage medium 806 having computer-readable instructions stored therein. Processor 104 executes the computer-readable instructions to receive data or a service request via a first API 812 corresponding to a first entity (e.g., service entity one 811). Preferably, first application program 812, second application program 814, and third application program 816 are provided with or utilize identical back-end configurations by being operatively coupled to the same back-end server 102 housing shared back-end codebase 808. First application program 812, second application program 814, third application program 816, and DSP cross-platform API 818, each preferably have individual, independent and customizable front-ends expressed as an application name, an icon, a company logo, screenshots, or a description. First API 812 may be communicatively linked via network 124 to shared back-end application software codebase 808 stored on storage medium 806. Preferably, shared back-end codebase 808 may be formatted as a shared data-access layer, and may be configured to parse the data or service request to determine details thereof by using various APIs of the platform or system 100. The received data is processed via shared back-end codebase 808 communicatively linked to database 108, and system 100 queries, via shared back-end codebase 808, at least a first portion (e.g., SE 1 D portion 820) of database 108 allocated to the first entity (e.g., service entity one 811) in order to identify an available and matching service provider or object associated with the first entity (e.g., service entity one 811).

In certain other embodiments, computing devices 130, 132 are configured to display on a display screen an icon of first application program 812. The icon may be accessible by a user to launch the first application program 812 to search for an object or service provider to complete a service request received from a constituent or customer. First application program 812 preferably corresponds to a first service entity communicatively coupled to a shared data-access layer in a distributed structure system linked to apportioned database 108 for customizable dispatching. The distributed structure system may comprise a second application program 814 also communicatively coupled to the shared data-access layer and database 108 administered by the first service entity. The display screen preferably displays data relevant to the service request including, but not limited to, one or more of an electronic map display, indicators representing information or service relevant factors related to services for a customer, a service provider or a service entity or any combination thereof.

Computing platform or system 100 preferably has a shared data-access layer in a distributed structure system linked to database 108 for customizable data processing. The platform or system 100 may comprise back-end server 102 communicatively coupled to network 124 including processor 104, apportioned database 108 in a multi-user arrangement containing portions allocated to a plurality of entities (e.g., SE 1 DB portion 820, SE 2 DB portion 822, SE 3 DB portion 824, DSP DB portion 826, etc.), and non-transitory computer-readable storage medium 806 having computer-readable instructions stored therein. System 100 displays on a GUI on remote customer computing device 130 of a user application image representing at least first application program 812 associated with a first service entity 811. First application program 812 is preferably communicatively linked via network 124 to shared back-end application software codebase 808 by being operatively coupled to back-end server 102. Preferably, first application program 812, second application program 814, and third application program 816 have individual, independent and customizable front-ends such that a customer need only download one of the application programs to access database 108 via shared back-end application software codebase 808 on storage medium 806.

System 100 may then receive a selection by the customer of the application image to launch first application program 812 associated with the image. A tabular representation may be displayed on the GUI to depict one or more of the following: service providers of the first service entity, service providers of one or more additional service entities, indicators associated with the service providers reflecting service relevant data, etc. System 100 may then receive a selection of a service provider from any one of the first or additional service entities. The service request is then assigned to the selected service provider.

In response to system 100 not identifying any available matching objects or service providers in the first portion (e.g., SE 1 DB portion 820) of database 108, system 100 queries, via shared back-end codebase 808 a second portion (e.g., one of SE 2 DB portion 822, SE 3 DB portion 824, or DSP DB portion 826) of database 108 allocated to a second entity. System 100 identifies an available and matching object or service provider associated with the second entity. In response to system 100 identifying one or more objects or service providers associated with the second entity, system 100 then queries the second portion (e.g., one of SE 2 DB portion 822, SE 3 DB portion 824, or DSP DB portion 826) of database 108 to retrieve service relevant factors for the service providers or objects, the second entity or service entity (e.g., service entity two 813), and a customer or constituent associated with the service request or data. The service relevant factors may include one or more of optionally preset preferences of the objects or service providers, optionally preset limitations of the objects or service providers, optionally preset limitations of the entities or service entities, and/or optionally preset preferences of the constituent or customer. Using the retrieved service relevant factors, system 100 matches the customer or constituent with one of the objects or service providers associated with the second entity (e.g., service entity two 813). The one of the one or more objects associated with the second entity (e.g., service entity two 813) is then assigned by system 100 to the service request or data based on the match and in accordance with a plurality of predetermined rules.

Alternatively, in response to identifying the objects or service providers associated with the first entity (e.g., service entity one 811), system 100 queries the first portion (e.g., SE 1 DB 820) of database 108 to retrieve the service relevant factors for the objects or service providers, the first entity (e.g., service entity one 811), and a constituent or customer associated with the data or service request. Based on a configuration of first application program 812 and in accordance with rules of the first entity (e.g., service entity one 811), system 100 assigns one of the objects or service providers associated with the first entity (e.g., service entity one 811) to the data or service request. Preferably, the rules of the first entity (e.g., service entity one 811) are consistent with the plurality of predetermined rules of the platform or system 100.

In response to not identifying any objects or service providers associated with the first entity or failing to assign an object or service provider to the data or service request by the first entity, system 100, in one embodiment, may retrieve transfer preference rules (e.g., an example of predetermined rules) for the first entity or the customer from database 108. The transfer preference rules govern transfers of the data or service request by shared back-end codebase 808 from the first entity to another entity of the platform. The transfer preference rules dictate a transfer preference or restriction of the first entity or customer, but default transfer rules of the platform or system 100 will apply if the first entity or customer did not establish any transfer preference rules. Alternatively, system 100, via codebase 808, may access a plurality of additional portions (e.g., one of SE 2 DB portion 822, SE 3 DB portion 824, DSP DB portion 826, etc.) of database 108 allocated to additional entities. Rules established by each entity and/or customer will preferably dictate or control whether system 100 may freely access the other portions of database 108 to search for available objects or service providers for a constituent or customer of the first entity. In yet another alternative embodiment, in response to not identifying any objects or service providers associated with the first entity or failing by a first entity to assign an object or service provider to the data or service request, system 100 may apply entity preference rules, which may be preset by the particular entity or customer, for use by shared back-end codebase 808 in searching database 108 for objects or service providers associated with other entities of the platform. Preferably, entity preference rules are such that they dictate or govern a condition or conditions of the particular entity or customer to which they apply. If the particular entity or customer failed to provide preset entity preference rules, then system 100 may apply certain default rules.

In an exemplary embodiment, preset entity preference rules are a set of instructions, received from a first entity by the platform and stored in the database, that govern which other entity and/or which service provider of the other entity will be the first to be considered for servicing a service request which could not be serviced, for one reason or another, by the first entity. The preset entity preference rules, as contemplated by the platform's settings, could be input by any service entity of the platform in various ways affording the service entities of the platform a high degree of customization with respect to these preferences. It is, thus, contemplated that these rules could be set up in terms of straight rules, complex conditional schemes, or any combination of the two.

When assigning one of the one or more service providers associated with a service entity to a service request, system 100 queries database 108 to retrieve service relevant factors for the service providers or objects, the service entity or entities, and the customers or constituents. The service relevant factors may include service location preferences optionally preset by the service entity, service providers or objects, one or more service limitations, a favorite customer list, a preferred customer list, a customer blacklist optionally preset by the service entity or the one or more service providers, one or more customer preferences, a favorite service provider list, a favorite service entity list, a preferred service provider list, a preferred service entity list, a service provider blacklist, or a service entity blacklist optionally preset by the customer. Based on the service relevant factors, system 100 may preclude an object or a service provider or a service entity from being assigned to the data or service request (e.g., due to the service limitations optionally preset by the service entity or the service provider or the object, for being included on a service provider blacklist, for having the customer on the customer blacklist). System 100 then identifies or determines based on the one or more service relevant factors, a service entity and one or more service providers of the service entity suitable to complete the service request.

Prior to assignment of the object or service provider to the service request, system 100 determines a proximity, via a location identifier (e.g., a GPS or other GNSS receiver), of the service provider or object in relation to a location of the customer or constituent. The service request is then transmitted to the service provider or object based the determined proximity of the service provider or object to the location. After receiving an acceptance from the service provider or object, system 100 assigns the service provider or object to the service request. Upon determination that the first entity (e.g., service entity one 811) failed to identify a service provider or failed to assign the service provider to complete the service request, system 100 may transfer the service request, via first application program 812, to DSP cross-platform API 818 to enable shared back-end codebase 808 to search the database in order to identify one or more service providers or objects associated with one or more additional entities (e.g., service entity two 813, service entity three 815, DSP 817) to assign the data or service request to one of the service providers from the additional database portions (e.g., one of SE 2 DB portion 822, SE 3 DB portion 824, DSP DB portion 826, etc.). Optionally, system 100 may generate a dialog or communication between the customer associated with the service request and cross-platform API 818 to request permission from the customer to transfer the service request to a service provider for one of the additional entities.

When assigning an object or service provider to the data or service request, system 100 may establish a weighted priority for each of the objects or service providers associated with each entity. The weighted priority is based on assigned weights for each of the service relevant factors according to a plurality of predetermined rules. Optionally, system 100 may generate a data table for the objects or service providers including a priority assignment for each object or service provider, a ranked compatibility expressed in terms of weights between the service request and each object or service provider based on the weighted priority and one or more of the following: an availability of an object or service provider to accept the service request, an object or service provider type for the service request, or a constituent or customer type for each object or service provider. The object or service provider is then assigned to the data or service request in accordance with the weighted priority and plurality of predetermined rules.

Optionally, a unique identifier associated with each entity may be generated in order to provide access to import and export data into and out of database 108 in a secure manner. Optionally, system 100 may track an application program that was originally used by a customer to submit an initial service request. System 100 may also periodically provide an origination reward, in accordance with predetermined rules, to an entity associated with the application program that was newly downloaded or accessed and used for the first time.

Figure 9:
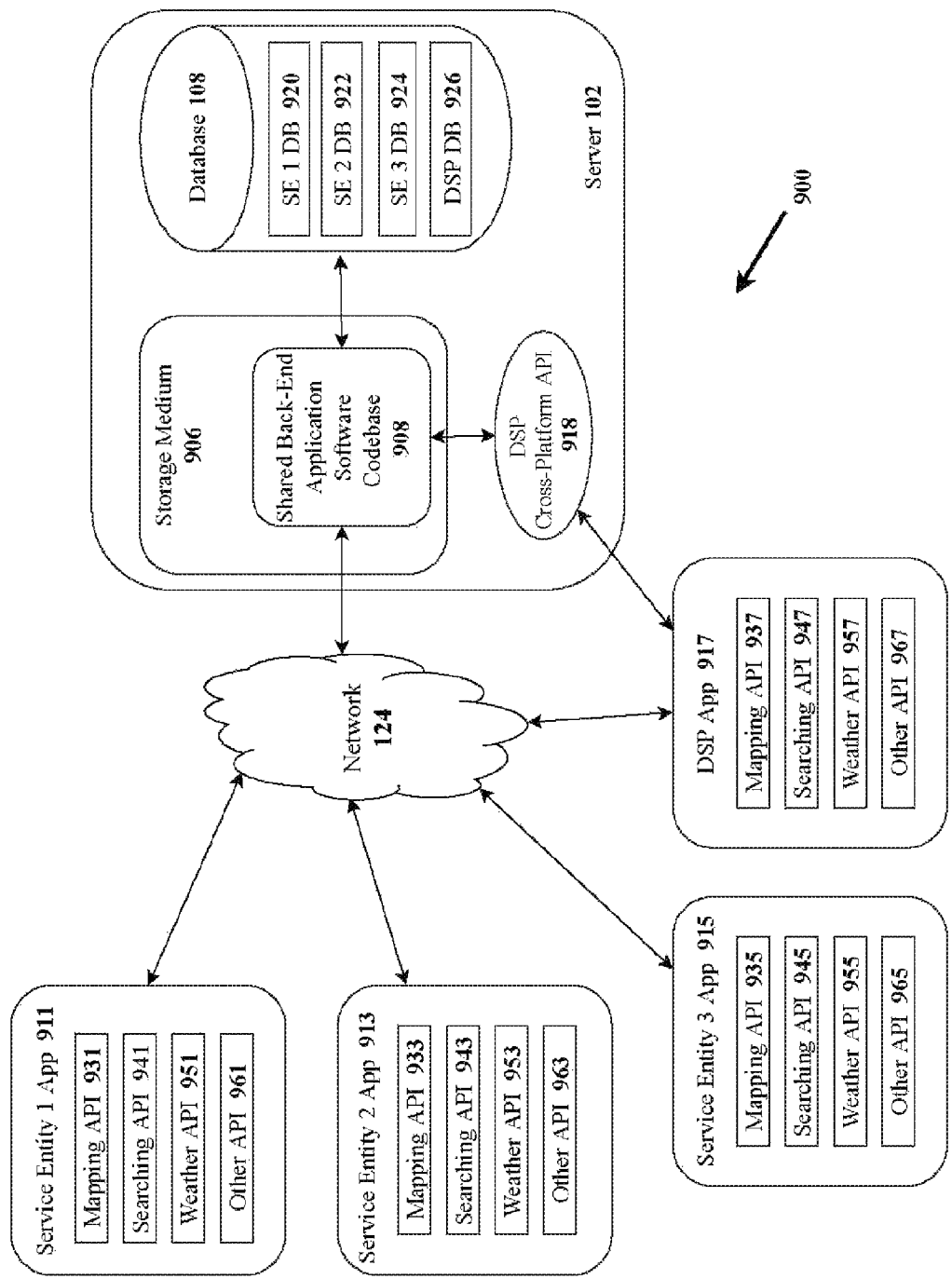
FIG. 9 a schematic diagram illustrating another alternative exemplary system and methodology for sharing a dispatching application in an apportioned database system for dispatching, in accordance with an exemplary embodiment of the inventive disclosure.

Referring next to FIG. 9, shown is a schematic diagram illustrating another alternative exemplary system and method for sharing a user convertible application in, for example, a database or an apportioned database system for dispatching 900, in accordance with embodiments of the inventive disclosure. In this embodiment, similar to that shown in FIG. 8, service requests may be received from DSP app 917 through DSP cross-platform API 918, or from service entity 1 app 911, service entity 2 app 913, or service entity 3 app 915, each of which may comprise one or more APIs. For example, as shown, each service entity app (i.e., 911, 913, 915) may comprise a plurality of APIs having different functionalities (e.g., mapping API 931, 933, 935, searching API 941, 943, 945, weather API 951, 953, 955, other API 961, 963, 965, etc.). Similarly, DSP app 917 may also comprise one or more APIs, such as mapping API 937, searching API 947, weather API 957, other APIs 967, etc.

While only three (3) service entity apps are depicted in FIG. 9, one having ordinary skill in the art will recognize that any number of service entities can utilize the apportioned database system described herein. With respect to a customer utilizing through DSP app 917, the request is provided to DSP cross-platform API 918 which is communicatively linked to DSP shared back-end software codebase 908 stored on storage medium 906 of server 102. Shared back-end codebase 908 is operatively coupled to database 108 such that the system may search for an available DSP service provider in DSP database (DB) 926 portion of database 108 using DSP cross-platform API 918. If, alternatively, a service request is received from a customer of one of white label service entity apps 911, 913, 915, which are also operatively linked to DSP back-end software codebase 908 and database 108, then one of a plurality of actions are taken depending on the configuration of the white label app established by its owner.

For example, in one embodiment, the white label service entity app 911 associated with a first service entity API may be configured to instruct DSP back-end software codebase 908 to search for an available service provider in SE 1 DB 920 portion of database 108. System 100 may search for an available base service provider using, for example, searching API 941 of the first service entity API and codebase 908. If an available service provider is found in SE 1 DB 920 associated with the first service entity app, then the service request is dispatched to that service provider. If no available service provider can be found in SE 1 DB 920 portion of database 108, then a dialog or communication may be initiated between service entity 1 app 911 and back-end codebase 908 to request a service provider from another service entity's database of service providers in accordance with predetermined rules established in the system. If such sharing permission has been authorized or granted for each service entity, then shared back-end codebase 908 in conjunction with searching API 941 of the first service entity API searches for an available service provider in each of the authorized portion(s) of database 108 (e.g., in SE 2 DB 922, SE 3 DB 924, or DSP DB 926), in accordance with preset transfer or entity preference rules. If multiple available service providers are then located, in one embodiment the system may select the closest available service provider and assign the request to that service provider. In another embodiment, the system may be configured to permit the customer (e.g., the user of service entity 1 app 911, the user of service entity 2 app 913, the user of service entity 3 app 915, the user of DSP app 917, etc.) to select a particular service provider from, for example, a list of available service providers identified from any of the portions of database 108. For example, indicators may be displayed to the customer depicting relevant factors pertaining to the service providers based on any of a number of preset preferences of the customer (e.g., favorite service provider, preferred service provider, familiarity with the route, gender, language spoken, etc.). In this manner, the customer can find a best matching or most preferred service provider according to the preferences the customer sets with the system.

Alternatively, the white label app (e.g., one of service entity 1 app 911, service entity 2 app 913, service entity 3 app 915, etc.) may be configured such that the customer may query the system to request a service provider from any portion of database 108 in DSP system. If permitted, then the request, through search APIs 941, 943, 945, depending on which service entity app 911, 913, 915 the customer has downloaded, is provided to back-end codebase 908 to search for an available service provider in any one of or all of the portions of database 108 for which permission has been granted by the different service entities. Optionally, the white label app may be configured to automatically enable search for service providers from any portion of database 108 in the DSP system. In such an embodiment, for example, the request may be provided through white label or service entity 1 app 911 to back-end codebase 908 to search for an available service provider through any portion of database 108. In certain embodiments, the permission queried by the customer to search for service providers in all portions of database 108 in DSP system described above may be directly from the customer, a third party, and/or directly from the white label company. Preferably, the system is configured on the back-end to implement this functionality by passing an identifier from the service entity app (i.e., 911, 913, 915). Preferably, back-end codebase 908 is configured such that all white label service entity apps and/or APIs may communicate with the single back-end codebase 908 of the DSP or other technology or software providing entity. Additionally, in certain embodiments, back-end codebase 908 can be configured to parse the trip or other service request according to different base configurations using one or more APIs.

In another embodiment, provided is a computing platform having a shared data-access layer in a distributed structure system that is linked to database 108 for customizable data processing. Preferably, platform or system 100 comprises a server communicatively coupled to network 124 and including processor 104, apportioned database 108 in a multi-user arrangement containing portions allocated to a plurality of entities (e.g., SE 1 DB 920, SE 2 DB portion 922, SE 3 DB portion 924, DSP DB portion 926, etc.), and at least one non-transitory computer-readable storage medium 906 having computer-readable instructions stored therein. Processor 104 executes the computer-readable instructions to receive data or a service request via a first service entity app 911 corresponding to a first entity. Preferably, first app 911, second app 913, and third app 915 are provided with or utilize identical back-end configurations by being operatively coupled to the same back-end server 102 housing shared back-end codebase 908. First app 911, second app 913, third app 915, and DSP app 917, each preferably have individual, independent and customizable front-ends expressed as an application name, an icon, a company logo, screenshots, or a description. First app 911 may be communicatively linked via network 124 to shared back-end application software codebase 908 stored on storage medium 906. Preferably, shared back-end codebase 908 may be formatted as a shared data-access layer, and may be configured to parse the data or service request to determine details thereof by using various APIs of the platform or system 100. The received data is processed via shared back-end codebase 908 communicatively linked to database 108, and system 100 queries, via shared back-end codebase 908, at least a first portion (e.g., SE 1 DB portion 920) of database 108 allocated to the first entity in order to identify an available and matching service provider or object associated with the first entity.

In certain other embodiments, computing devices 130, 132 are configured to display on a display screen an icon of first app 911. The icon may be accessible by a user to launch the first app 911 to search for an object or service provider to complete a service request received from a constituent or customer. First app 911 preferably corresponds to a first service entity and is communicatively coupled to a shared data-access layer in a distributed structure system linked to apportioned database 108 for customizable dispatching. The distributed structure system may comprise a second app 913 or a third app 915 also communicatively coupled to the shared data-access layer and database 108 administered by the first service entity. The display screen preferably displays data relevant to the service request including, but not limited to, one or more of an electronic map display, indicators representing information or service relevant factors related to services for a customer, a service provider or a service entity or any combination thereof.

Figure 10A:
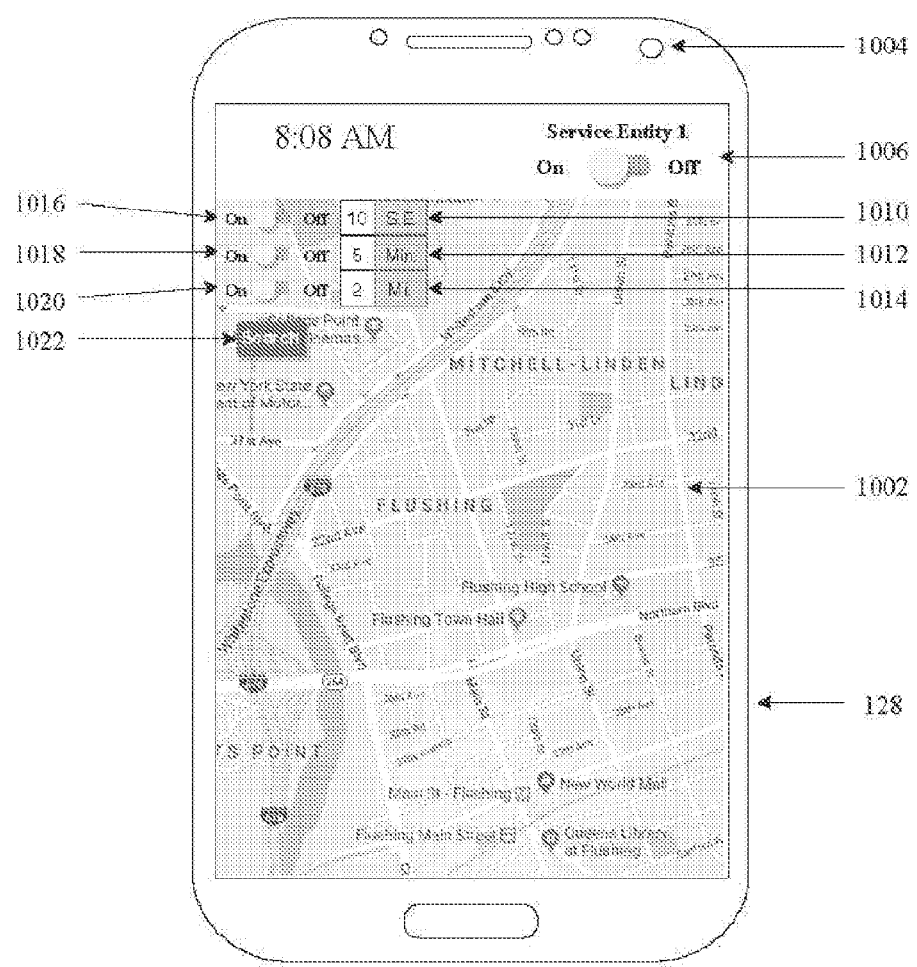
FIGS. 10A-B depict an exemplary mobile platform or remote computing device illustrating display of a customer convertible application program interface where the customer has elected to activate or turn on the service entity 1 search function to limit the search to service providers from a single service entity, in accordance with an exemplary embodiment of the inventive disclosure.
Figure 10B:
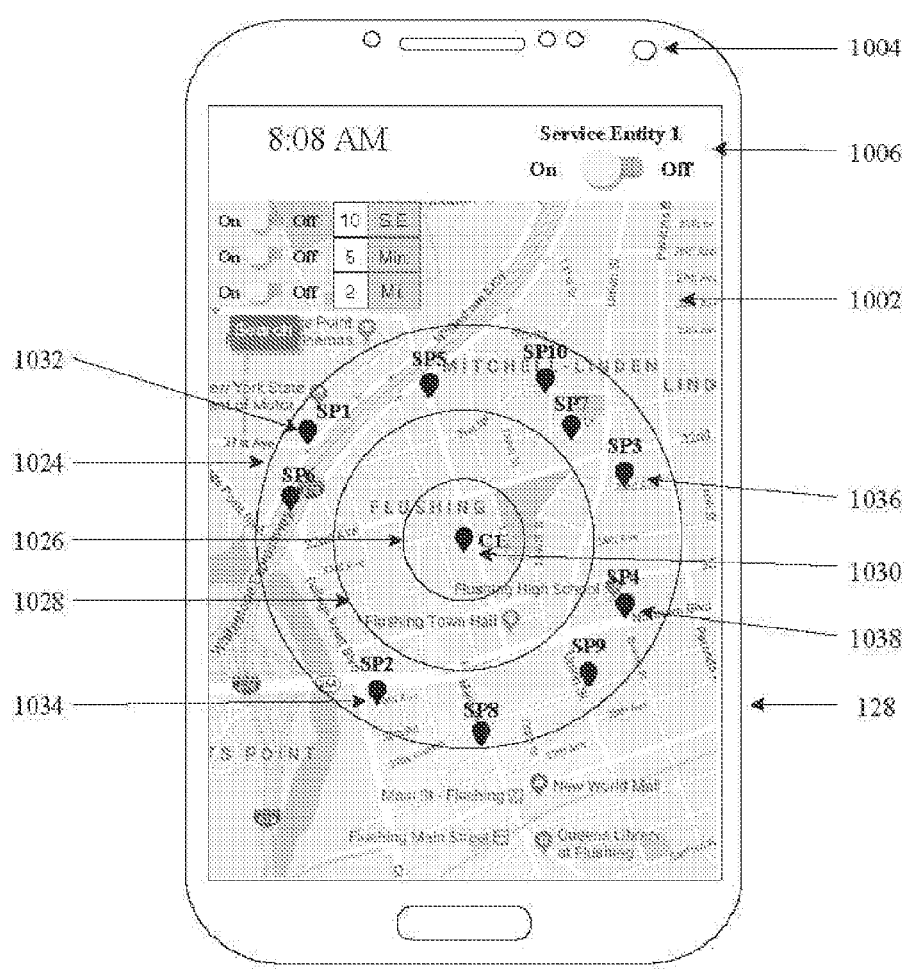
Figure 10C:
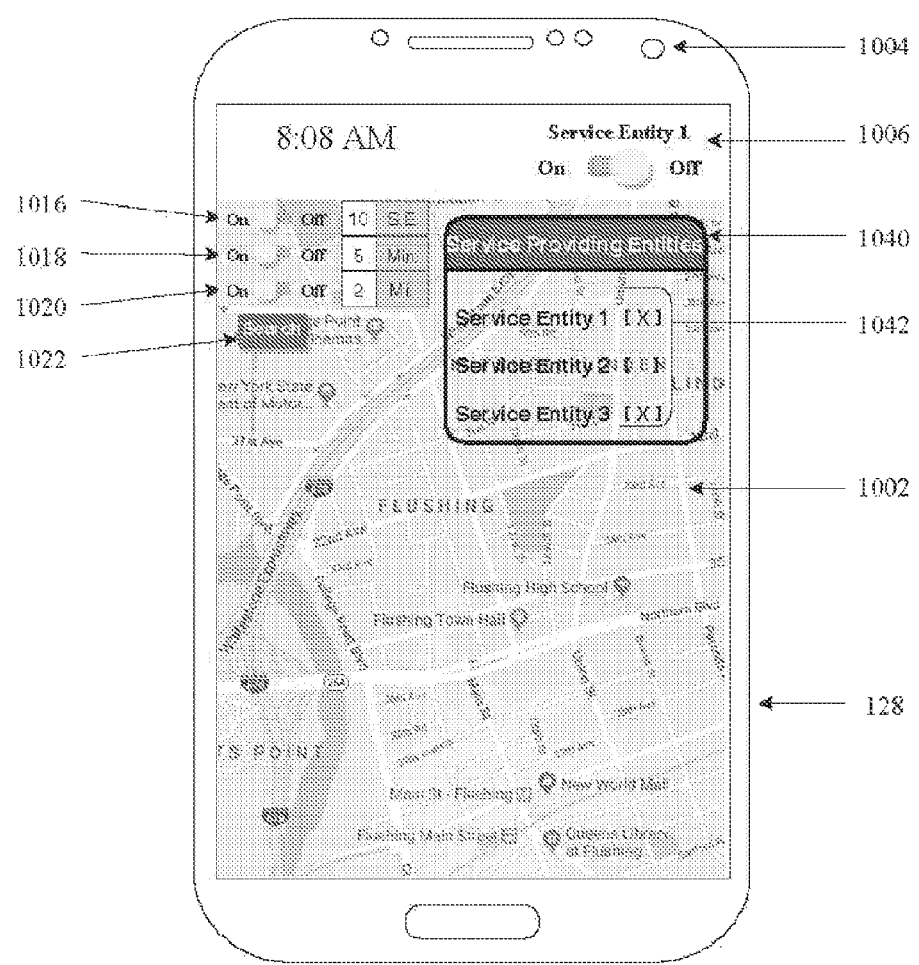
FIGS. 10C-D depict an exemplary mobile platform or remote computing device illustrating display of the customer convertible application program interface where the customer has converted the customer application program interface to expand the search for service providers from all or a plurality of the service entities having service providers stored in the database, in accordance with an exemplary embodiment of the inventive disclosure.
Figure 10D:
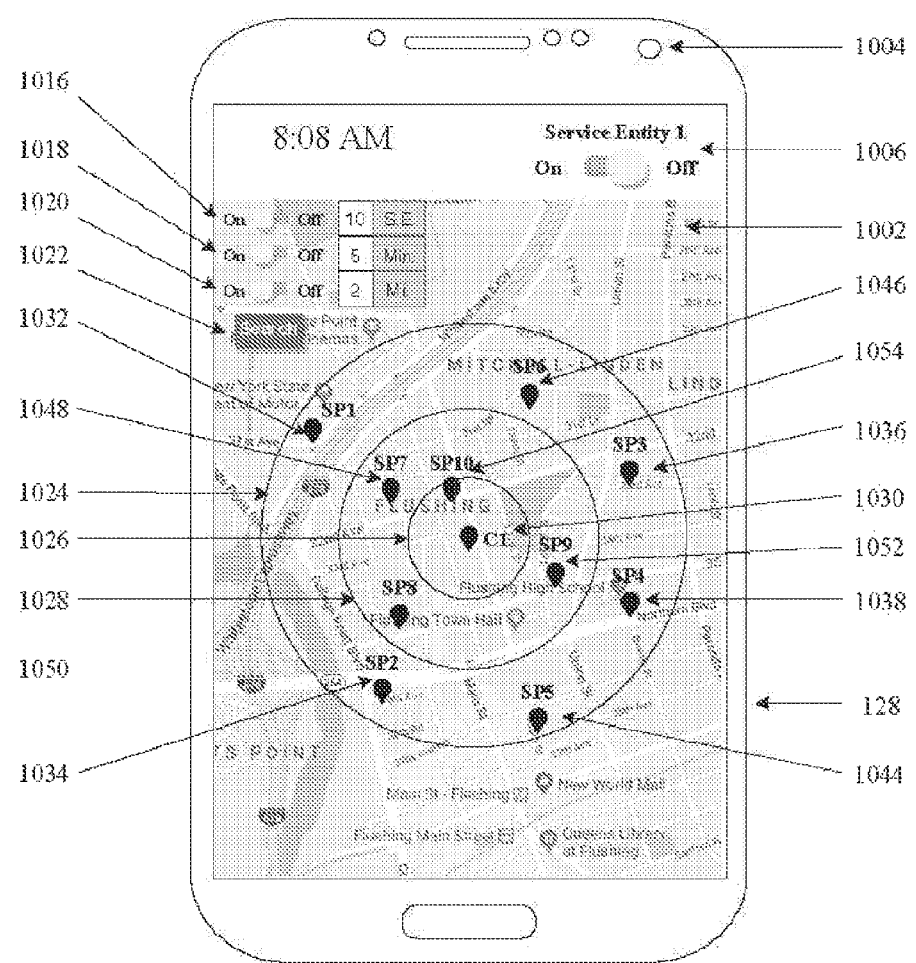

Referring now to FIGS. 10A-D, depicted is mobile platform or remote computing device 128 comprising location identifier 1004 which provides location data about computing device or mobile platform 128. More specifically, FIGS. 10A-B depict an exemplary mobile platform or remote computing device illustrating the customer having elected to limit the search to service providers from a single service entity, while FIGS. 10C-D depict an exemplary mobile platform or remote computing device illustrating the customer having elected to expand the search for service providers from multiple or all of the service entities having service providers stored in the database, in accordance with an exemplary embodiment of the inventive disclosure. Location identifier 1004 may be hardware resident on the mobile phone (as shown) or in the on-board computer of a vehicle of the user of mobile device 128. Mobile platform or device 128 is communicatively linked with computing system 100 and database 108 through a shared back-end codebase. In an alternative embodiment, the platform or computing device may optionally be a standalone PC with a monitor.

Mobile platform 128 preferably has display or GUI 1002 for displaying an application image or icon representative of an application program associated with one service entity. Preferably the application program is communicatively linked via the network to the shared back-end application software codebase by being operatively coupled to server 102. Alternatively, the service entities may cooperate or be communicatively coupled directly (i.e., not through a shared back-end application software codebase) so as to cooperatively share service providers or objects with each other's customers. The application program preferably has a customizable front-end that is independent from the shared back-end application software codebase. After the user launches the application program by selecting (e.g., by clicking or double-clicking) the application image, mobile platform or device 128 displays an interactive electronic interface depicting adjustable search parameters. The search parameters are preferably selectable by the customer to launch an application for the selected parameter. Preferably, one of the selectable search parameters is indicative of whether the service entity whose application program is being used by the customer connects with only that service entity's database of service providers, or if it communicates with the entire database of service providers on database 108 in accordance with predetermined rules. The graphical representation of the electronic interface may then display identifications of the available service providers from only the first service entity who match preset preferences of the customer, and indicators that correspond to each of the identified available service providers of the first service entity.

Alternatively, in response to input from or by the customer, mobile device 128 may display on the display screen a graphical representation of an interactive menu of additional service entities working with the system. Preferably, each of the additional service entities is selectable by the customer for inclusion in the identification of the one or more available service providers. In this embodiment, the graphical representation of the electronic interface may then display identifications of the available service providers from both the first service entity and the additional service entities, as selected by the customer or as preset by the system, that match the preset preferences of the customer, and indicators that correspond to each of the available service providers. The indicators preferably reflect service relevant data corresponding to each of the available service providers. The available service providers displayed on the display screen are preferably selectable by the customer, such that after the system receives a selection of one service provider by the customer and then assigns data or the service request to the selected service provider.

In certain embodiments, a customer presets his/her search parameters to search for available potential objects or service providers for his/her type of service request. In addition to search for potential available service providers, the system may also search for other available customers currently requesting the same type of service and whose current location is within the search parameters preset by this customer. In one embodiment, the customer, having downloaded Service Entity 1 App 911, may turn "on" Service Entity 1 button 1006 to elect to have the system only search for available service providers only from the SE 1 DB 920 portion of database 108. In this embodiment, as depicted in FIGS. 10A-B, the customer may be provided on the display screen with selectable search parameters 1010, 1012, 1014 (here three parameters are shown, but it would be known to include more or fewer search parameters) which he/she can choose from, and the search can use one or more or any combination of these search parameters 1010, 1012, 1014. As depicted, the customer is provided the option to perform a search by the number of service providers 1010 with whom he/she wants to negotiate. To activate this search parameter, the customer needs to turn it on using on-off toggle or switch 1016, enter the desired number of providers, and click the "Search" button 1022.

The customer also has an option to perform a search by time 1012. To do so, he/she will need to activate this option by turning on button 1018, enter the number for the time within which he/she wants the pickup to occur, for instance, 5 minutes, and click "Search" button 1022. The customer may also be provided an option to perform a search by distance 1014. To do so, the customer will need to activate distance search by turning on button 1020. Once on, the customer will enter the number for the distance within which he/she wants the system to perform a search, for instance, 2.0 miles and click "Search" button 1022. Using parameter search on/off toggles or switches 1016, 1018, 1020, the customer may opt to only search based on one, two or all of search parameters 1010, 1012, 1014. As seen in FIG. 10B, the user or customer 1030 may then be displayed along with his/her pool of available service providers identified by the system within the preset search parameters by number 1010, time 1012, and/or distance 1014 on the electronic map display of GUI 1002. The results of the search parameters may be displayed as geographic zones (i.e., zone 1024, zone 1026, and zone 1028) resulting from the search. For example, the results of the search by time (e.g., within the five-minute parameter), as shown, identifies no service providers from the service entity 1 displayed within the time or distance parameters. That is, all of the identified available service providers of Service Entity 1 (e.g., SP1 (1032), SP2 (1034), SP3 (1036), SP4 (1038), as well as SP5-SP10) are outside of both the time 1026 and distance 1028 zones established by the search parameters. The customer may then have the option of selecting one of the displayed service providers, or alternatively, modifying the search parameters (i.e., changing the time and/or distance) to retrieve modified results. In addition, the customer may have the option to deactivate or turn off the service entity 1 button 1006 and have the system search for available service providers from other service entities stored in database 108.

In this embodiment, as depicted in FIGS. 10C-D, the customer, upon deactivating or turning off Service Entity 1 button 1006, may be provided with a drop-down search menu 1040 displayed on the electronic map display of GUI 1002, as depicted in FIG. 10C, for identifying additional service entities 1042, or a plurality of service entities, from which the customer can search for available service providers. The plurality of service entities preferably includes service entity 1 and all additional service entities (i.e., service entity 2, service entity 3, etc.), or may alternatively only include service entities other than service entity 1. The customer may then click on one or more or all of the additional service entities 1042 listed in menu 1040. Based on or in accordance with the search parameters 1010, 1012, 1014, and the customer's selection of service entities 1042, new search results may be displayed, as depicted in FIG. 10D. As shown, indications of the user or customer 1030 may then be displayed on the electronic map display of GUI 1002 along with indications of his/her pool of available service providers identified by the system within the preset search parameters by number 1010, time 1012 and distance 1014. The search parameters may reflect the geographic zone (i.e., zone 1024, zone 1026, and zone 1028) resulting from the search.

For example, the results of the search by time (e.g., within the five-minute parameter) may now identify at least four service providers (i.e., SP7 (1048), SP8 (1050), SP9 (1052), and SP10 (1054)) from the additional service entities displayed within the selected time and distance parameters, while SP1 (1032), SP2 (1034), SP3 (1036), SP4 (1038), as well as SP5 (1044) and SP6 (1046) still fall outside of the time and distance parameters. That is, as shown, of the requested ten available service providers, four of the ten are displayed as meeting the time and/or distance parameters set by user or customer 1030. The customer then has the option of selecting one of the displayed service providers, or alternatively, further modifying the search parameters (i.e., changing the time and/or distance) to retrieve modified results. Optionally, customer 1030 may switch at any time back to searching for service providers from only the single entity by simply toggling or switching button 1006 back to the off position. Also, optionally, the fees associated with completion of the service request may be shared, or otherwise divided, between one or more of the service providers completing the request. A similar arrangement may exist between one or more service entities, between one or more service providers and one or more service entities, between one or more service entities/service providers and some other third-party involved in the completion of the service request, or any combination thereof.

The service provider's information may also be provided by a set of indicators which identify, for example, that he/she is a "regular" or "preferred" or "favorite" service provider for the customer, patient, etc., that he/she has a 50% route familiarity with the requested route to the destination or service location, his/her proposed price, whether the price is higher or lower than the default price, his/her estimated time of arrival to the requested pickup or service location, the number of times he/she has provided service to the customer, patient, etc., the type of services he/she provides, etc. In addition to the service provider's information, the indicators may also include various action buttons that allow the user to perform different actions regarding, for example, the service provider's price proposal, such as to accept, reject or initiate the negotiation process (e.g., pressing a button with a check mark allowing the user to accept the final price with this service provider, pressing a button with a 'X' allowing the user to reject this service provider, pressing a bi-arrow button allowing the user to exchange supply and demand information with the service provider, pressing a "P/C" button allowing the user to make a price proposal or counter the price proposed by the service provider, etc.). A second search parameter reflects the geographic zone resulting from the search by distance (e.g., within 1.5 miles) which may identify two more service providers, and two more users requesting services, as seen from a set of indicators displayed within the parameters. If the user needs a detailed explanation of the information provided by the indicators for each of the displayed service providers, he/she can click on another button (e.g., a "List of Service providers for User" button or tab), which will redirect him/her to the corresponding interface. One of ordinary skill in the art will appreciate that the interface depicted in FIGS. 10A-D is for illustrative purposes only and there could be other variations to the interface depicted herein.

Figure 11A:
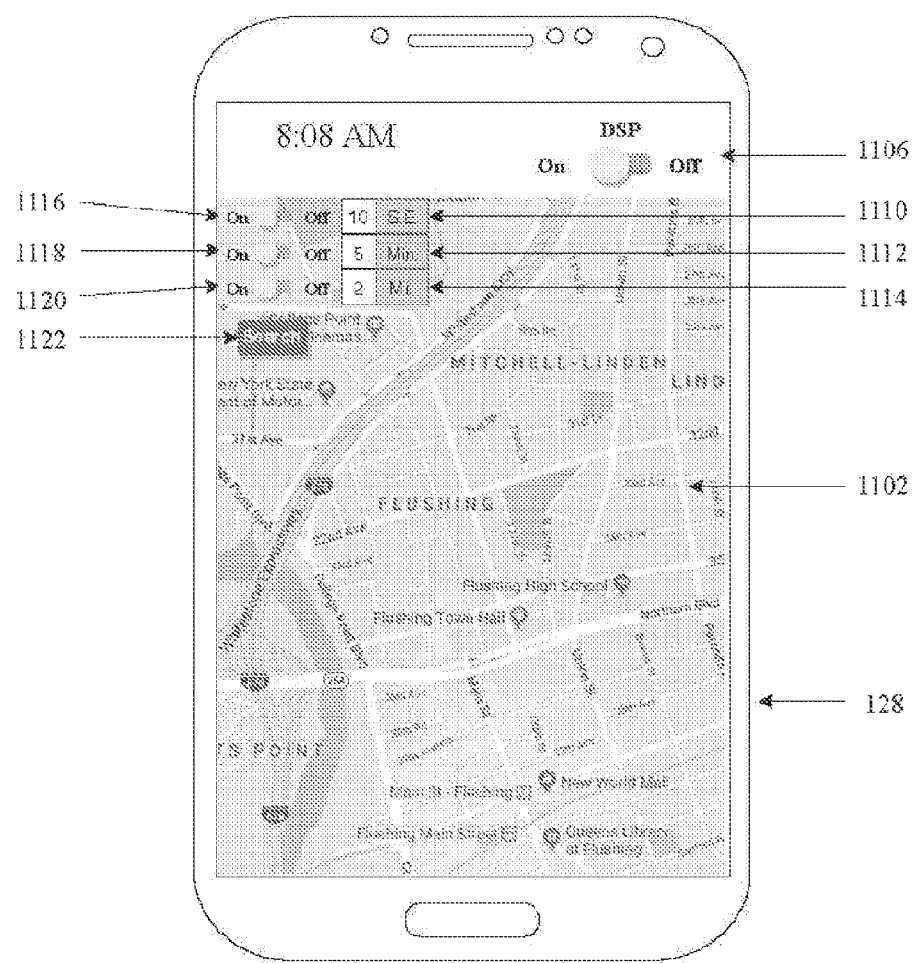
FIGS. 11A-B depict an exemplary mobile platform or remote computing device illustrating display of a customer convertible application program interface where the customer has elected to activate or turn on the DSP search function to expand the search for service providers from the entire DSP database, in accordance with an exemplary embodiment of the inventive disclosure.
Figure 11B:
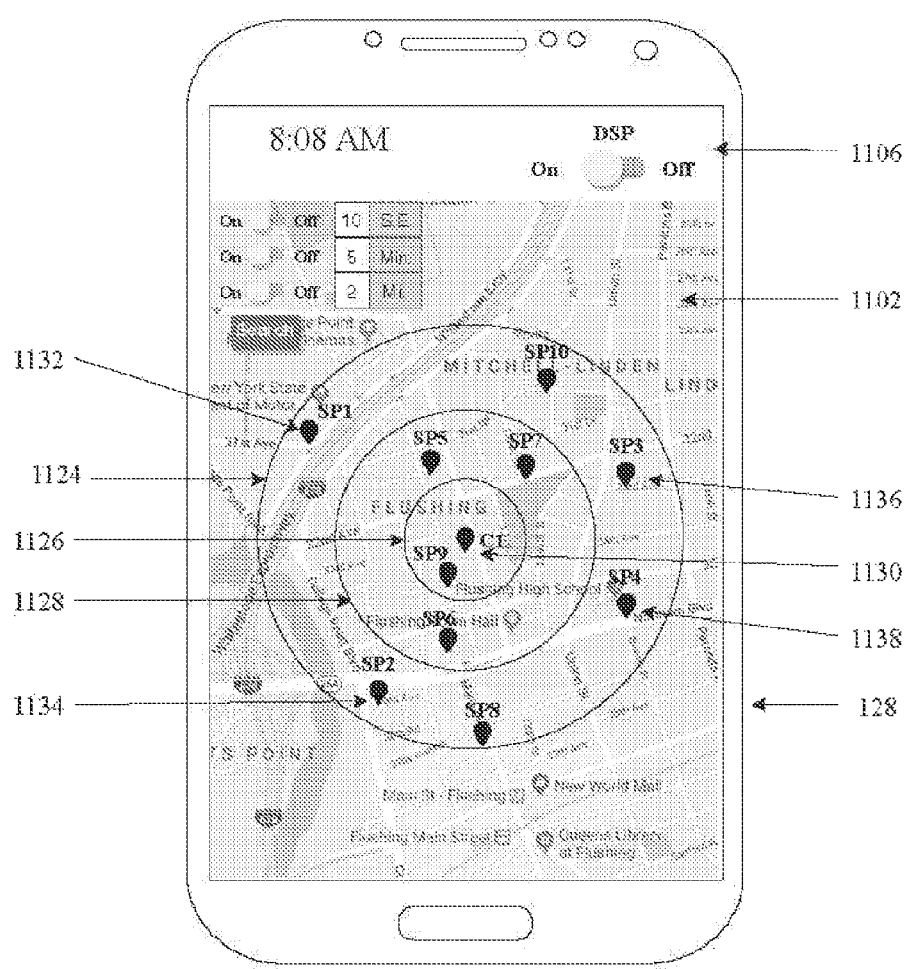

Yet another alternative embodiment of the inventive disclosure is depicted in FIGS. 11A-D. In particular, FIGS. 11A-B depict an exemplary mobile platform or remote computing device illustrating display of an application program interface where the customer has elected to activate or turn on the DSP search function to enable or expand the search for service providers to the entire DSP database. While the figures depict a DSP conversion or switch function through DSP button 1106, it will be appreciated that this switch may alternatively be for any other SPE or technology company providing the back-end software codebase. In certain embodiments, a customer presets his/her search parameters to search for available potential objects or service providers for his/her type of service request. In addition to search for potential available service providers, the system may also search for other available customers currently requesting the same type of service and whose current location is within the search parameters preset by this customer. In one embodiment, the customer having downloaded DSP app 917 may turn "on" DSP button 1106 to elect to have the system search for available service providers from the entire database 108 (i.e., from each of SE 1 DB 920, SE 2 DB 922, SE 3 DB 924, DSP DB 926, etc.). In this embodiment, as depicted in FIGS. 11A-B, the customer may be provided on the display screen with selectable search parameters 1110, 1112, 1114 (here three parameters are shown, but it would be known to include more or fewer search parameters) which he/she can choose from, and the search can use one or more or any combination of these search parameters 1110, 1112, 1114. As depicted, the customer is provided the option to perform a search by the number of service providers 1110 with whom he/she wants to negotiate. To activate this search parameter, the customer needs to turn it on using on-off switch 1116, enter the desired number of providers, and click the "Search" button 1122.

The customer also has an option to perform a search by time 1112 by activating this option by turning on button 1118 and enter the number for the time within which he/she wants the pickup to occur (i.e., within 5 minutes) and click "Search" button 1122. The customer may also be provided an option to perform a search by distance 1114 by activating the distance search by turning on button 1120. Once on, the customer may enter the distance within which he/she wants the system to perform a search (i.e., search for objects with 2.0 miles) and click "Search" button 1122. Using parameter search on/off switches 1116, 1118, 1120, the customer may opt to only search based on one, two or all of search parameters 1110, 1112, 1014. As seen in FIG. 11B, the system then displays on the electronic map display of GUI 1102 the user or customer 1130 (e.g., C1) along with his/her pool of available service providers (e.g., SP1-SP10) identified by the system to be within the preset search parameters by number 1110, time 1112, and/or distance 1114. The results of the search parameters may be displayed as geographic zones (i.e., zone 1124, zone 1126, and zone 1128) resulting from the search. For example, the results of the search by time 1112 are represented by zone 1126 (e.g., within the five-minute parameter), as shown, identifies and displays only one available service provider (e.g., SP9) from the DSP database meeting the time and/or distance search parameters, while certain service providers fall outside of the time and/or distance parameters (e.g., SP1 (1132), SP2 (1134), SP3 (1136), SP4 (1138), as well as SP8 and SP10). Similarly, the display illustrates that four available service providers (e.g., SP5, SP6, SP7, and SP9) are identified to be within both the time and distance limitations or parameters set by the customer. Once again, the available service providers may be displayed along with indicators representative of service relevant factors as discussed herein. The customer may then have the option of selecting one of the displayed service providers, or alternatively, modifying the search parameters (i.e., changing the time and/or distance) to retrieve modified results. In addition, the customer may have the option to deactivate or turn off the DSP button 1106 and have the system search for available service providers from other service entities stored in database 108 in a customized format or manner.

Figure 11C:
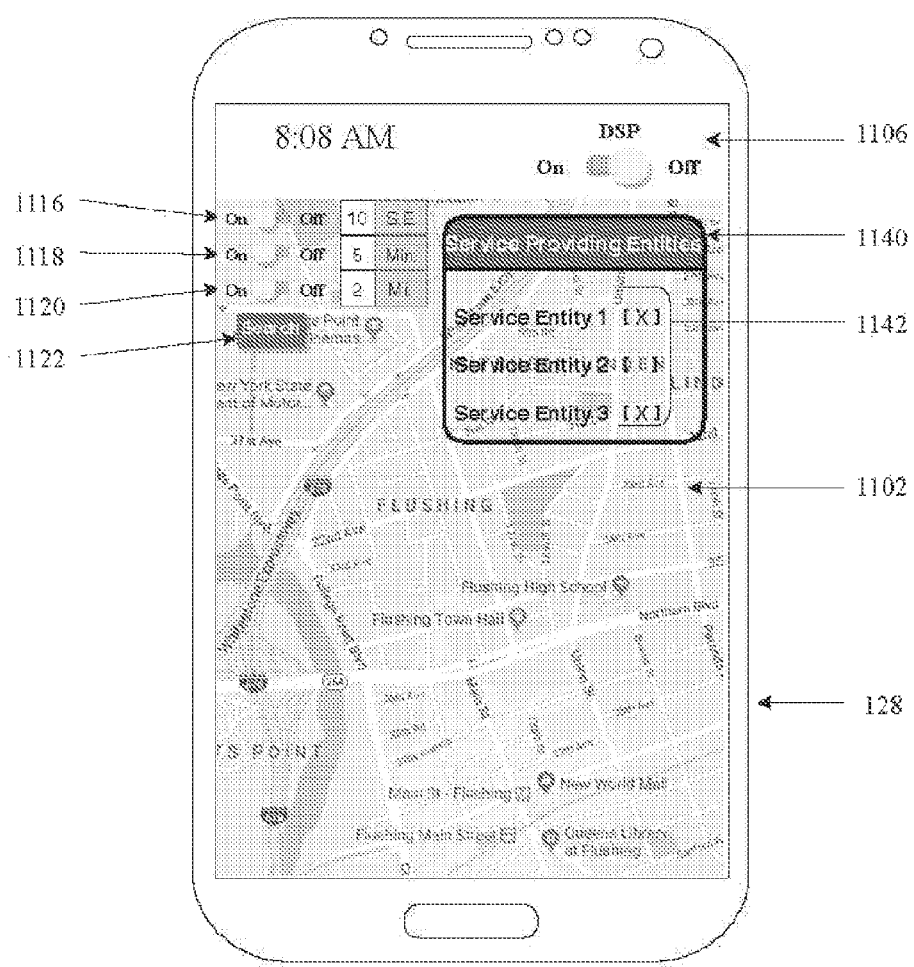
FIGS. 11C-D depict an exemplary mobile platform or remote computing device illustrating display of the customer convertible application program interface where the customer has converted the customer application program interface to deactivate or turn off the search function for the entire DSP database and limit the search to one or more specific service entities having service providers stored in the database, in accordance with an exemplary embodiment of the inventive disclosure.
Figure 11D:
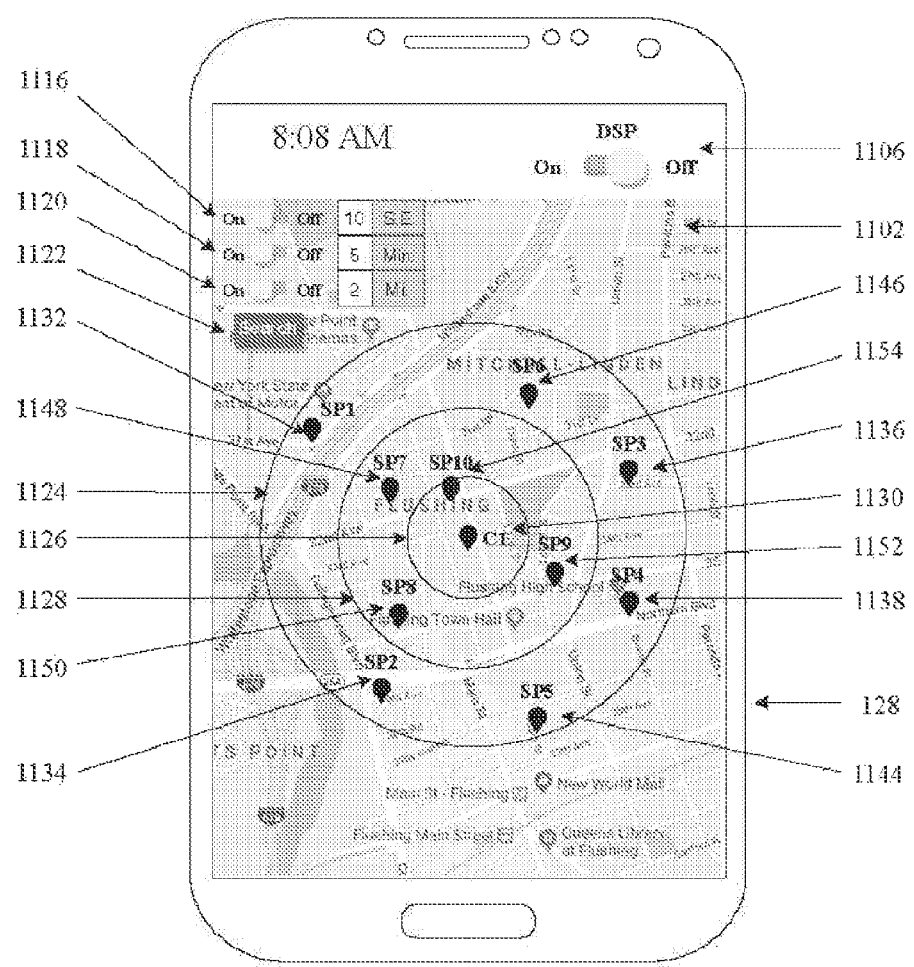

Turning to FIGS. 11C-D, depicted an exemplary mobile platform or remote computing device illustrating display of an application program interface where the customer has elected to deactivate or turn off the DSP search function and enable a customized or customizable search format where the customer may search one or more specific ones of the service entities having service providers stored in the entire database. In this embodiment, as depicted in FIGS. 11C-D, the customer, upon deactivating or turning off DSP button 1106, may be provided with a drop-down search menu 1140 displayed on the electronic map display of GUI 1102, as depicted, for example, in FIG. 11C, for identifying one or more service entities 1142 from which the customer can customize his/her search for available service providers. Accordingly, the customer may click on or select one or more or all of the additional service entities 1042 listed in menu 1140. That is, the customer may choose to preclude certain service entities from his/her search for available service providers by not selecting one or more of them from menu 1140. Based on or in accordance with the customer's search parameters 1110, 1112, 1114, as well as the customer's selection of certain service entities 1142, new search results may be displayed, as depicted in FIG. 11D. In certain embodiments, one or more inputs to a respective service entity 1 may function to open/launch a respective application of such service entity 1.

As shown in FIG. 11D, indications of the user or customer 1130 may then be displayed on the electronic map display of GUI 1102 along with indications of his/her pool of available service providers (i.e., SP1-SP10) identified by the system within the preset search parameters by number 1110, time 1112 and distance 1114 (FIG. 11A). The search parameters may optionally be reflected or represented by geographic zones (i.e., zone 1124, zone 1126, and zone 1128) as a result of the search. For example, the results of the search by time (e.g., within the five-minute parameter) may be represented as zone 1128 and identify at least four service providers (i.e., SP7 (1148), SP8 (1150), SP9 (1152), and SP10 (1154)) from the additional service entities displayed within the selected parameters, while only one available service provider (i.e., SP10 (1154)) is identified as being within zone 1126 based on distance. That is, as shown, of the requested ten available service providers, four of the available service providers (i.e., SP7 (1148), SP8 (1150), SP9 (1152), and SP10 (1154)) are displayed as meeting the time and/or distance parameters set by user or customer 1130, while SP1 (1132), SP2 (1134), SP3 (1136), SP4 (1138), as well as SP5 (1144) and SP6 (1146) still fall outside of the time and distance parameters. Here too the available service providers may be displayed along with indicators representative of service relevant factors as discussed herein. The customer then has the option of selecting one of the displayed service providers, or alternatively, further modifying the search parameters (i.e., changing the time and/or distance) to retrieve modified results. Optionally, customer 1130 may toggle between, switch or turn back on DSP button 1106 at any time to again search for available service providers from the entire DSP database of available service providers.

Figure 12:
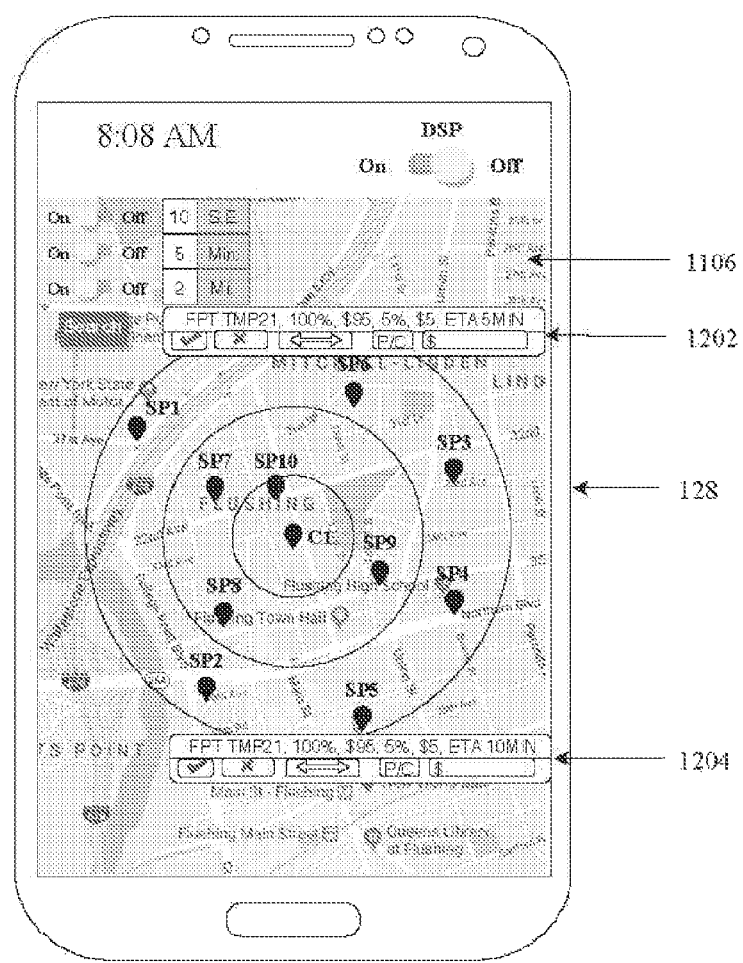
FIG. 12 depicts an exemplary mobile platform or remote computing device as illustrated in FIG. 11D, further depicting indicators representing service relevant factors for at least two of the service providers displayed, in accordance with an exemplary embodiment of the inventive disclosure.

Turning next to FIG. 12, depicted is an exemplary mobile platform or remote computing device illustrated in FIG. 11D, further depicting indicators representing service relevant factors for at least two of the service providers displayed, in accordance with an exemplary embodiment of the inventive disclosure. As shown, FIG. 12 depicts an exemplary interface 1106 responsive to an input by a customer for one or more search parameters provided on the interface. In this depiction, a customer C1 has preset his/her search parameters to search for available potential service providers for his/her type of service request. In addition to searching for potential available service providers, the system may perform a search for other available customers who are currently requesting the same type of service and whose current location is within the search parameters preset by this customer. The customer preferably has three search parameters which he/she can choose from using one or more or any combination of search parameters. The customer has an option to perform a search by the number of service providers he or she wants to negotiate with, by the time it will take the service provider to get to the customer, and/or the distance the service provider is away from the customer. As shown, the customer will then see his/her pool of available potential service providers identified by the system within the preset search parameters by both time and distance on electronic map display 1106, as well as geographic zones resulting from the search by time, distance and number. The customer C1 may also see displayed on interface 1106 service provider information via one or more sets of indicators 1202, 1204 (e.g., showing "FPT TMP21; 100%; $95; 5%; $5; ETA: 5Min" and "FPT TMP21; 95%; $85; 8%; $6; ETA: 4Min", respectively) meaning that he/she is a favorite service provider for transport service "FPT," and that he/she has a 100% or 95% route familiarity with the requested route in the service request. His/her proposed price is $115 or $85, which is 5% or 8% (i.e., $5 or $6) higher than the default price, and his/her ETA to the location of the service request is 5 minutes or 4 minutes. In addition to the service providers indicator information, there are also various action buttons that allow the customer to perform different actions regarding, for example, the service provider's price proposal, pressing or clicking on the button with a check mark allows the customer to accept the final price with this service provider (e.g., pressing or clicking on the X button allows the customer to reject this service provider; pressing or clicking on the bi-arrow button allows the customer to exchange supply and demand information with the service provider; pressing or clicking on the "P/C" button allows the customer to make a price proposal or counter the price proposed by the service provider, etc.). To make his or her price proposal or to counter a service provider's price proposal, the customer would first enter the amount into the input box on the very right to initiate the negotiation process and then press or click on the "P/C" button. One of ordinary skill in the art will appreciate that the interface depicted in FIG. 12 is for illustrative purposes only and there could be other variations to the interface depicted herein.

It will be appreciated that embodiments of the present invention provide an improved user interface and convertible user application. A user can quickly and efficiently move through various options of the convertible user application on a small display screen of a mobile device, efficiently glean information about one or more business entities, and select one of them for a transaction. As cellphones still have relatively small screens compared to computers, yet are becoming faster and better able to conduct more comprehensive tasks, such user-friendly features which allow a user to easily navigate or switch between different tasks or windows, and which allow the user to obtain as much information as possible with minimal touches, clicks, or movement, are highly advantageous.

In certain embodiments, various modifications of the user interface may be provided. For example, dropdown menus may be provided to the user interfaces discussed herein. The text of any filters, switches, and other frames can be layered, and may have different sizes or changes in transparency. In yet other embodiments, when the user is not touching the display, the display may be configured to automatically return to a standard view. In yet other embodiments, displays of text, drop boxes, logos, etc. may be configured to change in transparency.

It will be appreciated that users of the convertible user application discussed herein do not need to exit one application to open another. Instead, users can simply switch the convertible user application and select one or more icons, brands, or names associated with other connected business entities sharing backend software, all without exiting the single convertible user application.

In certain embodiments, when the user filters (e.g., turns DSP on/off) he/she may immediately see a number of drivers increasing or decreasing. As illustrated and described above, graphical displays corresponding to various adjustable search parameters selected by the user may be displayed while other of the adjustable search parameters not selected by the user remain in an unlaunched state.

In certain embodiments, displays may be configured to enable the user to easily switch between different frames or layers using a swiping movement via a touch screen. In other embodiments, when the user touches, selects or clicks on a text, box, drop box, ratio button, logo, picture, image, etc., the user may receive a popup message or a message in a separate frame/window that the user can touch, click, and select to instruct the convertible user application to do another function, such as opening another frame, window, application, or to enable the user to compare or purchase a particular product or service. When the user touches, selects, scroll, or clicks, text which is displayed may be highlighted. In certain embodiments, the computing device of the user may be configured to learn and recognize patterns easily recorded or automatically recognized, adjusted and performed in order to optimize the productivity and efficiently of the user when selecting or purchasing a product or service. In yet other embodiments, the system can anticipate a user's next step, and act in anticipation thereof, such as opening a next frame or window of application before the user has clicked on the button, image, or text.

It will be appreciated that a user of a convertible user application described herein does not need to register with each connecting entity to see products and services from the other connecting entities. It can be time-consuming for consumers looking for a particular good or service to download multiple apps to connect with multiple business entities or with service providers affiliated with multiple business entities. Users frequently have to swipe their screen to a new blank or partially filled screen in order to fit more apps, may forget about certain apps, or may drain their battery faster due to more apps running on their phone simultaneously. The present invention additionally addresses these problems as a single sign-on (e.g., with a single username and password) can give the user access to all connecting entities via one downloadable app.

Turning now to FIGS. 13A-14B, systems and methodologies for using embodiments of the invention in an online e-commerce context are now described. The convertible user application described herein may be utilized by, for example, small, mid-sized, or startup companies who wish to build their brand. In today's ecommerce industry, building a brand can be costly as a business typically needs to spend money to buy advertisement space and/or promote it's brand. There may be little space for smaller e-commerce businesses in an e-commerce market dominated by a small number of mega e-commerce businesses. The smaller e-commerce businesses are thus resigned to promoting their products without sufficient ability to promote their brand. Additionally, as described above, online purchasing websites and marketing companies are often more interested in promoting their own brands, and may minimize the business entity's logo or name while promoting the product. The present invention allows small e-commerce businesses to promote their brand, establish firm contact with consumers who download the convertible user application with their front end, which displays their brand/logo. In this manner, the small e-commerce businesses can better compete with the mega/large e-commerce businesses. The present invention enlarges the scope or reach of small e-commerce businesses while helping them to build a customer base and brand name recognition.

Figure 13A:
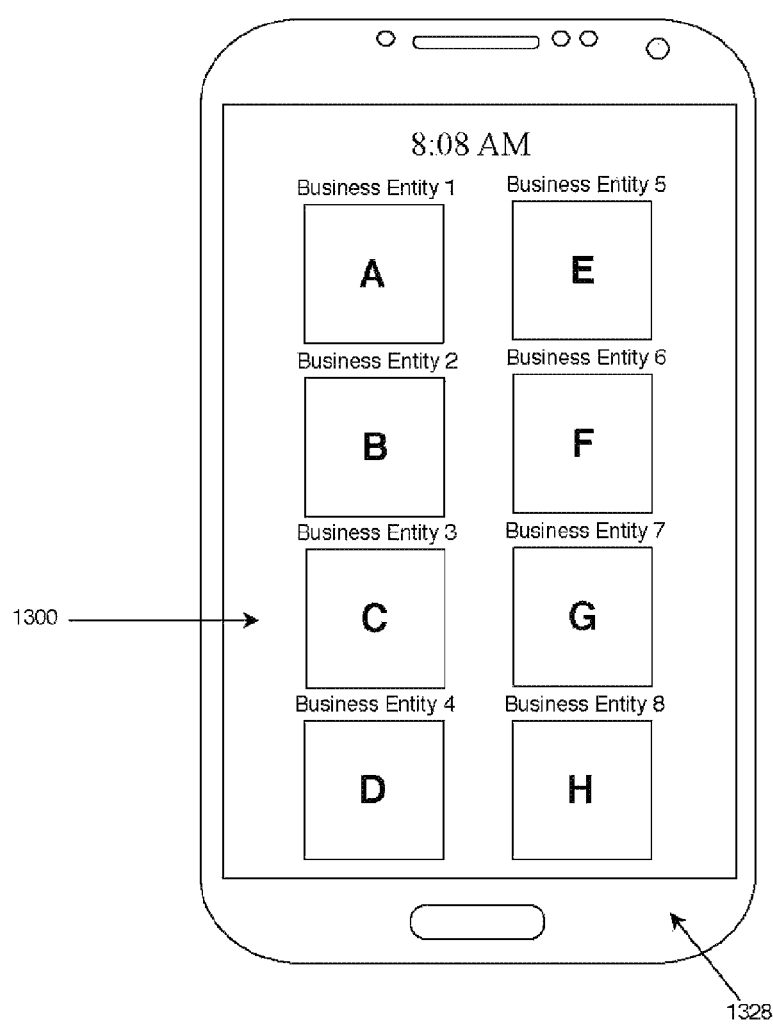
FIG. 13A depicts a schematic diagram illustrating an exemplary array of e-commerce convertible user applications available for download in an apps store, with each e-commerce convertible user application associated with a different business entity and having a unique front end for displaying the business entity's particular brand in accordance with exemplary embodiments of the inventive disclosure.

As shown in FIG. 13A, various e-commerce convertible user applications A-H associated with, respectively, business entities 1-8, may be presented and available for download in an apps store such as the Apple® App Store, Google® App Store, or other App Stores where users download their Applications. The convertible user applications A-H display their respective company brands or logos (schematically shown as 'A', 'B', 'C', etc.) through their respective front ends of their respective convertible user applications, and are connected to one another through a shared backend as described above. The apps may be shown on a display screen 1300 of a computing device accessing the app store online. In preferred embodiments, a software company may house the shared backend (further discussed below), which may or may not additionally participate in providing goods or services.

Figure 13B:
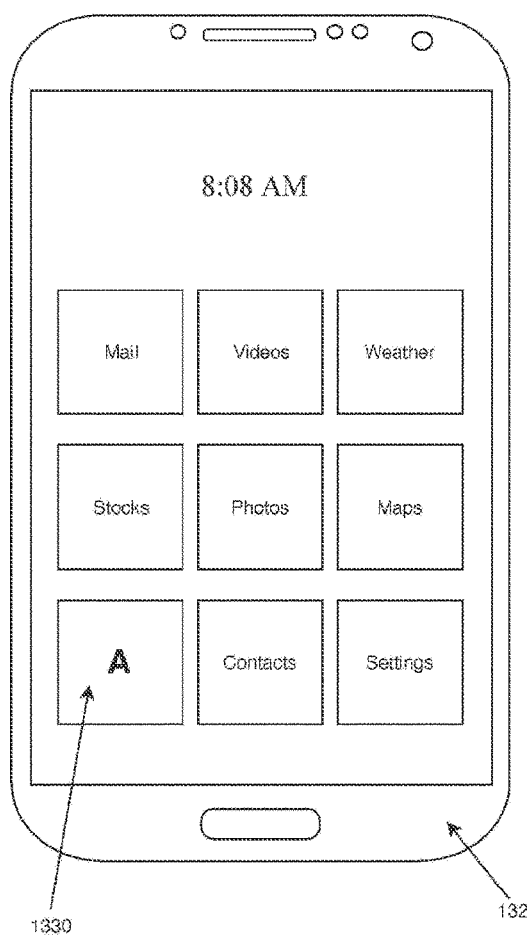
FIG. 13B depicts display of an icon associated with a particular one of the e-commerce convertible applications illustrated in the apps store in FIG. 13A, downloaded to a mobile phone or other remote computing device of a user.

As shown in FIG. 13B, a user has selected business entity 1 (which has a brand/logo shown schematically as 'A' for ease of illustration) from the app store display of FIG. 13A, and has downloaded business entity A's convertible user application to his or her computing device 1328. Icon 1330 is displayed on the user's device 1328, showing business entity 1's logo, 'A'.

Figure 13C:
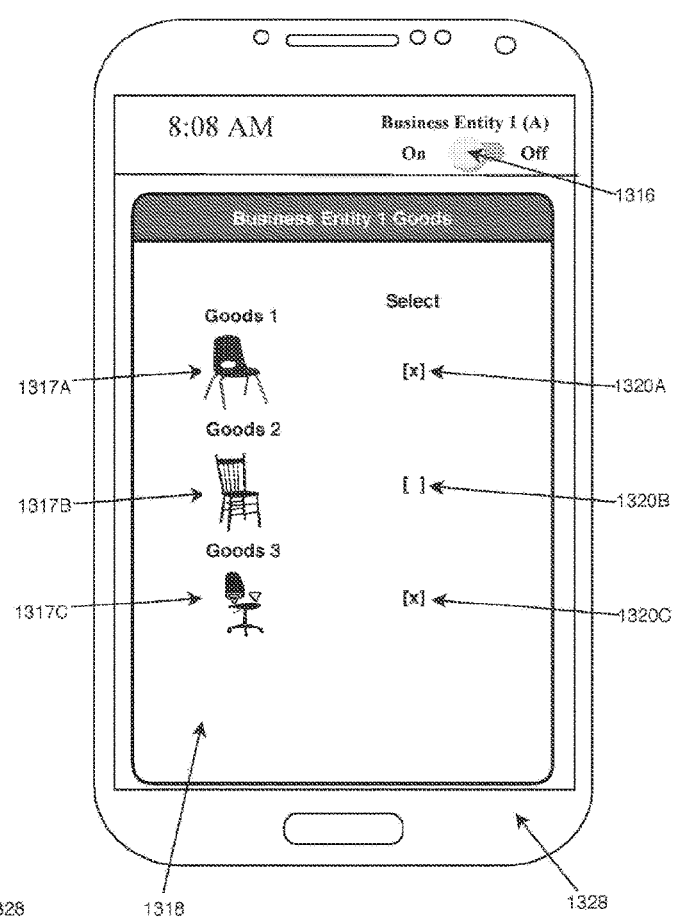
FIG. 13C depicts an exemplary mobile platform or remote computing device illustrating display of a customer convertible application program interface where the customer has elected to activate or turn on the business entity 1 (A) search function to limit the search to the single e-commerce business entity, in accordance with an exemplary embodiment of the inventive disclosure.

As shown in FIG. 13C, the user has clicked on logo 'A' and launched business entity A's convertible user application with toggle or switch 1316 in the 'on' position. Several types of chairs 1317A, 1317B, 1317C of business entity A are displayed for the user on a user interface 1318, and may be selected by checking respective boxes 1320A, 1320B, 1320C. In certain embodiments, the user may have typed 'chair' into the keyword search box 1319 (FIG. 13D) prior to seeing interface 1318. As toggle 1316 is in the 'on' position, no goods of other connected service entities are displayed.

Figure 13D:
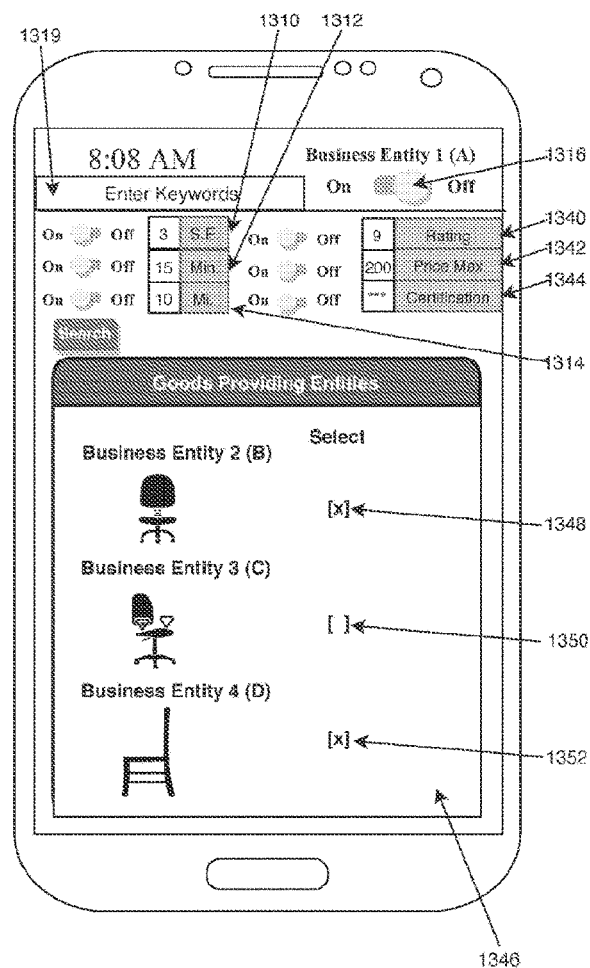
FIG. 13D-E depict an exemplary mobile platform or remote computing device illustrating display of the customer convertible application program interface where the customer has converted the customer application program interface to expand the search for other business entities stored in the backend database who are associated with the goods or services desired, in accordance with an exemplary embodiments of the inventive disclosure.

As shown in FIG. 13D, the user has moved toggle 1316 to the 'off' position, and thus converted the customer application program interface to expand the search to other business entities stored in the backend database who are associated with the goods. The user has also inputted to adjustable search parameters 1310, 1312, 1314, 1340, 1342, 1344 as he/she only wishes to see three types of chairs, chairs which are located within approximately a fifteen min drive, within 10 miles, have a rating of at least '9', and a certification of at least three stars. As shown, a user interface 1346 displays respective chairs of connected business entity 2 (with logo 'B'), business entity 3 (with logo 'C'), and business entity 4 (with logo 'D'). The user may similarly make selections by checking respective boxes 1348, 1350, 1352. It will be appreciated that the user is thus able to engage in e-commerce and connect to multiple business entities through a single convertible user application downloaded to his/her phone. In certain embodiments, since the user is using business entity A's app, when the user buys business entity B's product or business entity C's product, business entity A may be entitled to a cut or portion of the profits. In other embodiments, connecting business entities may simply refer one another without taking a cut of any transaction proceeds. It will be appreciated that since business entity A has gotten its app on the user's phone, the user will see the logo/brand 'A' every time he/she launches the convertible user application, this improving business entity A's brand recognition with respect to that user, and establishing a more direct relationship with the user. If a user ultimately decides that he/she prefers business entity 'C', and no longer wishes to deal with 'A', then such user may simply download the convertible user application for 'C' from the app store so that when he/she launches the app, he/she will first see C's products or services.

Figure 13E:
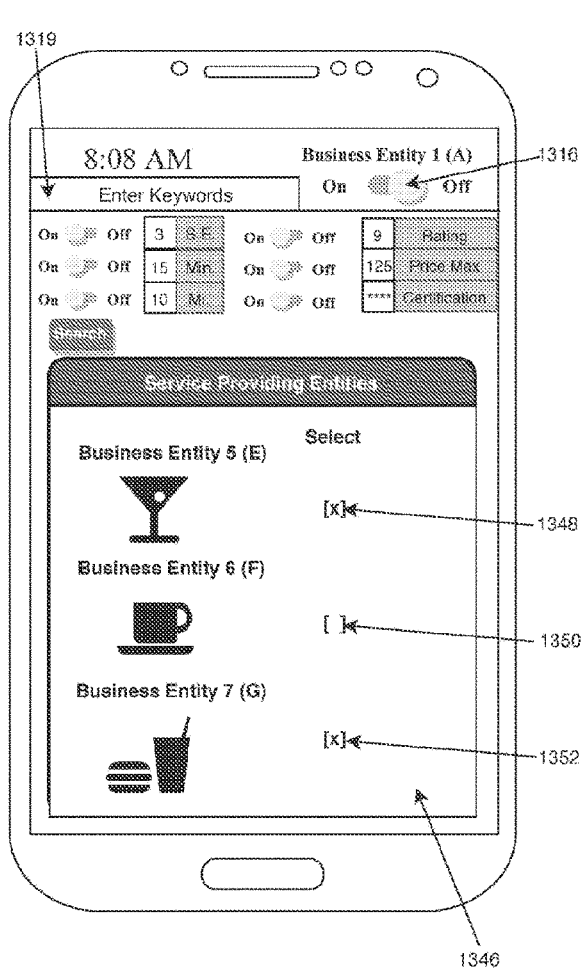

Referring to FIG. 13E, the user has moved toggle 1316 to the 'off' position, and thus converted the customer application program interface to expand the search to other business entities stored in the backend database who are associated with a particular service (e.g., restaurants as typed into keyword box 1319). The user has also inputted to adjustable search parameters 1310, 1312, 1314, 1340, 1342, 1344 as he/she only wishes to see three types of restaurants (service providing business entities) located within approximately a fifteen min drive, within 10 miles, having a rating of at least '9', and a certification of at least three stars. As shown, user interface 1346 displays respective restaurants of connected business entity 5 (with logo 'E'), business entity 6 (with logo 'F'), and business entity 7 (with logo 'G'). The user may similarly make selections by checking respective boxes 1348, 1350, 1352. It will be appreciated that indicators may be displayed with respect to each business entity in accordance with user preferences.

It will be appreciated that a user does not need to register a plurality of apps, and instead, can see and use the content of the underlying plurality of apps by launching a single convertible user application downloaded to their smartphone or another device. Such functionality will save the user time and effort in booking or paying for the good(s) or service(s) it needs, allows business entities to better serve and retain their client base, gain additional income from existing clients, and gain additional business from clients of other business entities.

E-commerce embodiments of the present invention may or may not utilize a map API as described above depending on the needs of the customer (e.g., when the user wants or needs a good or service directly, close in time and distance). When distance is not a primary requirement (e.g., not selected as one of the adjustable search parameters), a map will likely be unnecessary. It will be appreciated that the invention streamlines different applications into one main convertible user application which distributed by a "DSP", "main", "principal", or "nerve center" service entity which controls back-end software shared by the other business entities. Even though DSP is used in the transportation industry, "DSP" as described herein can be interpreted to mean provision of other goods and services. The back-end of the e-commerce convertible user application is preferably a software company which hosts the server and all other required software and hardware that support the backend and frontend.

In certain embodiments, connecting business entities may be allowed to also contract with one another and/or with the business entity or technology company controlling the back end to restrict one another other with regard to which of their connecting business entities may be displayed to customers. For example, in certain embodiments, if company A restricts company C from being displayed to company A's customers, then company A may also be restricted from being displayed to company C's customers. In other embodiments, such restrictions may be one-way or may be determined by one or more predetermined rules, with or without additional contracts between the business entities.

In other embodiments, when a particular one of a plurality of companies sharing the same back-end is not able to serve a particular customer, the company may automatically refer the customer's request to another connecting company sharing the same back-end.

In certain embodiments, if connecting companies are in the service industry (e.g., hotels, restaurants, etc.), such companies may be restricted from initiating future contact with a customer they transacted with through a connecting company unless the customer initiates future contact with them directly.

It will be appreciated that the use of a shared back-end application can allow a company the benefit of serving a customer in an area that the company doesn't serve. This area can be a particular area, city, county, district, state, province, country, continent, etc. The company may benefit from referring its service to its customer, even though the company is not active in that particular area. This will allow the customer to maintain its loyalty to the company and enables to company to benefit passively from the referral.

Figure 14A:
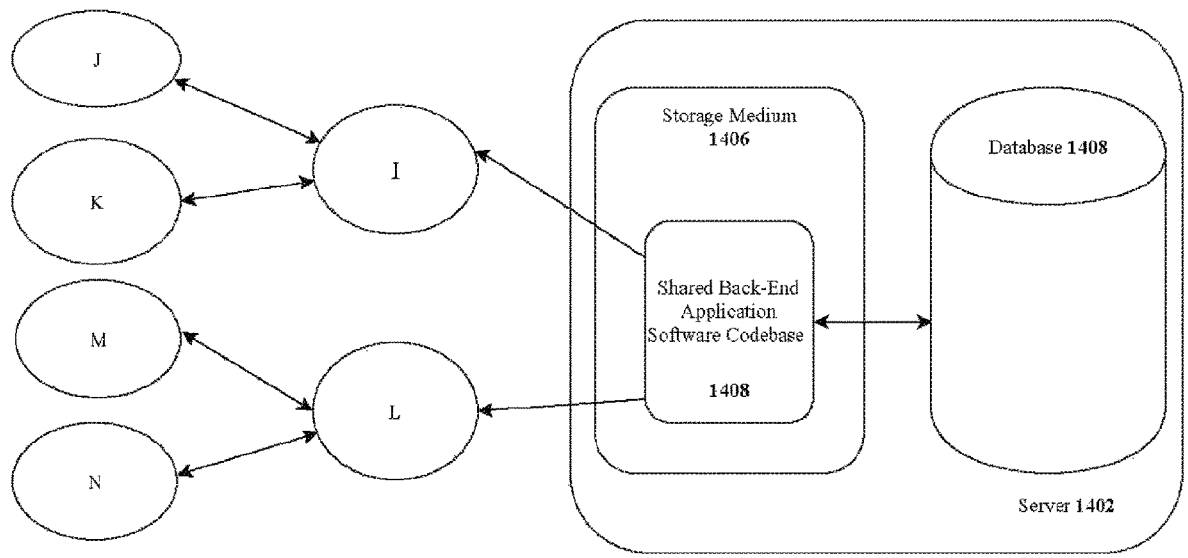
FIG. 14A is a schematic diagram illustrating an alternative exemplary system for sharing an e-commerce application in an apportioned database system, with a server sharing different portions of the backend of a database with two different main business entities in two different industries, in accordance with exemplary embodiments of the inventive disclosure.
Figure 14B:
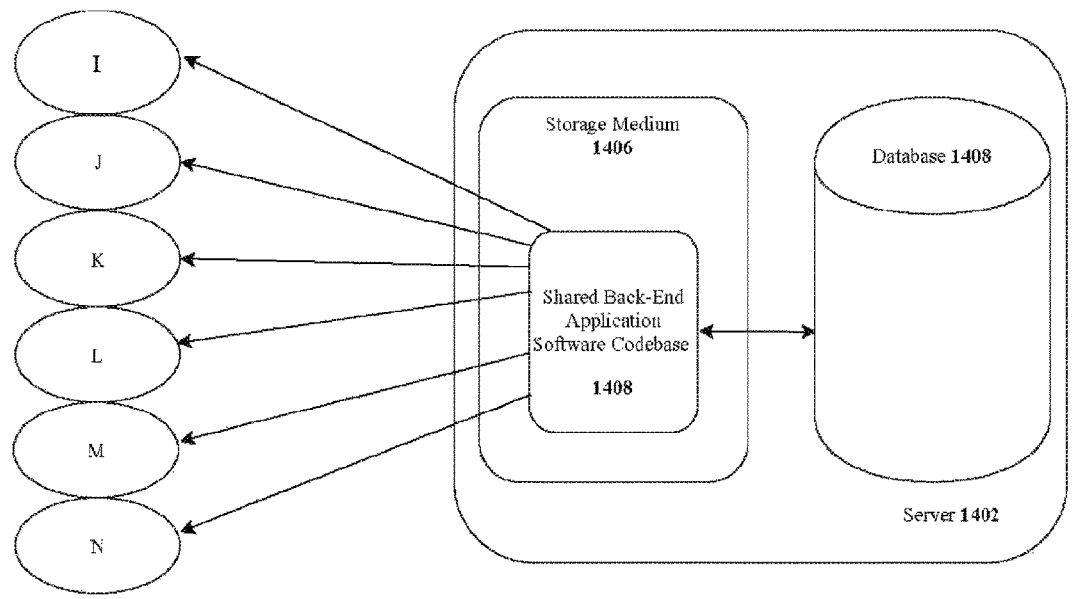
FIG. 14B a schematic diagram illustrating another alternative exemplary system and methodology for sharing an e-commerce application in an apportioned database system, with a server directly sharing the backend of a database with multiple business entities in multiple industries, in accordance with an exemplary embodiment of the inventive disclosure.

Referring to FIG. 14A, a single technology company may be tasked with housing and controlling the backend application software codebase 1408 in storage medium 1406 on server 1402. Such backend may be a database which combines goods and services in multiple industries. For example, business entity I may be a large restaurant connected to smaller business entities J and K, which are also restaurants. Business entity L may be a large dispatcher transport company connected to smaller business entities M and N, which are also dispatch companies. In such embodiments, the technology company may share a restaurant portion of backend 1408 with business entity I, who in turn shares with business entities J and K. The technology company may similarly share a dispatch portion of backend 1408 with business entity L, who in turn shares with business entities M and N. In other embodiments, as shown in FIG. 14B, the single technology company may be directly connected to all business entities I-N without any intermediary 'hubs' or main 'business' entities.

In certain embodiments, the technology company which controls the shared back end may be tasked with creating the front-end of a specific convertible user application associated with a connecting business entity—this will allow the connecting business entity to minimize its cost of initially designing and launching its own individual application.

In other embodiments, a corporation which owns multiple franchises (e.g., different companies) may allow its application and the shared backend to only connect its franchises, and may block other connecting companies. In yet other embodiments, connecting companies may allow the "nerve center" access to all the company's data to use and share directly by the "nerve center's" own app. In other embodiments, the nerve center may utilize the other companies as subcontractors. It will be appreciated that the main entity or technology company controls the back-end software while the front-end of each convertible user application associated with each business entity can be adjusted/customized as needed to meet the needs of the individual business entities.

In certain embodiments, the convertible user application may be used in numerous other industries, but not limited to good or services directly related to location or indirect related to the location, such as travel service entities (e.g., hotels, apartment buildings, and real estate companies), shipping entities, restaurants, movie theaters, theater companies, air, plumbing companies, electric companies, or virtually any group/association/company/entity which provides any form of services or entertainment, with or without one or more service providers.

In yet other embodiments, the convertible user application may be configured to allow a user to preconfigure his/her preferences before ordering a service. Such preconfigured preferences may be turned on and off. Adjustable search parameters as described herein may involve a direct or indirect preference (e.g., a customer may not care about the location of a business entity unless it is very far away (e.g., another country when buying goods online).

It will be appreciated that in the current state of the art, when using various applications for individual car service companies, a user needs to download all of the associated applications if the user wants to compare or use one of the services. In accordance with the invention, the user can download one convertible user application and have access to all of these car service entities in a single application.

It will be appreciated that using embodiments of the invention disclosed herein, when a user wants to purchase a movie ticket for a particular film using e-commerce, the user can search for the particular movie, based on the showing time, available seating, distance to the particular theater, applicable discounts, location, and rating. The customer's preferred application will first show its availability and any other requirements. If the customer is not satisfied, or the parameters do not correspond with the user's request, the application can show additional theaters.

It will be understood that the phrases or terminology employed herein is for purposes of description and not limitation. While the inventive disclosure has been shown and described with reference to various preferred embodiments, those skilled in the art will readily appreciate that various changes and/or modifications may be made without departing from the spirit and scope of the inventive disclosure as defined by the claims. Any exemplary embodiments described herein are merely illustrative, and many variations can be introduced without departing from the spirit of the disclosure or from the scope of the appended claims. For example, elements and/or features of different exemplary embodiments may be combined with each other and/or substituted for each other. The scope of the inventive disclosure, therefore, shall be defined solely by the following claims, and it will be apparent to those of skill in the art that numerous changes may be made in such details without departing from the spirit and the principles of the inventive disclosure.

What is claimed is:

1. A computer-implemented system for a user convertible application platform, the system comprising:
   a server in communication with a network including a processor, an apportioned database containing portions allocated to at least a first service entity and one or more additional service entities, and at least one non-transitory computer-readable storage medium with computer-readable instructions stored therein, wherein the processor executes the computer-readable instructions to:
   display, on a graphical user interface (GUI) of a remote computing device of a user, an application image representative of a first application program or a second application program, wherein the first application program is associated with the first service entity and the second application program is associated with the one or more additional service entities, and wherein the first application program and the second application program have independent and customizable front-ends;
   upon receiving a selection of the user to launch the first application program, display an interactive electronic interface depicting at least a toggle selectable by the user to switch between a first application state and a second application state, wherein:
   (i) in response to a selection of the first application state by the user, display the interactive electronic interface including identifications of one or more available objects of the first service entity that match a service request associated with the user; or (ii) in response to a selection of the second application state by the user, display the interactive electronic interface including identifications of one or more additional available objects of the one or more additional service entities that match the service request;

receive a selection of one available object by the user; and assign the one object to perform a service request of the user;

wherein upon switching the convertible user application from the first application state to the second application state, a portion of the apportioned database associated with the first service entity is linked with an additional portion of the apportioned database associated with the one or more additional service entities or at least a portion of user data is shared between the apportioned database associated with the first service entity and the additional portion of the apportioned database associated with the one or more additional service entities.

2. The system of claim 1, wherein the device is further configured to, in response to the selection of the second application state:

display on the interactive electronic interface a selectable menu comprising at least the first service entity and the one or more additional service entities selectable by the user, wherein the display of the identifications of one or more available objects of the first service entity or one or more additional service entities corresponds to the selected one or more of the first service entity and the one or more additional service entities.

3. The system of claim 1, wherein the first application program and the second application program are communicatively linked via the network to at least partially shared back-end server containing a shared back-end application software codebase.

4. The system of claim 1, wherein the processor further executes the computer-readable instructions to, in response to the selection of the first application state or the second application state:

display on the interactive electronic interface a menu depicting at least one or more adjustable search parameters, each of the one or more parameters being selectable to launch a display function for each of the one or more parameters to be simultaneously seen on the display screen.

5. The system of claim 4, wherein, in response to one or more inputs from the user indicative of at least one of the one or more search parameters, display the interactive electronic interface including the identifications of the one or more available objects.

6. The system of claim 4, wherein the processor, in response to the one or more inputs by the user, further executes the computer-readable instructions to:

display on the interface, in accordance with one or more inputs provided by the user for the one or more adjustable search parameters, one or more identifications of: (i) a maximum number of the one or more available service providers, (ii) the one or more available service providers within a time span for arrival to a location of the user, (iii) the one or more available service providers within a distance span for arrival to the location, or (iv) one or more additional users within the time span or the distance span.

7. The system of claim 1, wherein the one or more available objects are matched with the service request based on one or more service relevant factors related to (i) the one or more available objects, (ii) the first service entity or the-one or more additional service entities, or (iii) the user associated with the service request, the one or more service relevant factors including at least one of: (a) one or more optionally preset preferences of the one or more available objects or the first service entity or second service entity the one or more additional service entities; (b) one or more optionally preset limitations, a favorite user list, a preferred user list, or a user blacklist of the one or more available objects or the first service entity or the one or more additional service entities; or (c) one or more optionally preset preferences, a favorite object list, a favorite service entity list, a preferred object list, a preferred service entity list, an object blacklist, or a service entity blacklist of the user.

8. The system of claim 1, wherein the processor further executes the computer-readable instructions to, prior to the display of the indications of the one or more objects:

determine a proximity, via global positioning system (GPS) tracking, of the one or more objects in relation to a location of the user associated with the service request; and transmit the service request to one of the one or more objects based on the proximity to the location.

9. The system of claim 1, wherein the first application program and the second application program have independent and customizable front-ends, and wherein the independent and customizable front-ends are expressed as at least one of: an application name, an icon, a company logo, screenshots, or a description.

10. The system of claim 1, wherein the interactive electronic interface is an interactive electronic map interface.

11. A computer-implemented method for a user convertible application platform, the method comprising:

a server in communication with a network including a processor, an apportioned database containing portions allocated to at least a first service entity and one or more additional service entities, and at least one non-transitory computer-readable storage medium with computer-readable instructions stored therein;

displaying, by the server, on a graphical user interface (GUI) of a remote computing device of a user, an application image representative of a first application program or a second application program, wherein the first application program is associated with the first service entity and the second application program is associated with the one or more additional service entities, and wherein the first application program and the second application program have independent and customizable front-ends; upon receiving a selection of the user to launch the first application program, display an interactive electronic interface depicting at least a toggle selectable by the user to switch between a first application state and a second application state, wherein:

(i) in response to a selection of the first application state by the user, display the interactive electronic interface including identifications of one or more available objects of the first service entity that match a service request associated with the user; or (ii) in response to a selection of the second application state by the user, display the interactive electronic interface including identifications of one or more additional available objects of the one or more additional service entities that match the service request;

receive a selection of one available object by the user; and assign the one object to perform a service request of the user;

wherein upon switching the convertible user application from the first application state to the second application state, a portion of the apportioned database associated with the first service entity is linked with an additional portion of the apportioned database associated with the one or more additional, service entities or at least a portion of user data is shared between the apportioned database associated with the first service entity and the additional portion of the apportioned database associated with the one or more additional service entities.

12. The method of claim 11, wherein the processor is further configured to, in response to the selection of the second application state:
    display on the interactive electronic interface a selectable menu comprising at least the first service entity and the one or more additional service entities selectable by the user, wherein the display of the identifications of one or more available objects of the first service entity or one or more additional service entities corresponds to the selected one or more of the first service entity and the one or more additional service entities.

13. The method of claim 11, wherein the first application program and the second application program are communicatively linked via the network to at least partially shared back-end server containing a shared back-end application software codebase.

14. The method of claim 11, wherein the processor further executes the computer-readable instructions to, in response to the selection of the first application state or the second application state:
    display on the interactive electronic interface a menu depicting at least one or more adjustable search parameters, each of the one or more parameters being selectable to launch a display function for each of the one or more parameters to be simultaneously seen on the display screen.

15. The method of claim 14, wherein, in response to one or more inputs from the user indicative of at least one of the one or more search parameters, displaying the interactive electronic interface includes the identifications of the one or more available objects.

16. The method of claim 14, wherein the processor, in response to the one or more inputs by the user, further executes the computer-readable instructions to:
    display on the interface, in accordance with one or more inputs provided by the user for the one or more adjustable search parameters, one or more identifications of: (i) a maximum number of the one or more available service providers, (ii) the one or more available service providers within a time span for arrival to a location of the user, (iii) the one or more available service providers within a distance span for arrival to the location, or (iv) one or more additional users within the time span or the distance span.

17. The method of claim 11, wherein the one or more available objects are matched with the service request based on one or more service relevant factors related to (i) the one or more available objects, (ii) the first service entity or the one or more additional service entities, or (iii) the user associated with the service request, the one or more service relevant factors including at least one of: (a) one or more optionally preset preferences of the one or more available objects or the first service entity or the one or more additional service entities; (b) one or more optionally preset limitations, a favorite user list, a preferred user list, or a user blacklist of the one or more available objects or the first service entity or the one or more additional service entities; or (c) one or more optionally preset preferences, a favorite object list, a favorite service entity list, a preferred object list, a preferred service entity list, an object blacklist, or a service entity blacklist of the user.

18. The method of claim 11, wherein the processor further executes the computer-readable instructions to, prior to the display of the indications of the one or more objects:
    determine a proximity, via global positioning system (GPS) tracking, of the one or more objects in relation to a location of the user associated with the service request; and
    transmit the service request to one of the one or more objects based on the proximity to the location.

19. The method of claim 11, wherein the first application program and the second application program have independent and customizable front-ends, and
    wherein the independent and customizable front-ends are expressed as at least one of: an application name, an icon, a company logo, screenshots, or a description.

20. The method of claim 11, wherein the interactive electronic interface is an interactive electronic map interface.

* * * * *